US006437925B1

(12) United States Patent
Nishioka

(10) Patent No.: US 6,437,925 B1
(45) Date of Patent: Aug. 20, 2002

(54) OPTICAL APPARATUS

(75) Inventor: Kimihiko Nishioka, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/344,490

(22) Filed: Jun. 25, 1999

(30) Foreign Application Priority Data

| Jun. 30, 1998 | (JP) | 10-198155 |
|---|---|---|
| Nov. 6, 1998 | (JP) | 10-316184 |
| Nov. 6, 1998 | (JP) | 10-316185 |
| Nov. 25, 1998 | (JP) | 10-349311 |
| Mar. 17, 1999 | (JP) | 11-072557 |

(51) Int. Cl.$^7$ .......................... G02B 17/00; G02B 1/06; G02B 26/00
(52) U.S. Cl. ........................ 359/726; 359/666; 359/290; 359/291
(58) Field of Search .................. 349/1, 13, 57, 349/193, 200, 2, 113, 115, 116; 359/631, 720, 726, 739, 754, 209, 210, 211, 212, 290, 291, 319, 666, 676

(56) References Cited

U.S. PATENT DOCUMENTS

| 4,466,703 A | * | 8/1984 | Nishimoto | 359/319 |
|---|---|---|---|---|
| 4,564,267 A | * | 1/1986 | Nishimoto | 359/483 |
| 4,601,545 A | * | 7/1986 | Kern | 349/200 |
| 5,047,847 A | * | 9/1991 | Toda et al. | 348/68 |
| 5,071,229 A | * | 12/1991 | Oaki et al. | 349/200 |
| 5,097,352 A | * | 3/1992 | Takahaski et al. | 349/57 |
| 5,150,234 A | * | 9/1992 | Takahaski et al. | 349/1 |
| 5,532,854 A | * | 7/1996 | Fergason | 349/200 |
| 5,815,233 A | * | 9/1998 | Morokawa et al. | 349/200 |

FOREIGN PATENT DOCUMENTS

JP 10-039239 2/1998

OTHER PUBLICATIONS

Yoshina et al. "Fundamentals of Liquid Crystals and Display Applications", Corona–Sha, (Corona Publishing Ltd) pp. 85–93, 1994.
Kikuta et al. "Light Control by Grating Structure Smaller than Wavelength" Optics, vol. 27, No. 1, 1998, pp. 12–17.
Gleb Vdovin "Quick Focusing of Imaging Optics using Micromachined Adaptive Mirrors", Optics Communications, vol. 140, Aug. 1997, pp. 187–190.
M.C. Wu et al. "Micromachined Free–Space Integrated Micro–Optics", Sensors and Acutators A 50, 1995, pp. 127–134.
P. Rai–Chudhury, "Handbook of Microlithography, Micromachining and Microfabrication, vol. 2: Micromachining and Microfabrication", Spie Press, pp. 486–497, Sep. 1998.
Gleb Vdovin et al. "Flexible Mirror Micromachined in Silicon", Applied Optics vol. 34, No. 16, Jun. 1, 1995, pp. 2968–2972.
Takatsu "Development and Commercialization of Tolan–base Liquid Crystal", Japan Chemistry Association Monthly Report, Feb. 1997, pp. 14–18.
"New Art of Liquid Crystal Display", Asahi Newspaper, Jan. 14, 1998.

* cited by examiner

Primary Examiner—Georgia Epps
Assistant Examiner—David N. Spector
(74) Attorney, Agent, or Firm—Pillsbury Winthrop LLP

(57) ABSTRACT

An optical apparatus includes a variable optical-property element to change its optical properties by applying an electric or magnetic field or temperature to a liquid crystal. In this way, the optical apparatus is reduced in thickness, and can be used in a cam era, a microscope, etc.

31 Claims, 46 Drawing Sheets

FIG. 5
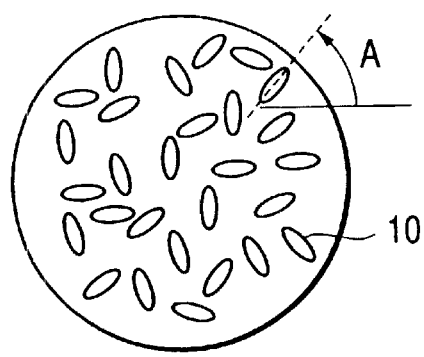
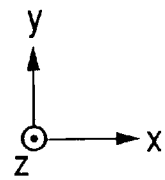
FIG. 6
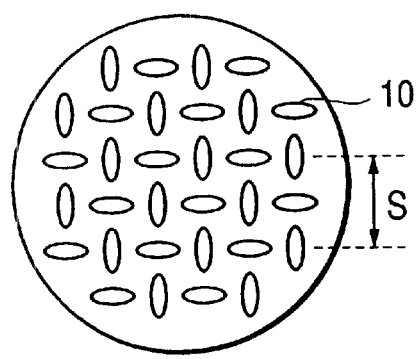
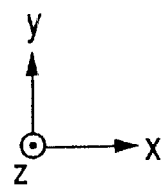

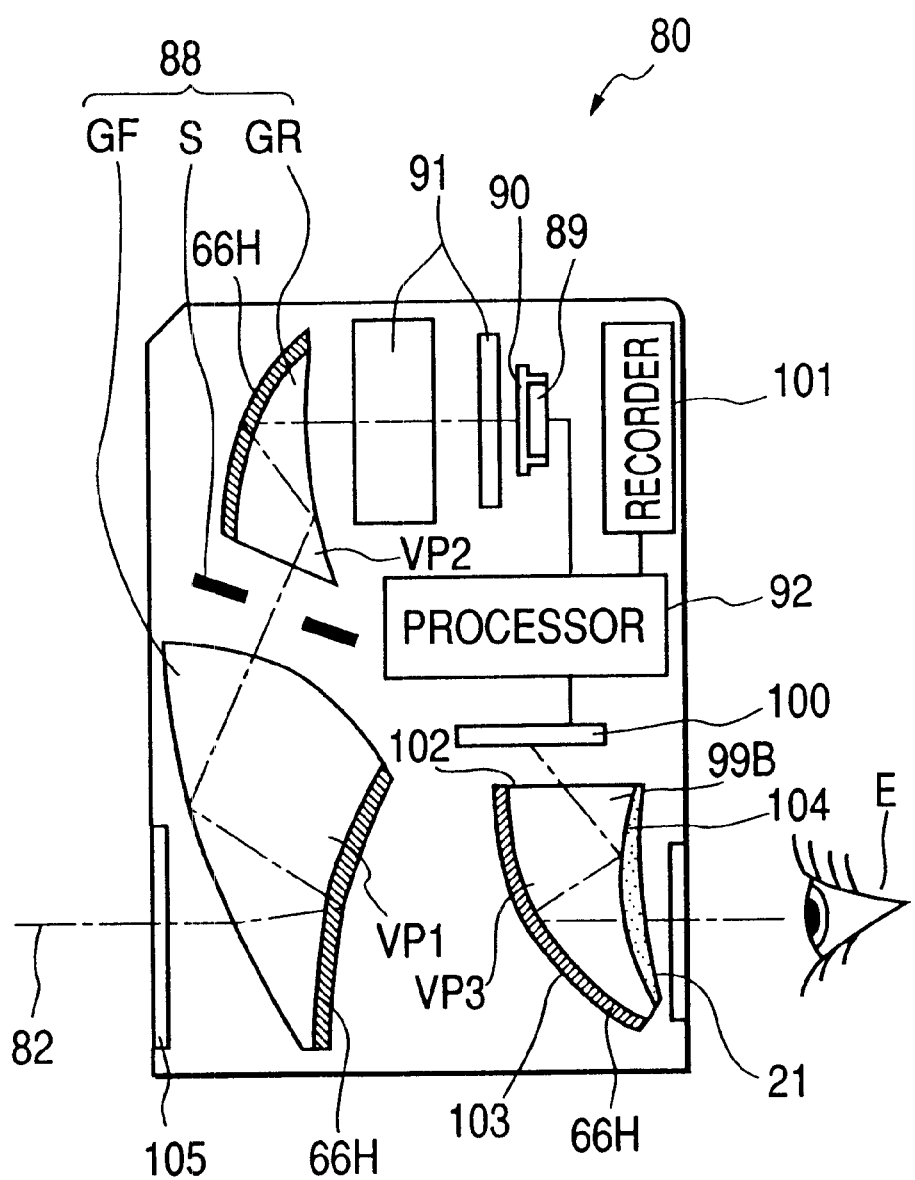

OPTICAL APPARATUS

BACKGROUND OF THE INVENTION

1. Field of the Invention

This invention relates to an optical apparatus including an imaging device using an extended surface optical element and a variable optical-property reflecting mirror, or including a variable optical-property element, a variable optical-property mirror, or a combination of the variable optical-property element with the variable optical-property mirror.

2. Description of Related Art

For a conventional, variable optical-property element such as a variable focal-length lens or a variable focal-length lens, a description will be given of the variable focal-length lens as an example. In an optical system, an extended surface optical element may be used. The extended surface of the extended surface optical element refers to any surface which has a shape such as a spherical, planar, or rotational symmetrical aspherical surface; a spherical, planar, or rotational symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. In optical systems having used optical elements with the extended surfaces, an optical system utilizing the reflection of the extended surface has the merit that chromatic aberration is not produced. This optical system, however, has the disadvantage that in the case where the shape of the extended surface is abnormal, when the optical element is moved for zooming and focusing operations, a mechanical structure such as a moving mechanism becomes complicated.

A conventional digital camera, as shown in FIG. 1, has been manufactured by assembling components such as plastic lenses PL, a stop D, a solenoid FS for focusing, a shutter S, a charge-coupled solid-state image sensor CCD, a signal processing circuit PC, and a memory M. Consequently, the number of parts is increased and an assembly becomes troublesome. Thus, there are limits to a compact design, accuracy improvement, and cost reduction of the camera.

Furthermore, in general, the plastic lens has a tendency that its refractive index and shape change with temperature and humidity, and thus imaging performance is degraded by temperature change. In this way, glass lenses are chiefly used, and a lightweight design, accuracy improvement, and cost reduction of the camera are highly limited.

SUMMARY OF THE INVENTION

It is, therefore, a primary object of the present invention to provide an optical system including an optical element with a extended surface and a variable optical-property reflecting mirror.

It is another object of the present invention to provide an imaging device having the above optical system and an image sensor.

It is still another object of the present invention to provide an observing device or an optical finder having the above optical system and a display element.

It is a further object of the present invention to provide an optical apparatus including an electronic imaging system and an electronic display system, used in a digital camera, an electronic endoscope, a PDA (personal digital assistant), a video telephone, a VTR camera, or a TV camera, which is capable of achieving a compact design and cost reduction by integrally constructing parts such as an image sensor and an optical element through the technique, for example, of lithography, or including a platelike unit constituting a part of the above elements.

It is a still further object of the present invention to provide an optical apparatus capable of compensating for a change of imaging or optical performance by temperature and humidity, for example, a digital camera, an electronic endoscope, a PDA, a video telephone, a VTR camera, a TV camera, a film camera, a microscope, a laser scanning microscope, a bar-code scanner, a bar-code reader, or a pick-up device for optical disks.

The optical system of the present invention includes extended surfaces and a variable optical-property reflecting mirror.

The imaging device of the present invention is provided with an optical element having extended surfaces, a variable optical-property reflecting mirror, and an image sensor so that the reflecting mirror and the image sensor are placed on the same substrate, and the whole or a part of the reflecting mirror and the optical element having the extended surfaces constitutes an optical system.

The imaging device of the present invention is provided with an optical element having extended surfaces and a variable optical-property reflecting mirror so that the reflecting mirror is placed close to one surface of the optical element.

The optical apparatus of the present invention is such that a ray of light following the direction of image formation or observation has a helical relationship with a ray of light entering an image sensor or the eye.

The optical apparatus of the resent invention is provided with an extended surface prism in which a ray of light incident on the extended surface prism has a helical relationship with a ray of light emerging from the extended surface prism.

The optical apparatus of the present invention has a moving optical element comprised of an optical element and an actuator, Including a lithography process in a fabrication process.

The optical apparatus of the present invention has at least one of an optical element, a shutter, a stop, and a display element, and an image sensor on a single substrate.

The optical apparatus of the present invention has at least two of an optical element, a shutter, a stop, a display element, and an image sensor on a single substrate.

The optical apparatus of the present invention has at least one of an image sensor, an Optical element, a shutter, a stop, and a display element on a single substrate.

The optical apparatus of the present invention includes a variable optical-property element.

The optical apparatus of the present invention includes a variable optical-property mirror. According to the present invention, the variable optical-property mirror is comprised of a combination of a variable optical-property lens with a mirror.

These and other objects as well as the features and advantages of the present invention will become apparent from the following detailed description of the preferred embodiments when taken in conjunction with the accompanying drawings.

BRIEF DESCRIPTION OF THE DRAWINGS

FIG. 5 is a view showing a state of the orientation of liquid crystal molecules;

FIG. 6 is a view showing another state of the orientation of the liquid crystal molecules;

FIG. 31 is a view showing another modification example of the embodiment of FIG. 29;

DETAILED DESCRIPTION OF THE PREFERRED EMBODIMENTS

Before undertaking the description of the embodiments, it will be expedient to explain the definitions of terms employed in the present invention. An optical apparatus used in the present invention refers to an apparatus including an optical system or optical elements, or a part of this apparatus. The optical apparatus need not necessarily function by itself. That is, it is may be thought of as a part of an apparatus or a unit.

The optical apparatus includes an imaging device, an observation device, a display device, an illumination device, and a signal processing device. The imaging device refers to, for example, a film camera, a digital camera, a TV camera, a VTR camera, or an electronic endoscope. The observation device refers to, for example, a microscope, a telescope, spectacles, binoculars, a magnifier, a fiber scope, or a finder. The display device includes, for example, a liquid crystal display, a viewfinder, a head mounted display, or a PDA. The illumination device includes, for example, a stroboscopic lamp for cameras, a headlight for cars, a light source for endoscopes, or a light source for microscopes, Finally, the signal processing device refers to, for example, a read/writ device for optical disks, a bar-code reader, a bar-code scanner, or a computer for optical calculators.

The variable optical-property element can be used in the optical apparatus, and its compact and lightweight design and function improvement are achieved.

An extended surface can be defined as follows: Any surface is satisfactory which has a shape such as a spherical, planar, or rotational symmetrical aspherical surface; a spherical, planar, or rotational symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line: etc. Moreover, any surface which has some effect on light, such as a reflecting or refracting surface, is satisfactory. In general, such a surface is hereinafter referred to as the extended surface.

An extended surface optical element refers to an optical element such as a prism, reflecting mirror, or lens which has at least one extended surface. Each of an extended surface prism and an extended surface reflecting mirror is constructed with one optical block.

Figure 2:
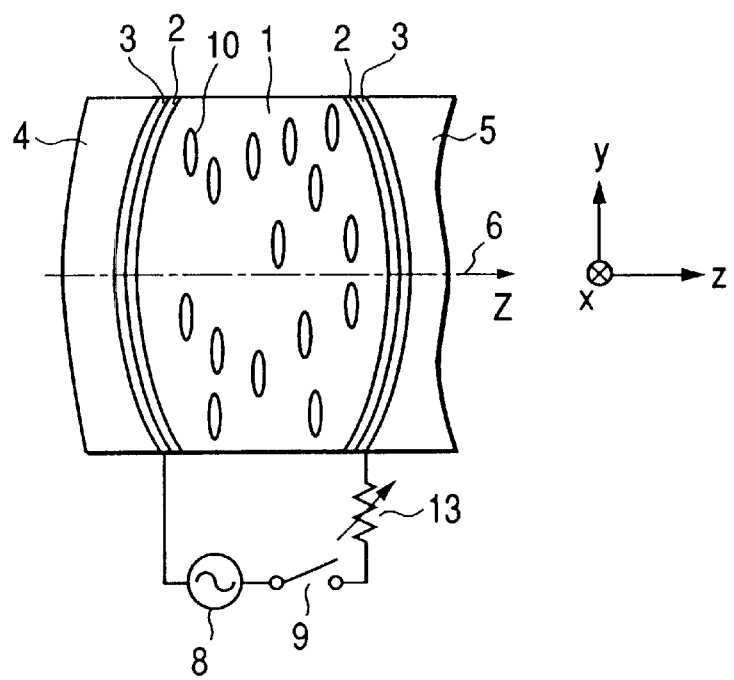
FIG. 2 is a view showing an optical system using a liquid crystal in which the anisotropy of refractive index is negative.

A variable focal-length lens used as the variable optical-property element of the present invention has a structure shown in FIG. 2, for instance. In this figure, reference numeral 1 represents a liquid crystal in which the anisotropy of refractive index is negative, 2 represents orientation films, and 3 represents transparent electrodes which are provided on transparent substrates 4 and 5, respectively.

Figure 3:
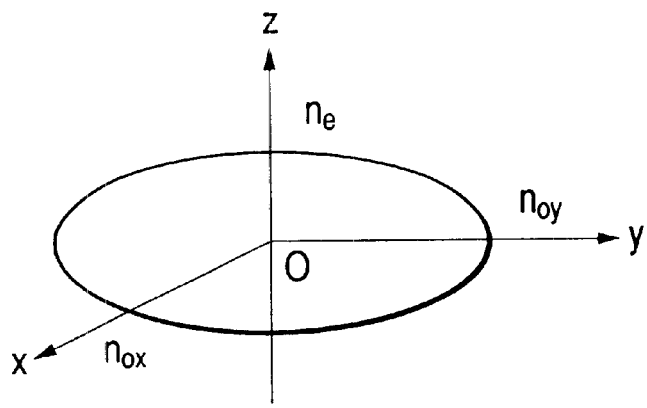
FIG. 3 is a view showing the index ellipsoid of the liquid crystal of FIG. 2.

In the optical element thus constructed, the liquid crystal 1 in which the anisotropy of refractive index is negative has the shape of an index ellipsoid such as that shown in FIG. 3, and satisfies the following conditions:

$$ne < n_{ox}, ne < n_{oy} \qquad (1)$$

where ne is a refractive index of an extraordinary ray, $n_{ox}$ is a refractive index of polarized light in the x direction, and $n_{oy}$ is a refractive index of polarized light in the y direction.

The liquid crystal 1 also satisfies the following condition:

$$n_{ox} = n_{oy} = no \qquad (2)$$

where no is a refractive index of an ordinary ray.

In such a variable focal-length optical element including the liquid crystal in which the anisotropy of refractive index is negative, the orientation films 3 are constructed so that when the voltage is not applied to the liquid crystal 1, the molecules of the liquid crystal 1 in the z direction are oriented in the direction of an optical axis 6, that is, in a Z direction. Also, the orientation film 3 may be removed. In this case, the refractive index of the liquid crystal relative to the incident light is no, and the optical element functions as a positive lens.

Figure 4:
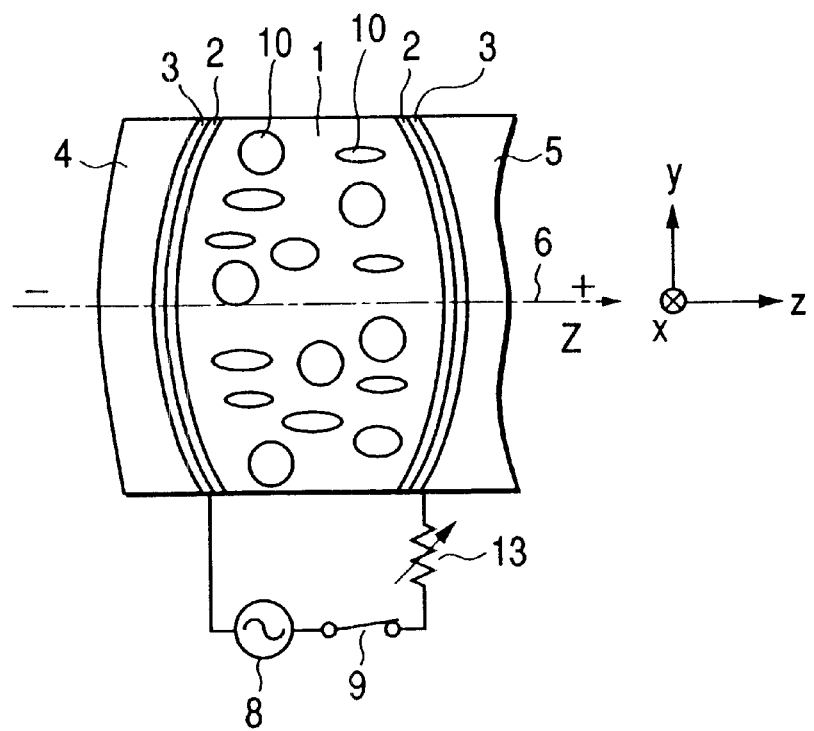
FIG. 4 is a view showing a state where an electric field is applied to the liquid crystal of FIG. 2.

In FIG. 2, when a switch 9 is turned on through an AC power supply 8, the orientation of liquid crystal molecules 10 is shifted as shown in FIG. 4 and thus a refractive index n relative to the incident light is lowered as expressed by the following equation:

$$n = (ne + no)/2 \qquad (3)$$

Due to such a reduction of the refractive index, the optical element diminishes its refracting power as the positive lens to increase the focal length, and behaves as the variable focal-length lens. Moreover, the resistance of a variable resistor 13 is changed, and thereby the refractive index is continuously changed. Consequently, the focal length of the optical element can be continuously changed.

Figure 1:
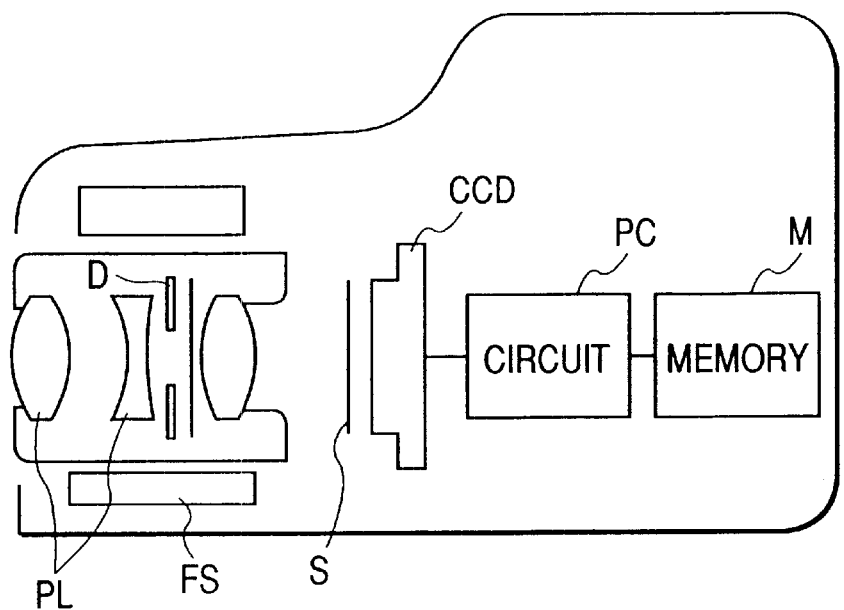
FIG. 1 is a view showing the construction of a conventional digital camera.

The orientation films 2 are prepared so that the liquid crystal molecules 10 are oriented in a vertical direction, and as shown in FIG. 5, orientation angles A of the liquid crystal molecules 10 become random in an x-y plane. Therefore, even through any polarized light is incident on the optical element, the optical element acts as the variable focal-length which has the same focal length. Also, the liquid crystal 1 has an original nature that produces a homeotropic orientation such as that shown in FIG. 1, and thus the orientation films 2 need not necessarily be used. In order to change the orientation of the liquid crystal molecules 10, the frequency of the electric field, the magnetic field or the temperature, instead of the voltage, may be changed.

Even when the liquid crystal molecules 10, as shown in FIG. 6, are regularly oriented nearly perpendicular to one another, the same effect as in FIG. 5 is secured. In this case, it is desirable that a period S of the orientation of the liquid crystal molecules 10 is less than the wavelength $\lambda$ of light used, so as to satisfy the following condition:

$$0.5 \text{ nm} < S < \lambda \quad (4)$$

This is because the scattering of light is minimized and flare is reduced.

Here, the wavelength $\lambda$ is in the range of 350–700 nm for visible light. That is, in the case of the visible light, the condition of the period S is as follows:

$$0.5 \text{ nm} < S < 700 \text{ nm}$$

In the case of near-infrared light, the wavelength $\lambda$ is in the range of 650–1200 nm, and thus Condition (4) can be expressed as follows:

$$0.5 \text{ nm} < S < 1200 \text{ nm}$$

Figure 7:
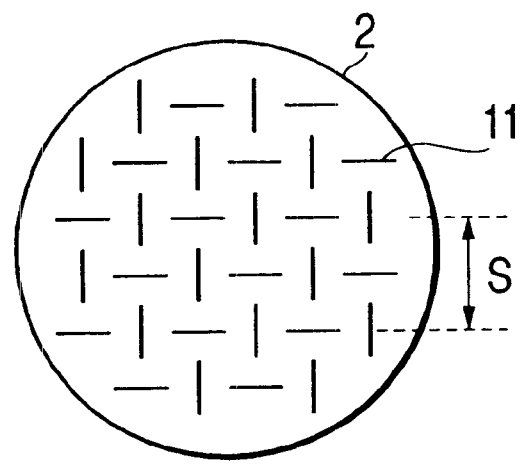
FIG. 7 is a view showing a pattern formed on an orientation film.

In order to orient the liquid crystal molecules 10 as shown in FIG. 6, it is only necessary, as shown in FIG. 7, to regularly provide each of the orientation films 2 with fine grooves 11 of the pitch S. The grooves 11 have depths ranging from 0.1 nm to several tens of nanometers and can be made by photoresist exposure and etching as set forth, for example, in "Light control by grating structure smaller than wavelength", by Kikuta and Iwata, Optics, Vol. 27, No. 1, pp. 12–17, 1998. A model in which the grooves are formed by etching may be made and used to transfer the grooves to plastic.

Figure 8:
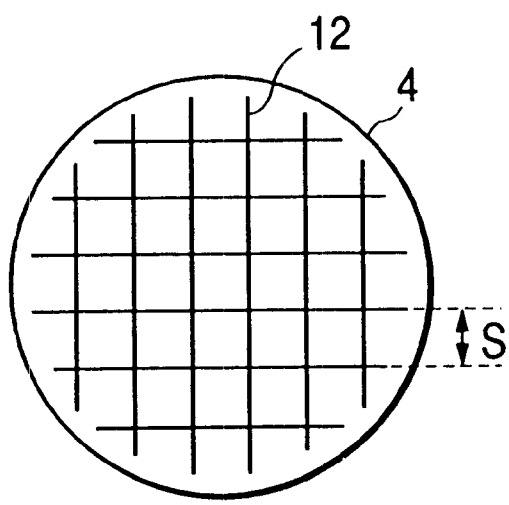
FIG. 8 is a view showing another pattern formed on the orientation film.

Instead of a pattern shown in FIG. 7, a convexity or concavity 12 of a grating pattern such as that shown in FIG. 8 may be used if the orientation of the liquid crystal molecules 10 is uniform, looking at in the x-y plane, that is, unless the refractive index of the liquid crystal 1 varies with the orientation. This grating pattern may be formed not on the surfaces of the orientation films 2, but on the surface of the transparent substrates 4 or 5. In this instance, the orientation films 2 can be dispensed with, as the case may be. The fine grooves 11 may be configured not as depressions but as projections.

As mentioned above, a liquid crystal lens in which the orientation of the liquid crystal molecules 10 is uniformed in the x-y plane to be independent of polarization and to bring about a sharp focus can be used as the variable optical-property element having the same structure as in FIG. 2, not only when the anisotropy of refractive index of the liquid crystal is negative, but also when a positive nematic liquid crystal is used to satisfy the following condition:

$$ne > no \quad (5)$$

Substances having electrooptical effects and magnetrooptical effects of macromolecular dispersed liquid crystals, chiral smectic liquid crystals, chiral cholesteric liquid crystals, ferroelectric liquid crystals, antiferroelectric liquid crystals, and ferroelectrics are also applicable to the present invention. Besides the above embodiment, these respective substances are applicable to embodiments which will be described later.

Figure 9:
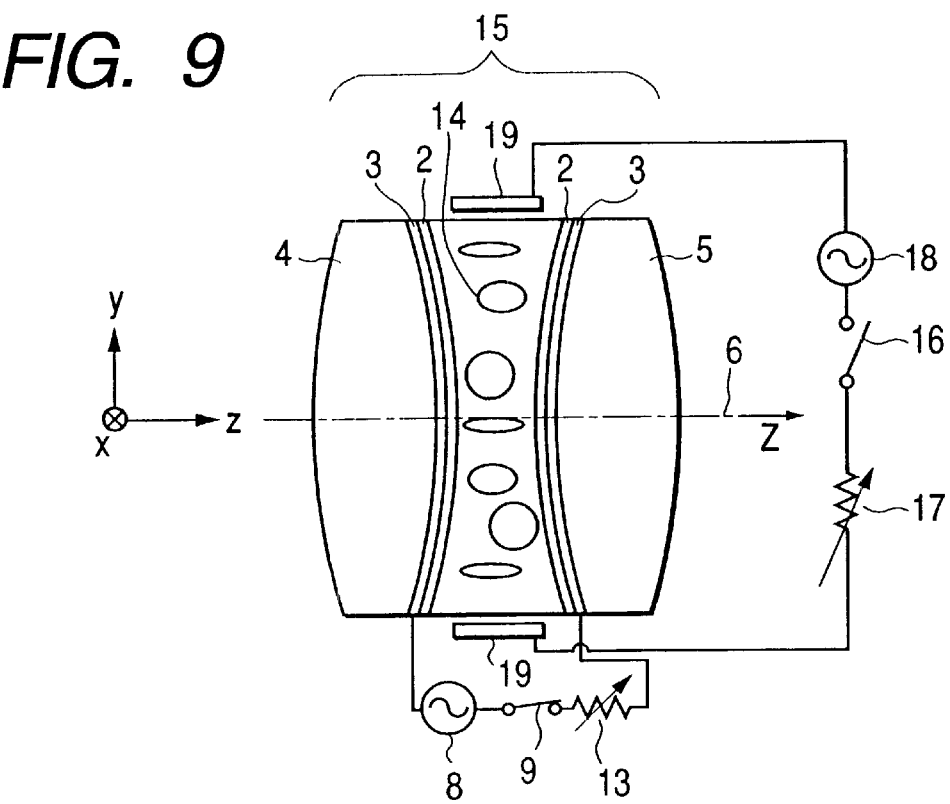
FIG. 9 is a view showing a liquid crystal lens in which the orientation of the molecules of a liquid crystal is changed with a high speed.

FIG. 9 illustrates a liquid crystal lens in which the electric field is applied in the direction of the optical axis and a direction perpendicular thereto, and thereby the orientation of the molecules of a liquid crystal 14 is shifted with high speed. The liquid crystal 14 in this figure, like that shown in FIG. 2, is constructed so that the anisotropy of refractive index is negative. This embodiment shows an variable optical-property element (variable focal-length lens) provided with members for applying one electric field, composed of the electrodes 3, the AC power supply 8 connected thereto, the switch 9, and the variable resistor 13, such as those shown in FIG. 2, and members for applying another electric field, composed of electrodes 19 placed opposite to each other, sandwiching the optical axis 6 between them, an AC power supply 18 connected thereto, a switch 16, and a variable resistor 17. In this variable focal-length lens, that is, a liquid crystal lens 15, FIG. 9 is in a state where the switch 9 is turned on and the switch 16 is off.

Figure 10:
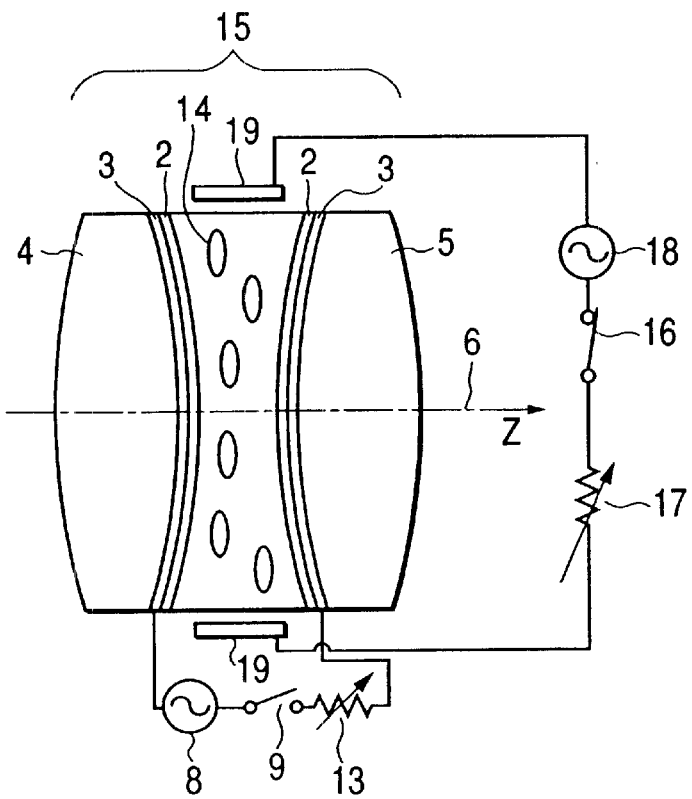
FIG. 10 is a view showing a state where an electric field is applied to the liquid crystal of FIG. 9.

In order to change the focal length of the liquid crystal lens 15, as shown in FIG. 10, the switch 9 is turned off and at almost the same time, the switch 16 is turned on. In this way, the electric field is applied through the electrodes 19 to the liquid crystal 14, and the molecules of the liquid crystal 14 change their z direction to be parallel to the optical axis. Hence, the refractive index of the liquid crystal lens is increased and the function as a negative lens is improved, thereby changing the focal length.

Figure 11:
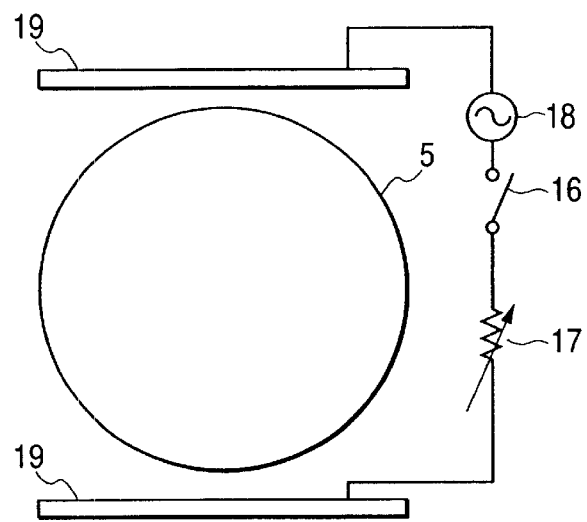
FIG. 11 is a view showing the liquid crystal lens looking at along the direction of a z axis in FIG. 10.

FIG. 11 shows the positions and shapes of the electrodes 19, looking at the liquid crystal lens 15 from a+z direction.

Figure 12A:
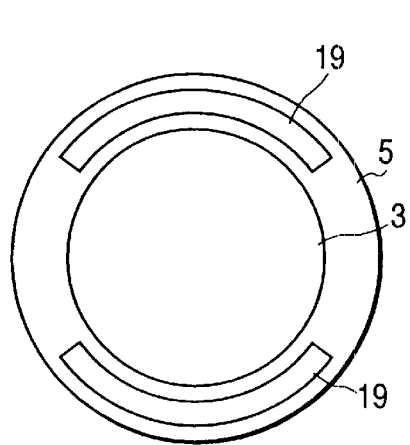
FIGS. 12A and 12B are views showing a modification example of the liquid crystal lens of FIG. 9 looking at along the directions of z and x axes, respectively.
Figure 12B:
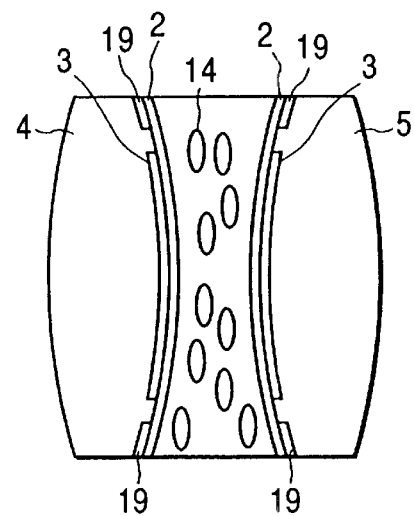

FIGS. 12A and 12B show a modification example of the liquid crystal lens of FIG. 9, from which the electrodes 19 are different in position and shape. The electrodes 19, as shown in FIG. 12A, are provided in a state of insulation from the transparent electrode 3 on the periphery of at least one of the transparent substrates 4 and 5 shown in FIG. 12B, and bring about almost the same effect as those shown in FIG. 11.

The liquid crystal lens 15 depicted in FIG. 9 has the feature that where the z axis of each of the liquid crystal molecules 14 is made parallel to the optical axis 6, a response time is faster than in the liquid crystal lens shown in FIG. 4. Whether the focal length of the liquid crystal lens 15 is long or short, the electric field is applied to the liquid crystal molecules 14, and thus the liquid crystal lens 15 excels in minimizing the variation of the orientation of the liquid crystal molecules and the scattering of light.

In addition, the variable resistors 13 and 17 are properly adjusted, and thereby the focal length of the liquid crystal lens 15 can be continuously changed. The orientation of the liquid crystal molecules 14 lies in a state of a compromise between FIG. 9 in which the switch 9 is on and the switch 16 is off and FIG. 10 in which the switch 9 is off and the switch 16 is on.

In the disclosure so far, reference has been made to a liquid crystal that a dielectric anisotropy relative to the driving AC frequency of the liquid crystal molecules 10 or 14 is also negative as in the anisotropy of refractive index. As an example of such a liquid crystal, a discotic liquid crystal is cited.

Figure 13:
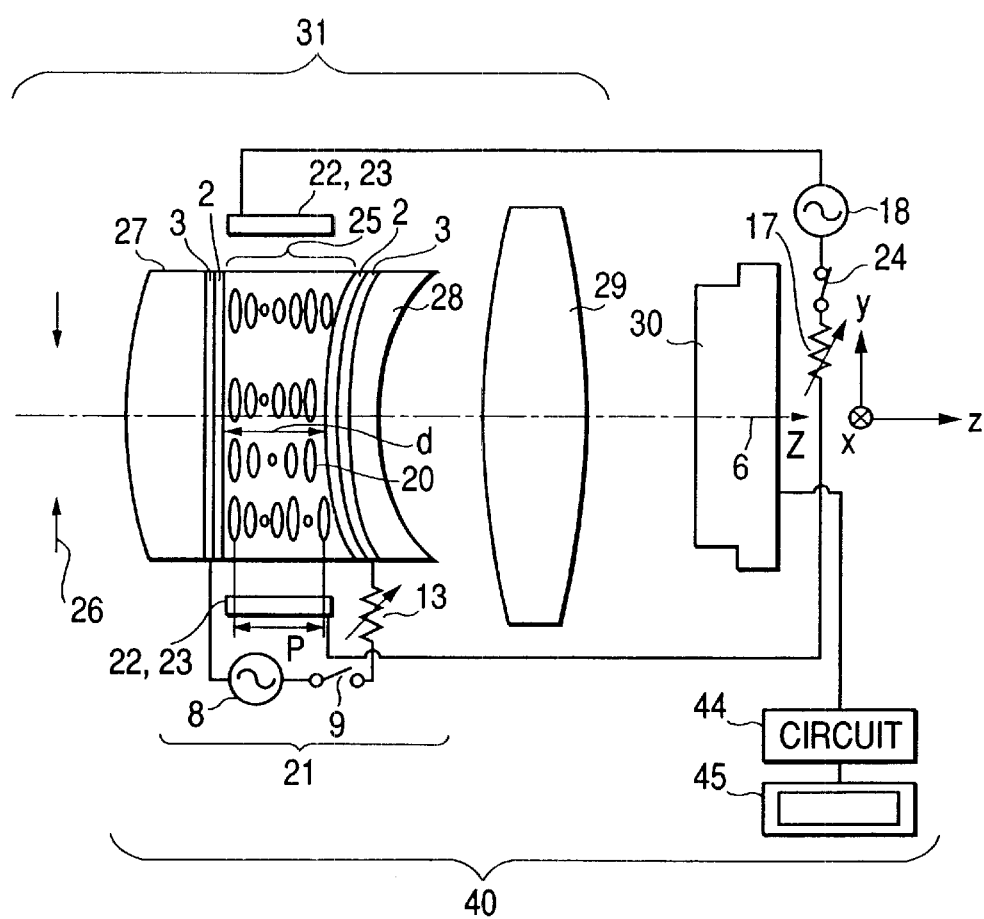
FIG. 13 is a view showing an imaging device using the liquid crystal lens of the present invention.

In the embodiment shown in FIG. 13, a variable focal-length lens 21, instead of using the liquid crystal molecules 14 shown in FIG. 9, uses a nematic liquid crystal 20 having a positive anisotropy of refractive index and dielectric anisotropy. Condition (5) is thus established.

In FIG. 13, an imaging device for digital cameras using the variable focal-length lens 21 is shown. The molecules of the liquid crystal 20 are helically oriented at the pitch P. The variable focal-length lens 21 is such that the direction of one molecule of the liquid crystal 20 is nearly parallel to the x-y plane. If the value of the pitch P of the liquid crystal molecules is less than 20–60 times the wavelength λ of light used in the variable focal-length lens 21, the liquid crystal 20 can be practically thought of as an isotropic medium.

Now, it is assumed that the pitch P is smaller than the wavelength λ, that is, satisfies the following condition:

$$P < \lambda \tag{6}$$

In this case, the liquid crystal approaches the isotropic medium. This reason is as follows:

Now, it is assumed that the pitch P satisfies the following condition:

$$P \ll \lambda \tag{5-1}$$

When the pitch P is much smaller than the wavelength λ of light as mentioned above, the variable focal-length lens does not rely on the polarization of incident light and functions as a medium with a refractive index n':

$$n' = (ne + no)/2 \tag{5-2}$$

Subsequently, in accordance with the Jones' vector and matrix, a description will be given of the reason why the nematic liquid crystal 1 behaves effectively as an isotropic medium with the refractive index n'.

According to equations set forth in "Fundamentals of Liquid Crystals and Display Applications", by K. Yoshino and M. Okazaki, Corona, pp. 85–92, a Jones' matrix $W_t$ relative to the nematic liquid crystal with a thickness d, shown in FIG. 13, including an absolute phase change exp (−iα), is given by $$W_t = e^{-i\alpha} R(-\Phi) \begin{pmatrix} \cos X - i\frac{\Gamma}{2}\frac{\sin X}{X} & \Phi\frac{\sin X}{X} \\ -\Phi\frac{\sin X}{X} & \cos X + i\frac{\Gamma}{2}\frac{\sin X}{X} \end{pmatrix} \tag{5-3}$$

where $$\Phi = 2\pi d/P \tag{5-4}$$

$$\Gamma = 2\pi(ne-no)d/\lambda \tag{5-5}$$

$$\alpha = 2\pi\{(ne+no)/2\}d/\lambda \tag{5-6}$$

$$X = (\Phi^2 + \Gamma^2/2)^{1/2} \tag{5-7}$$

$$\Phi = 2\pi d/p \tag{5-4}$$

$$\Gamma = 2\pi(ne - ne)d/\lambda \tag{5-5}$$

$$\alpha = 2\pi\{(ne + no)/2\}d/\lambda \tag{5-6}$$

$$X = (\Phi^2 + \Gamma^2/2)^{1/2} \tag{5-7}$$

$$R(-\Phi) = \begin{bmatrix} \cos\Phi & -\sin\Phi \\ \sin\Phi & \cos\Phi \end{bmatrix} \tag{5-8}$$

Here, when ordinary light is defined as polarized light in the direction of the minor axis of the liquid crystal molecule and extraordinary light is defined as polarized light in the direction of the major axis of the liquid crystal molecule or in the direction in which the major axis is projected on a plane parallel to the optical axis, Γ stands for a phase difference between the ordinary light and the extraordinary light, due to the nematic liquid crystal.

Also, Φ is the angle of twist of the liquid crystal molecules of the nematic liquid crystal 1 in radian. It is assumed that the coordinates of Equations (5-3) and (5-8) are as x, y, and z axes shown in FIG. 13. Specifically, the x axis extends from the front side toward the back side of the plane of the figure and the y axis is the direction of the major axis of the liquid crystal molecule at the entrance surface of the nematic liquid crystal.

Subsequently, consider how the Jones' matrix $W_t$ of Equation (5-3) changes under Condition (5-1). Condition (5-1) can be rewritten as $$0 < P/\lambda \ll 1 \tag{5-9}$$

Here, when P/λ approaches zero, find an ultimate value $W_{tL}$ of the Jones' matrix $W_t$ of Equation (5-3).

$$\Gamma/\Phi = (ne-no)P/\lambda \tag{5-10}$$

and thus, when P/λ ≪ 1, $$|\Gamma/\Phi| \ll 1 \tag{5-11}$$

and when P/λ approaches zero, |Γ/Φ| also approaches zero.

Under Condition (5-11), the following approximations are accomplished:

$$X = \Phi\sqrt{\left(1 + \frac{\Gamma^2}{2\Phi^2}\right)} \approx \Phi + \frac{\Gamma^2}{4\Phi} \tag{5-12}$$

$$\cos X \approx \cos\left(\Phi + \frac{\Gamma^2}{4\Phi}\right) \tag{5-13}$$

$$\frac{\Gamma}{2'}\frac{\sin X}{X} \approx \frac{\Gamma}{2}\frac{\sin\left(\Phi + \frac{\Gamma^2}{4\Phi}\right)}{\Phi + \frac{\Gamma^2}{4\Phi}} \tag{5-14}$$

$$\Phi\frac{\sin X}{X} \approx \frac{\sin\left(\Phi + \frac{\Gamma^2}{4\Phi}\right)}{1 + \frac{\Gamma^2}{4\Phi^2}} \tag{5-15}$$

When P/λ approaches zero, the following equations are obtained:

$$\frac{\Gamma}{2}\frac{\sin X}{X} \to 0 \tag{5-18}$$

$$\Phi\frac{\sin X}{X} \to \sin\Phi \tag{5-19}$$

and thus, when P/λ approaches zero, the following equation is obtained:

$$W_{tL} \to e^{-i\alpha} R(-\Phi)\begin{pmatrix} \cos\Phi & \sin\Phi \\ -\sin\Phi & \cos\Phi \end{pmatrix} = e^{-i\alpha}\begin{pmatrix} 1 & 0 \\ 0 & 1 \end{pmatrix} \quad (5\text{-}20)$$

This is indeed the Jones' matrix of a medium which has the refractive Index n'=(ne+no)/2 and the thickness d and is isotropic along the optical axis. Thus, since P/λ <<1, the variable focal-length lens 21 shown in FIG. 13 functions as the medium with the refractive index n', and produces an image with no blurring.

Figure 15:
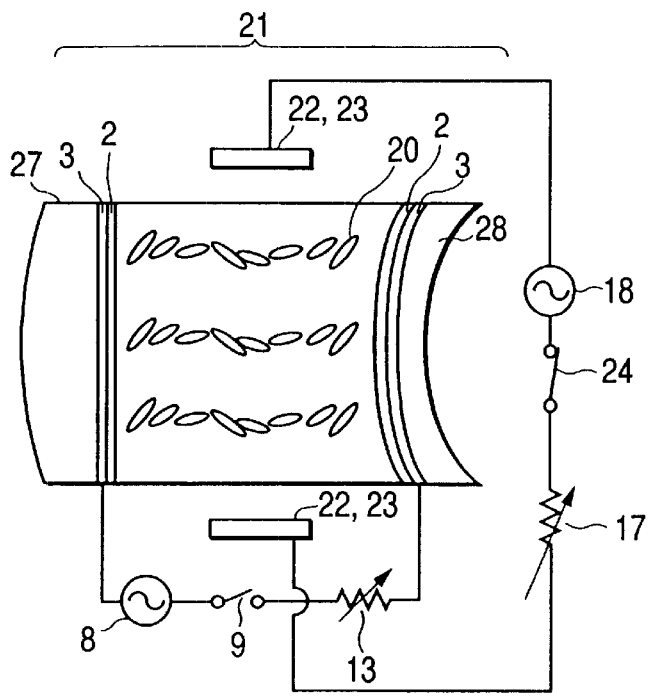
FIG. 15 is a view showing a variable focal-length optical system using the variable optical-property element of the present invention.

Even where the liquid crystal has a compromise orientation of molecules as shown in FIG. 15, the value of the refractive index ne is replaced by a refractive index ne' of extraordinary light which is an intermediate value between the refractive indices ne and no, and thereby it is possible to satisfy Conditions and Equations (5-3)–(5-20).

By constructing the liquid crystal lens as shown in FIG. 13, not only is the voltage applied continuously and variably, but also the voltage to be applied can be selected from among some discrete voltage values. In this case also, the variable focal-length lens is obtained.

Here, an actual example of the variable focal-length lens constructed as in FIG. 13 will be described in detail. Although the limit where P/λ approaches zero is given by Equation (5-20), the value of this limit may not necessarily hold for an actual liquid crystal lens or a variable focal-length lens. Thus, consider the approximation of Equation (5-3) to be introduced. The following equations are established even in the case where P/λ≧1.

When Equation (5-3) is approximated, taking account of the first order of P/λ, the following results are obtained. Specifically, when the first order of P/λ remains in Equations (5-12)–(5-14), that is, the first order of Γ/Φ remains in Equation (5-10) to neglect higher orders of P/λ and Γ/Φ, the following approximations are obtained:

$$\cos X - i\frac{\Gamma}{2}\frac{\sin X}{X} \approx \cos\left(\Phi + \frac{\Gamma}{4}\frac{\Gamma}{\Phi}\right) - i\frac{\Gamma}{2\Phi}\sin\left(\Phi + \frac{\Gamma}{4}\frac{\Gamma}{\Phi}\right) \quad (5\text{-}21)$$

$$\Phi\frac{\sin X}{X} \approx \sin\left(\Phi + \frac{\Gamma}{4}\frac{\Gamma}{\Phi}\right) \quad (5\text{-}22)$$

From Equations (5-20), (5-21), and (5-22), the following equation is derived:

$$W_t \approx e^{-i\alpha} R(-\Phi)\begin{pmatrix} \cos\left(\Phi + \frac{\Gamma}{4}\frac{\Gamma}{\Phi}\right) - i\frac{\Gamma}{2\Phi}\sin\left(\Phi + \frac{\Gamma}{4}\frac{\Gamma}{\Phi}\right) & \sin\left(\Phi + \frac{\Gamma}{4}\frac{\Gamma}{\Phi}\right) \\ -\sin\left(\Phi + \frac{\Gamma}{4}\frac{\Gamma}{\Phi}\right) & \cos\left(\Phi + \frac{\Gamma}{4}\frac{\Gamma}{\Phi}\right) + i\frac{\Gamma}{2\Phi}\sin\left(\Phi + \frac{\Gamma}{4}\frac{\Gamma}{\Phi}\right) \end{pmatrix} \quad (5\text{-}23)$$

$$\equiv W_{tN}$$

Hence, in order that the value of $W_{tN}$ can be thought of as nearly equal to the Jones' matrix of the isotropic medium, it is only necessary to make the value of $|i\Gamma/2\Phi|$ close to zero. In this case, $W_{tN}$ approaches the following matrix:

$$e^{-i\alpha}\begin{pmatrix} \cos\left(\frac{\Gamma}{4}\frac{\Gamma}{\Phi}\right) & \sin\left(\frac{\Gamma}{4}\frac{\Gamma}{\Phi}\right) \\ -\sin\left(\frac{\Gamma}{4}\frac{\Gamma}{\Phi}\right) & \cos\left(\frac{\Gamma}{4}\frac{\Gamma}{\Phi}\right) \end{pmatrix} \quad (5\text{-}24)$$

This equation means that the liquid crystal 1 rotates incident light by Γ/4·Γ/Φ for polarization, but can be thought of as the isotropic medium. Hence, a variable focal-length lens which does not cause the blurring of an image will be obtained when satisfying the following equation:

$$|i(\Gamma/2\Phi)|\approx 0 \quad (5\text{-}25)$$

that is, $$|\Gamma/2\Phi|<0.11 \quad (5\text{-}26)$$

From Equation (5-10), the following equation is derived:

$$\frac{\Gamma}{2\Phi} = \frac{1}{2}(n_e - n_0)\frac{P}{\lambda} \quad (5\text{-}27)$$

When the variable focal-length lens of the present invention is used for each of lenses employed in relatively low-cost products of actual photographing apparatuses with lenses, such as electronic cameras, VTR cameras, and electronic endoscopes, the number of pixels of the solid-state image sensor is small and thus a high resolution may not necessarily be required. Hence, Condition (5-26) can be moderated as follows:

$$|\Gamma/2\Phi|<1 \quad (5\text{-}28)$$

Since the high resolution is required for lenses of an electronic photographing apparatus with a large number of pixels and a product with high image quality, such as a film camera or a microscope, it is desirable to satisfy the following condition:

$$|\Gamma/2\Phi|<\pi/6 \quad (5\text{-}29)$$

In the case of a lens which is not used for image formation as in an optical disc, or an electronic photographing apparatus with a small number of pixels, the condition is further moderated as follows:

$$|\Gamma/2\Phi|<\pi \quad (5\text{-}30)$$

As is true of any embodiment, when the liquid crystal has a helical arrangement or when the major axes of the liquid crystal molecules are not perpendicular to the optical axis, namely oblique, it is only necessary to replace the refractive index ne corresponding to Equations and Conditions (5-1) and (5-26)–(5-30) with the refractive index ne'.

Some design examples are cited below. If the thickness d of the nematic liquid crystal is too small, the power of the lens will be reduced and the liquid crystal will be of no use as the lens. If it is too large, light will be scattered and flare will be caused. It is thus desirable that the thickness d satisfies the following condition:

$$2\mu<d<300\ \mu \quad (5\text{-}31)$$

In view of visible light, the wavelength λ of light must be so chosen as to satisfy the following condition:

$$0.35\mu<\lambda<0.7\mu \quad (5\text{-}32)$$

Although the value of (ne−no) is governed by the physical properties of the liquid crystal, most substances satisfy the following condition:

$$0.01<|ne-no|<0.4 \quad (5\text{-}33)$$

First design example d=15μ
λ=0.5μ
ne−no=0.2
P=0.06μ then

Γ/2Φ=(½)·0.2×0.06/0.5=0.012

This satisfies Conditions (5-20) and (5-28)–(5-30).

Second design example d=50μ
λ=0.6μ
ne−no=0.25
P=0.5μ then

Γ/2Φ=(½)·0.5×0.25/0.6=0.1042

This satisfies Conditions (5-26) and (5-28)–(5-30).

Third design example d=100μ
λ=0.55μ
ne−no=0.2
P=3μ then

Γ/2Φ=(½)·0.2×3/0.55=0.5454

This satisfies Conditions (5-28) and (5-30).

Fourth design example d=200μ
λ=0.95μ
ne−no=0.2
P=7μ then

Γ/2Φ=(½)·0.2×7/0.95=0.737

This satisfies Conditions (5-28) and (5-30).

In each of the design examples mentioned above, the nematic liquid crystal is used as an example. In order to make the pitch of twist of the nematic liquid crystal smaller than the wavelength of light used, it is good practice to mix a chiral dopant with the liquid crystal.

As the chiral dopants, cholesteric liquid crystals or optically active, synthetic compounds are used. The examples of the nematic liquid crystals are shown in chemical formulas (a) and (b) described below and the examples of the chiral dopants are shown in chemical formulas (c) and (d).

(a)

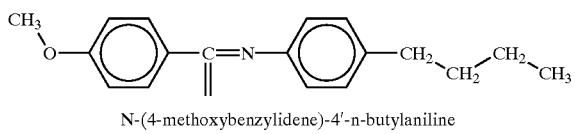

N-(4-methoxybenzylidene)-4'-n-butylaniline

-continued (b)

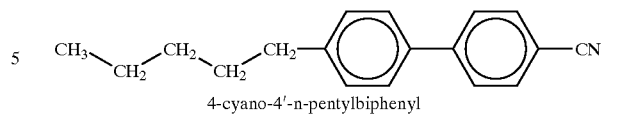

4-cyano-4'-n-pentylbiphenyl (c)

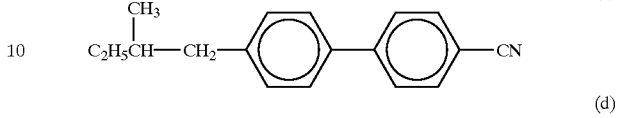

(d)

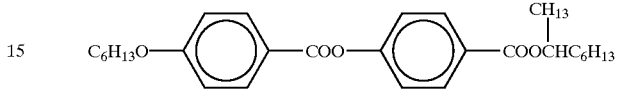

In Condition (5-30), when an example of a typical liquid crystal is considered as ne−no=0.1 it follows that (½)×0.1(P/λ)<λ

From this result, the following condition is obtained:

P<20π·λ≈62.8λ    (5-61)

Similarly, substitution of ne−no=0.1 in Condition (28) gives

P<20λ    (5-62)

Hence, if a liquid crystal is constructed to satisfy Condition (5-61) or (5-62) in accordance with a product using the liquid crystal, the variable optical-property element, such as the variable focal-length lens, with little blurring (flare) will be obtained. Conditions and Equations (5-1)–(5-30) hold for all the liquid crystals having the helical structures with the pitch P as well as for the nematic liquid crystals. As the examples of such liquid crystals, cholesteric liquid crystals, smectic liquid crystals, ferroelectric liquid crystals, and antiferroelectric liquid crystals are cited.

Figure 14:
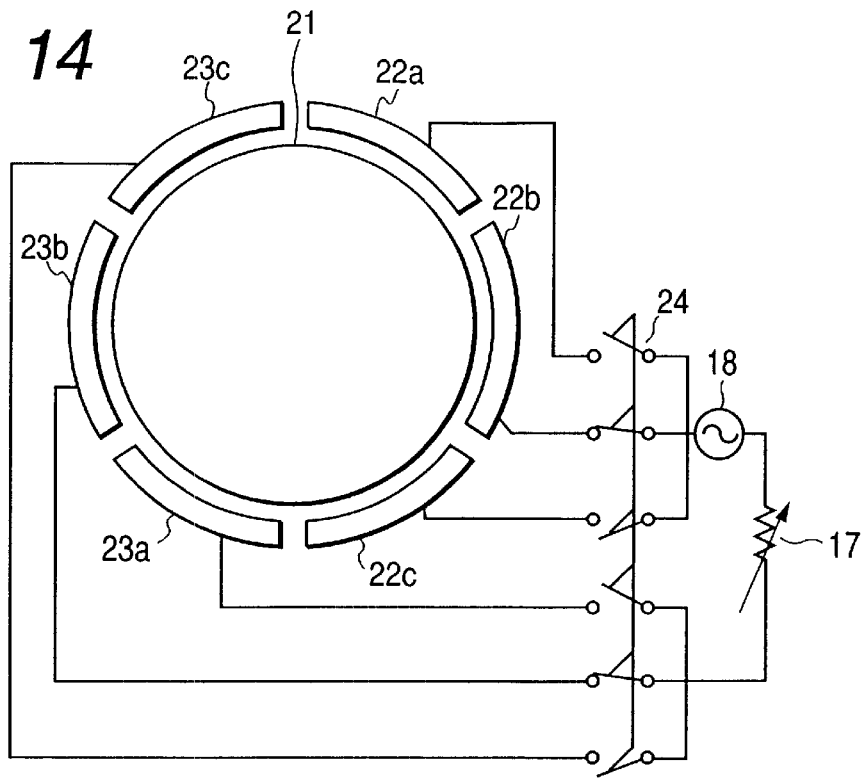
FIG. 14 is a view showing the liquid crystal lens looking at along the direction of the z axis in FIG. 13.

FIG. 14 shows the variable focal-length lens 21 used in the imaging device shown in FIG. 14, looking at from the Z direction. Electrodes 22a, 22b, 22c, 23a, 23b, and 23c divided into six pieces are placed close to the periphery of the variable focal-length lens 21 and are insulated from the transparent electrodes 3. These pairs of electrodes 22a and 23a; 22b and 23b; and 22c and 23c are such that AC voltages are applied in succession by a triple switch 24. In this way, the direction of the electric field is changed and thereby the orientation of the liquid crystal molecules becomes nearly isotropic. If the electric field is applied in only one direction, the helical structure of the liquid crystal molecules may be disrupted.

Subsequently, a description is given of the operation of the imaging device shown in FIGS. 12 and 14. When the switch 9 is turned on, the triple switch 24 is kept to an off state. Thus, the major axes of the molecules of the liquid crystal 20 become nearly parallel to the optical axis. In this case, a liquid crystal lens portion 25 becomes a negative lens with weak power.

Then, when the switch 9 is turned off and at the same time, the triple switch 24 is turned on, the electric field is applied in a lateral direction to the liquid crystal 20, and thus the orientation of the molecules of the liquid crystal 20 is shifted with high speed as shown in FIG. 13.

For a period T for switching voltages applied to three electrodes of the triple switch 24, there is the need to satisfy the following relationship. In the optical system shown in FIG. 13, when the triple switch 24 is in an off state and the switch 9 is in an on state and after some time, is turned off, the molecules of the liquid crystal 20 are naturally oriented as shown in FIG. 13 because of the orientational regulating force of the orientation films 2, even though the triple switch 24 is not turned on. Thus, when a time required to naturally orient the molecules as shown in FIG. 13 is represented by τ, it is necessary to have the following relation:

$$T \leq \tau \tag{7}$$

If the period T is too large to satisfy Condition (7), there is the fear that the helical structure of the molecules of the liquid crystal 20 may be disrupted and the orientation of the molecules of the liquid crystal 20 may be shifted to a homogeneous orientation parallel to the orientation films 2.

For Condition (7), it is only necessary to satisfy the following condition in practical use:

$$T \leq 10\tau \tag{7-1}$$

If this condition is not satisfied, much time may be required until the molecules of the liquid crystal 20 have a completely helical orientation when voltages applied to the electrodes 22 and 23 are low.

After the orientation of the molecules of the liquid crystal 20 has been returned to a state shown in FIG. 13, the triple switch 24 may be turned off discontinuously. In other words, the triple switch 24 may be kept to an on state only while the orientation of the molecules of the liquid crystal 20 changes from a homeotropic orientation in a state parallel with the optical axis 6 to the helical orientation shown in FIG. 13 caused even when the switch 9 is turned off. Consequently, an electric power can be saved, which is advantageous.

As shown in FIG. 15, the variable resistors 13 and 17 are properly adjusted so that the molecules of the liquid crystal 20 are oriented to be oblique with respect to the optical axis, and thereby the focal length of the variable focal-length lens 21 can be continuously changed. That is, this lens is convenient for use in a zoom lens system.

Figure 16:
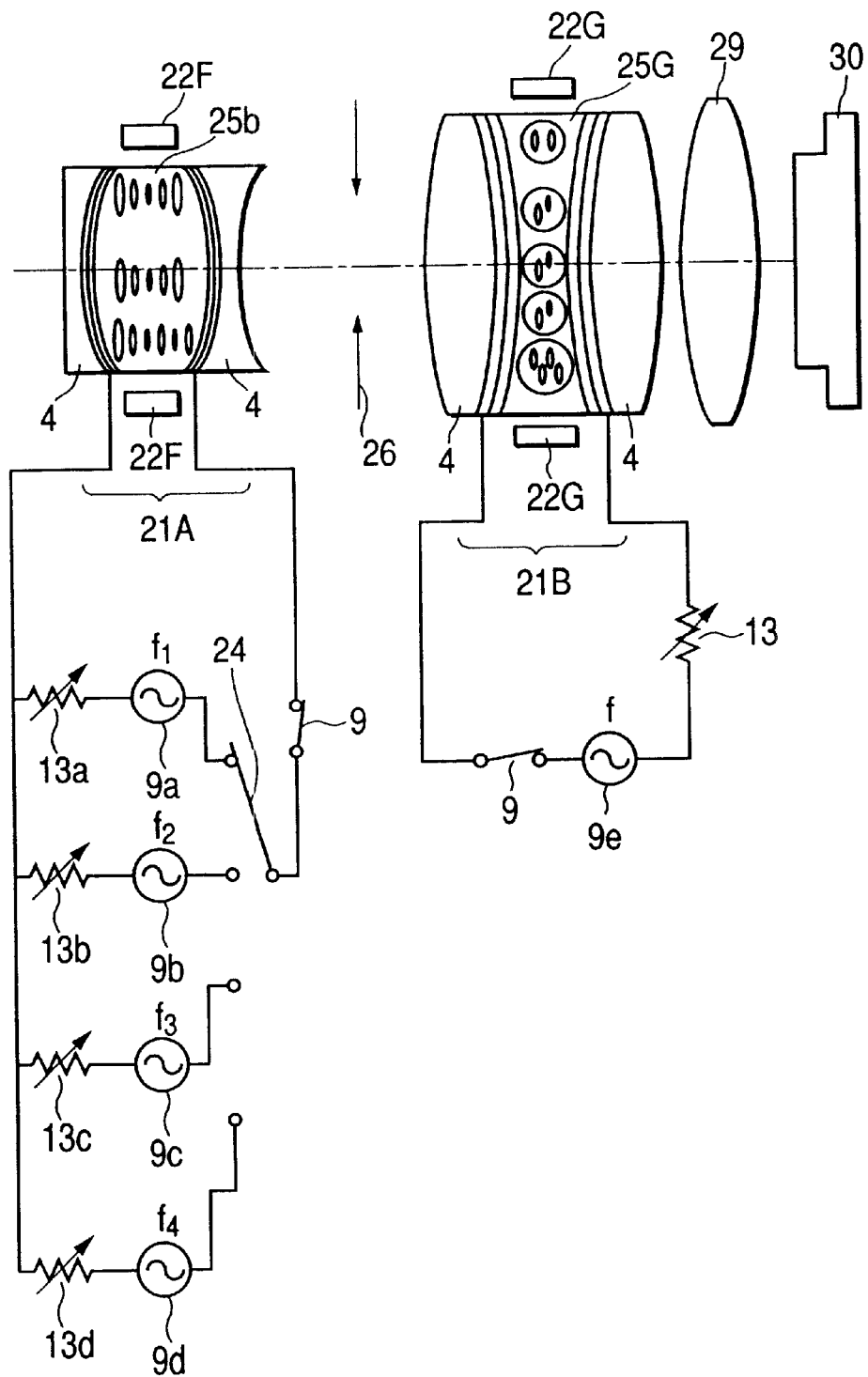
FIG. 16 is a view showing an imaging device provided with zoom lenses using the liquid crystal lenses of the present invention.

FIG. 16 shows an embodiment in which the variable focal-length lens shown in FIGS. 13 or 15 is used in a zoom lens system. In this figure, each of reference numerals 21A and 21B corresponds to the variable focal-length lens 21 shown in FIG. 13. The variable focal-length lenses 21A and 21B are front and rear lens units respectively arranged before and behind a stop 26. That is, this zoom lens system includes the front lens unit with negative refracting power, composed of the variable focal-length lens 21A having a negative function and the rear lens unit with positive refracting power, as a whole, composed of the stop 26, the variable focal-length lens 21B having a positive function, and a positive lens 29. By changing the focal lengths of the variable focal-length lenses 21A and 21B without mechanically moving individual lenses, the focal length of the entire lens system and the movement of an image plane can be corrected. Likewise, the focusing operation can be performed. In this embodiment, when the variable focal-length lens 21A is energized to change the focal length, the strength of the electric field applied to a liquid crystal 25b is not changed, but the frequency of the electric field is changed to four stages of $f_1$, $f_2$, $f_3$, and $f_4$. In this way, a liquid crystal in which the sign of the dielectric anisotropy changes with the frequency is used. When the frequencies $f_1$, $f_2$, $f_3$, and $f_4$ are determined as $f_1 < f_2 < f_3 < f_4$, the dielectric anisotropies of the liquid crystal 25b are so chosen as to have signs opposite to each other at the frequencies $f_1$ and $f_4$.

In this zoom lens system, the frequency is changed by turning the switch 24. In this case, electrodes 22F may be eliminated. The frequencies $f_1$, $f_2$, $f_3$, and $f_4$, instead of being changed gradually, may be changed continuously. Moreover, when the frequency is changed, the strength of the electric field may also be changed at the same time.

Each of the liquid crystal lenses 21A and 21B may use not only the helical liquid crystal, but also the macromolecular dispersed liquid crystal in which a liquid crystal that the dielectric anisotropy varies with the frequency is dispersed among macromolecules. The variable focal-length lens 21B is an example of the variable optical-property element using the macromolecular dispersed liquid crystal.

An AC power supply 9e capable of continuously changing the frequency is connected to the two electrodes 3. The frequency of the AC power supply is varied and thereby the focal length of the optical element can be changed.

By associating the liquid crystal lens 21A with the liquid crystal lens 21B, the zooming operation can be performed. In addition, if only the liquid crystal lens 21B is energized, the focusing operation can be performed.

Electrodes 22G need not necessarily be used, or voltages applied to the electrodes 22G may be changed in association with a change of a frequency f of the AC power supply 9e.

In the imaging device shown in FIG. 13, the liquid crystal lens, instead of using the liquid crystal 20, may use the chiral cholesteric liquid crystal, chiral smectic liquid crystal, ferroelectric liquid crystal, antiferroelectric liquid crystal, liquid crystal with the negative anisotropy of refractive index, ferroelectric macromolecular dispersed liquid crystal, etc. Conditions (5-26), (5-28)–(5-30), (5-61), (5-62), (6), (7), and (7-1) also hold for the case where each of these liquid crystals is used.

Figure 17:
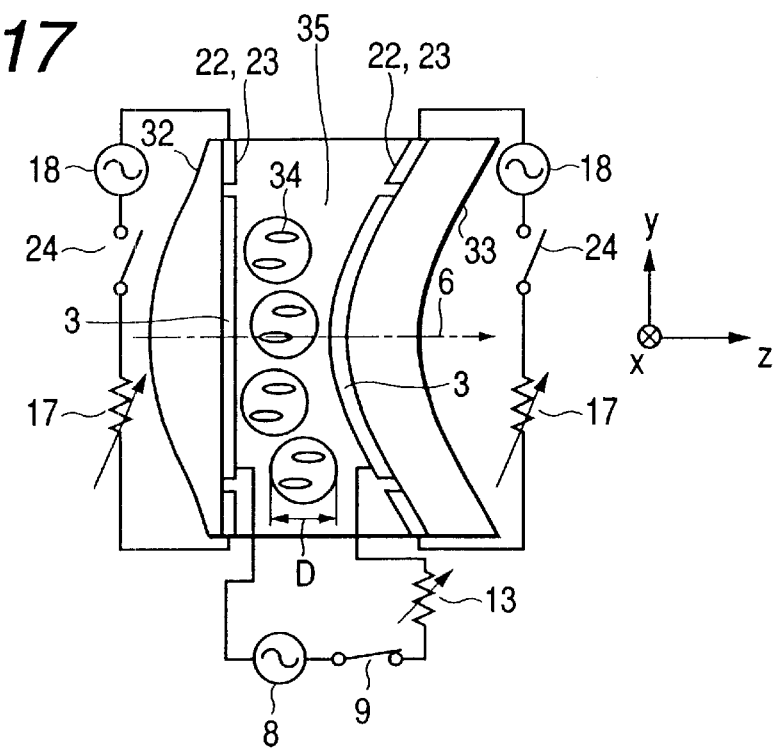
FIG. 17 is a view showing a liquid crystal lens using a polymer.

An optical system shown in FIG. 17 is such that, instead of the liquid crystal 20 of FIG. 13, cells with the average diameter D including nematic liquid crystal molecules 34 are arranged granularly in a polymer. In this embodiment, the divided electrodes 22 and 23 are actuated as in FIG. 13, but are arranged on the peripheries of lenses 32 and 33 so that they are insulated from the transparent electrodes 3. The operation of the triple switch 24 is the same as in the optical system of FIG. 13.

Figure 18:
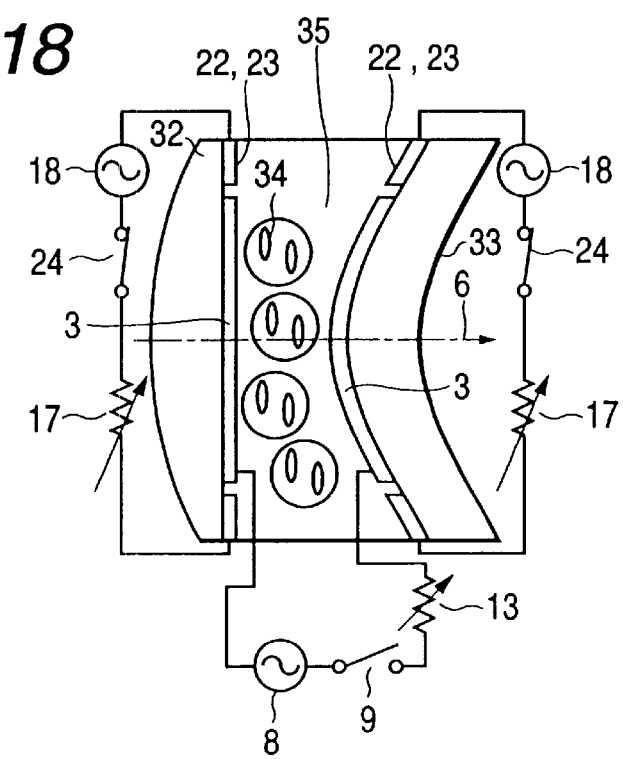
FIG. 18 is a view showing a state where an electric field is applied to the liquid crystal of FIG. 17.

In the optical system shown in FIG. 17, when the switch 9 is in an on state, the liquid crystal molecules 34 hold an homeotropic orientation, while when the switch 9 is turned off and the triple switch 24 is on, the electric field is applied to the liquid crystal molecules 34 in a lateral direction, and the liquid crystal molecules 34, although somewhat random, are oriented parallel to the x-y plane with high speed as shown in FIG. 18. Conditions (7) and (7-1)) also hold for the optical system shown in FIGS. 17 and 18.

As mentioned above, the liquid crystal molecules 34, as in FIG. 18, are oriented nearly perpendicular to the optical axis 6, and thus this liquid crystal lens excels in bringing about a greater change of the refractive index of a liquid crystal 35.

Here, if the average diameter D of the liquid crystal molecules 34 satisfies the following condition, the scattering of light can be prevented, which is favorable:

$$D < \lambda/5 \tag{8}$$

Where the thickness of the liquid crystal 35 is relatively small, there is no problem in practical use if the diameter D satisfies the following condition, instead of Condition (8):

$$D < 2\lambda \tag{8-1}$$

Now, the volume ratio between the liquid crystal 35 and the liquid crystal molecules 34 is represented by ff. In order to bring about a sufficient effect as the variable focal-length lens, it is desirable to satisfy the following condition:

$$0.5 < f\!f < 0.999 \quad (9)$$

If the value of the ratio ff exceeds the upper limit of Condition (9), the amount of polymer will be so reduced that the fine cells of the liquid crystal molecules 34 cease to be formable. Below the lower limit, the effect of the variable focal-length, namely the amount of change of the focal length is reduced.

In an attempt to increase the amount of polymer so that the liquid crystal 35 approaches a solid phase, it is desirable to satisfy the following condition, instead of Condition (9):

$$0.1 < f\!f < 0.5 \quad (9\text{-}1)$$

Figure 19:
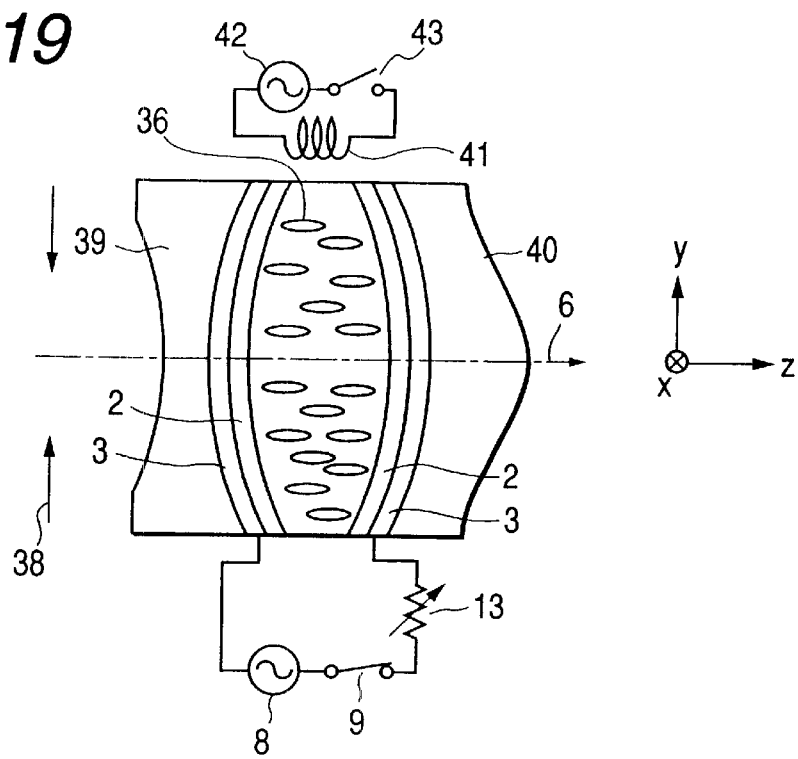
FIG. 19 is a view showing a liquid crystal lens provided with a heater.

FIG. 19 shows the embodiment of an optical system in which the refractive index of a liquid crystal is changed by temperature in the present invention. At a transition temperature Tc or less, a nematic liquid crystal 36 having a positive anisotropy of refractive index, as illustrated in FIG. 19, shows the homeotropic orientation in which the major axes of molecules point in the z direction and lies in a state of the refractive index no which is relatively low. In this case, the switch 9 is in an on state.

Figure 20:
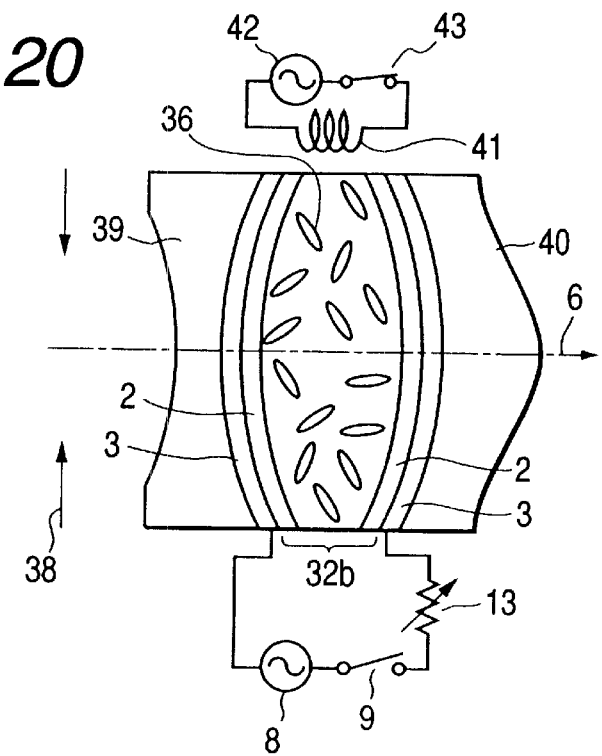
FIG. 20 is a view showing a change of the orientation of liquid crystal molecules caused by heating of the heater in FIG. 19.

When a switch 43 of a heater 41 is turned on and the liquid crystal 36 is heated by the heater 41 so that the temperature of the molecules of the liquid crystal 36 becomes higher than the transition temperature Tc, as shown in FIG. 20, the liquid crystal 36 changes to a transparent liquid in which the molecules of the liquid crystal 36 move randomly. In this case, the switch 9 is kept in an off state. In a state of FIG. 20, the refractive index n of the liquid crystal 36 is given by $$n = (2no + ne)/3 \quad (10)$$

In other words, the refractive index n of the liquid crystal becomes higher and consequently, the refracting power of a positive lens 32b is strengthened.

In a state of FIG. 19, If the orientational regulating force by the orientation films 2 is sufficient, the switch 9 may be turned off. However, when the switch 9 is turned on, the molecules of the liquid crystal 36 are regularly arranged, and thus the scattering of light caused by the molecules of the liquid crystal 36 can be prevented, which is favorable.

In order to cause a liquid phase transition to the liquid crystal, the optical system uses the heater 41 for heating, but the frequency of the AC power supply may be increased to thereby heighten vibrations of the molecules of the liquid crystal 36 so that the temperature is raised and the phase transition is made.

The variable optical-property element of the present invention stated above is constructed so that the strength and direction of the electric field are mainly varied to thereby change the orientation of the molecules of the liquid crystal constituting the optical element. However, the orientation of the liquid crystal can be shifted not only by varying the strength of the electric field, but also by changing the frequency of the electric field. Moreover, the orientation of the molecules of the liquid crystal can also be shifted by changing the strength of the magnetic field.

Techniques of shifting the orientation of the molecules of the liquid crystal by changing the frequency of the electric field applied to the liquid crystal and of changing the strength of the magnetic field applied to the liquid crystal as mentioned above are applicable to the optical systems cited as examples in FIGS. 2, 4, 9, 10, 13, 16, 17, and 20, and FIG. 21 described below.

In the technique of shifting the orientation of the molecules of the liquid crystal by changing the frequency of the electric field, the use of a liquid crystal in which the positive sign of the anisotropy of refractive index is replaced with the negative sign is particularly advantageous because the orientation of the molecules of the liquid crystal can be shifted with high speed in accordance with the change of the frequency of the electric field.

Figure 21:
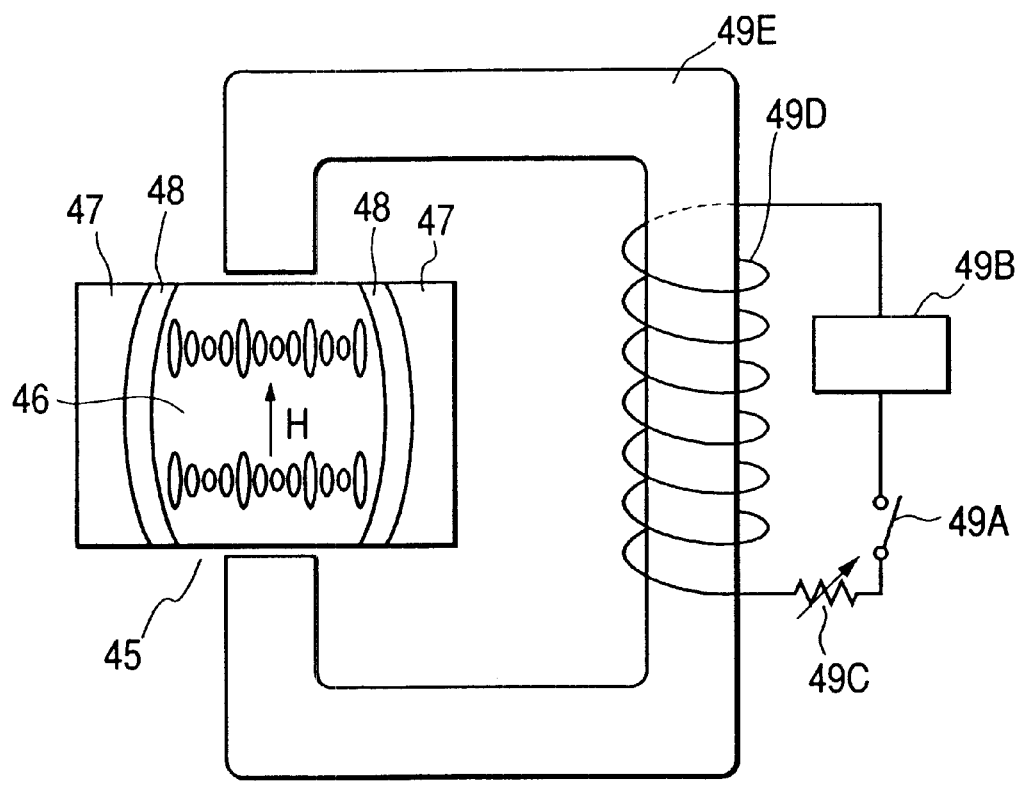
FIG. 21 is a view showing an example in which the orientation of liquid crystal molecules is changed by a magnetic field.

FIG. 21 shows a lens in which the refractive index is changed by the magnetic field H. In this figure, reference numeral 45 denotes a lens; 46, a substance possessing a magnetrooptical effect; 47, substrates; 48, orientation films; 49A, a switch; 49B, an AC power supply; 49C, a variable resistor; 49D, a coil; and 49E, an iron core.

As an example of the substance 46, lead glass, quartz, or a liquid crystal is cited. In the case of the liquid crystal, it is favorable to use the orientation films 48.

In order to shift the orientation of the molecules of the liquid crystal with high speed, it is desirable to previously applying some degree of voltage instead of removing the voltage. In this way, where the orientation is changed, the voltage is made higher and thereby the orientation can be shifted with high speed.

The embodiment shown in FIG. 13, which is the imaging device for digital cameras of the present invention using the variable optical-property element, will be described in more detail below.

In FIG. 13, an optical system 31 is placed which is constructed with the variable focal-length liquid crystal 21 including the liquid crystal lens portion 25 and a negative lens 28 and a positive lens 29 behind the stop 26. The positive lens 29 is provided for the purpose of rendering a chief ray incident perpendicular or nearly perpendicular to a solid-state image sensor 30, for example, at an angle of 90±20° with the light-receiving surface of the image sensor. The negative lens 28 is provided the purpose of improving the Petzval sum to correct curvature of field. A positive lens 27 situated on the side of the stop 26 (the entrance side) is such that its object-side surface is convex and thereby spherical aberration is favorably corrected. The liquid crystal lens portion 25 assumes the shape of a negative lens to correct chromatic aberration. One of the surfaces of the lenses 27, 28, and 29 is configured to be aspherical and thereby aberrations can be more favorably corrected. It is desirable that the liquid crystal lens portion 25 is located close to the stop 26 because the effective diameter of the liquid crystal lens portion 25 can be diminished and the thickness can be reduced.

When the orientation of the molecules of the liquid crystal 20 in the liquid crystal lens portion 25 is shifted, the aberration of the optical system 31 including the positive lens 27, the liquid crystal lens portion 25, the negative lens 28, and the positive lens 29 fluctuates, and the scattering of light caused by the liquid crystal lens portion 25 varies, thereby changing the MTF (modulation transfer function) of the optical system 31.

The imaging device shown in FIG. 13 is designed so that the change of the MTF caused by the fluctuation of the aberration and the variation of the scattering of light is compensated by an electronic circuit. That is, the compensation for the change of the MTF caused when the focal length of the liquid crystal lens 21 is change to perform the focusing operation due to a shift of the position of an object is made by varying an enhance circuit or an image processing circuit in a circuit system 44. Specifically, it is only necessary to use a means of changing the characteristics of a digital filter like a Wiener filter or changing the amount of edge enhance of the enhance circuit. Here, the change of the MTF may be derived from the design data of the optical system 31 or the amount of compensation of the MTF may be changed by actually measuring each camera.

Figure 22:
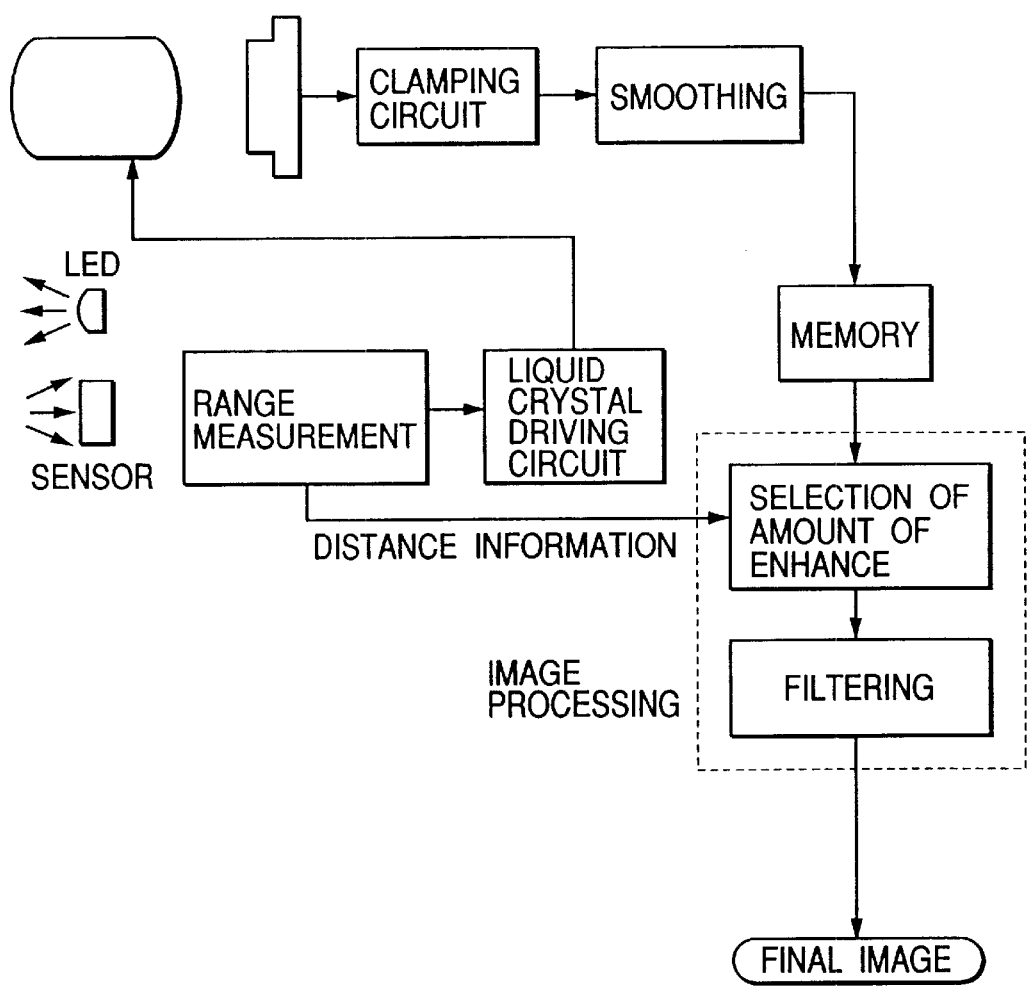
FIG. 22 is a diagram showing an electronic circuit for correcting an image derived from the imaging device of the present invention.

FIG. 22 shows a diagram in which a range measurement on an infrared projecting, active range finding technique is made with respect to the compensation by the electronic circuit. On distance information derived here, the amount of enhance is selected to compensate the change of the MTF of the liquid crystal lens. Subsequently, the digital filter is used and the final image is obtained.

Figure 23:
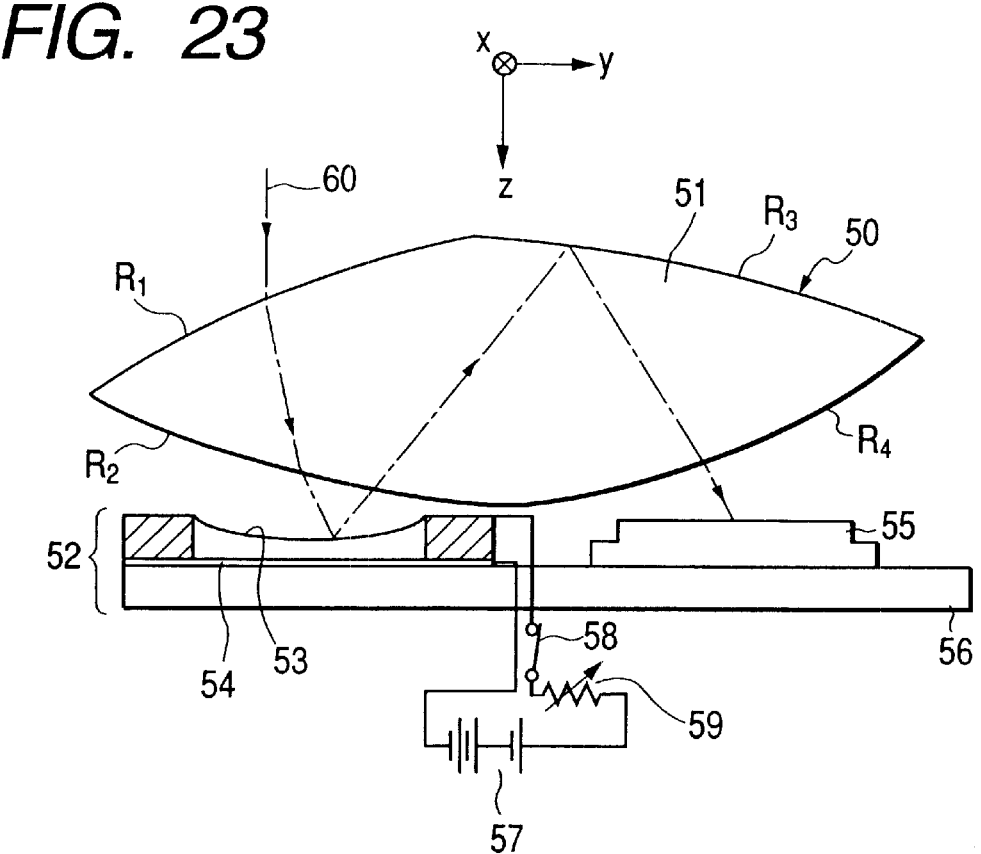
FIG. 23 is a view showing an imaging device using a variable focal-length mirror.

FIG. 23 shows a digital camera 50 using an extended surface prism 51 (a prism having extended surfaces) in the present invention. Reference numeral 52 represents a variable focal-length mirror; 53, a thin film coated with aluminum; 54, an electrode; 55, a solid-state image sensor; 56, a substrate; 57, a power supply; 58, a switch; and 59, a variable resistor.

As an example of the variable focal-length mirror 52, a membrane mirror is cited which is set forth in "Quick focusing of imaging optics using micromachined adaptive mirrors", by Gleb Vdovin, Optics Communications, Vol. 140, pp. 187–190, 1997. When a voltage is applied across the electrode 54, the thin film 53 is deformed by an electrostatic force and the focal length of a reflecting mirror is changed. In this way, a focusing adjustment can be made. Light 60 from an object is refracted by surfaces $R_1$ and $R_2$, and after being reflected by the reflecting mirror (thin film) 53 and a surface $R_3$ of the extended surface prism 51, is refracted by a surface $R_4$ and falls on the solid-state image sensor 55.

Thus, this device constructs an imaging optical system with the extended surfaces $R_1$, $R_2$, $R_3$ and $R_4$ and the reflecting mirror 53. In particular, by optimizing the shapes of the extended surfaces $R_1$, $R_2$, $R_3$, and $R_4$, aberration of an object image is reduced to a minimum.

In the imaging device of FIG. 23, in order to correct astigmatism, it is desirable that the aperture of the reflecting mirror is shaped into an elliptic form which has its major axis along the direction of the y axis, that is, of a line that a plane including incident light on the reflecting mirror 52 and emergent light therefrom crosses the reflecting mirror 52. In this figure, the reflecting mirror 52, the thin film 53, and the solid-state image sensor 55 are constructed to be independent of one another and placed on the substrate 56. Since, however, the reflecting mirror 52 and the thin film 53 can also be fabricated through a silicon lithography process, the substrate 56 may be constructed of silicon so that at least one part of the reflecting mirror 52 is fabricated, together with the solid-state image sensor 55, on the substrate 56 by the lithography process.

In this way, the reflecting mirror 52 is integrated with the image sensor 55, and this is advantageous for compactness and a reduction in cost. Moreover, the reflecting mirror 52 may be constructed with a fixed-focus mirror. In this case also, the reflecting mirror 52 can be made through the lithography process.

A reflection type liquid crystal display or a transmission type liquid crystal display, although not shown in the figure, may be constructed integrally with the substrate 56 through the lithography process. The substrate 56 may be made of glass, and it is only necessary to construct the solid-state image sensor and the liquid crystal display on this glass substrate through the technique, for example, of a thin film transistor. The extended surface prism 51 is configured with plastic or glass molding and thereby curved surfaces of any desired shape can be easily configured and fabrication is simplified.

Figure 24:
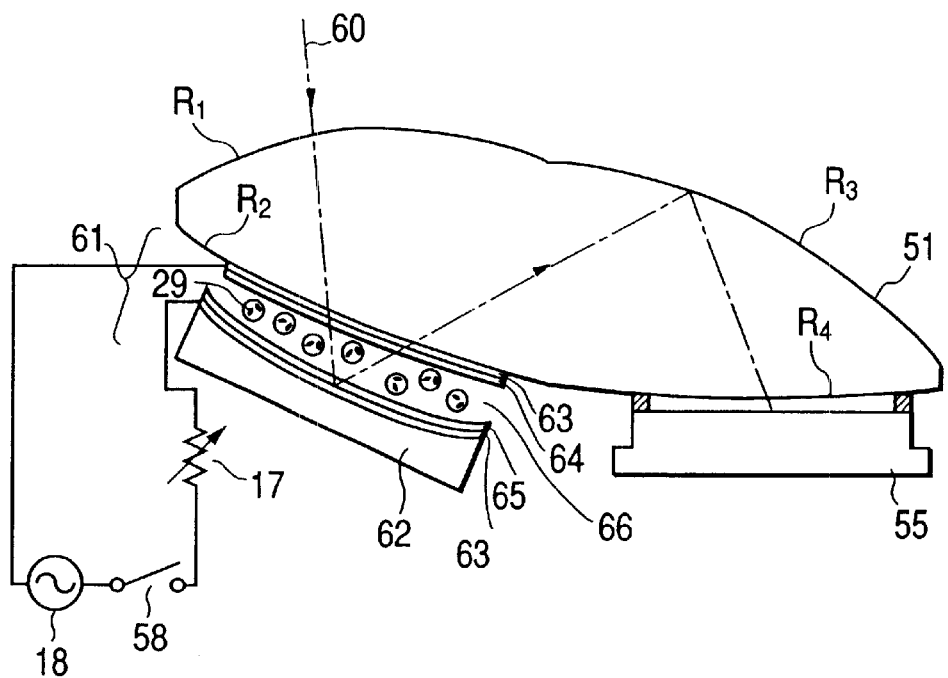
FIG. 24 is a view showing one modification example of the mirror of FIG. 23.

FIG. 24 shows another digital camera using the extended surface prism 51. This digital camera, instead of using the reflecting mirror 52 of the digital camera in FIG. 23, uses a variable focal-length mirror 61. The variable focal-length mirror 61 is provided integrally with the extended surface prism 51 on the surface $R_2$ of the prism 51. The variable focal-length mirror 61 is comprised of a reflecting mirror 62, transparent electrodes 63, one of which is provided on the surface $R_2$ of the prism 51, and orientation films 64 and 65 and has a liquid crystal 66 between the orientation films 64 and 65. Here, the variable focal-length mirror 61 may be constructed to be independent of the extended surface prism 51 so that both are cemented or the electrode 63 and the orientation film 64 may be provided on the surface $R_2$ of the prism 51.

The light 60 incident on the digital camera from the object, as in FIG. 23, is refracted by the surfaces $R_1$ and $R_2$ and after being reflected by the reflecting mirror 62, passes through the orientation film 65, the liquid crystal 66, the orientation film 64, and the transparent electrode 63 to enter the extended surface prism 51. After reflection by the surface $R_3$ and emergence from the surface $R_4$, the light falls on the light-receiving surface of the solid-state image sensor 55. Here, when the voltage applied to the variable focal-length mirror 61 is varied, the focal length of the mirror 61 is changed and thus the focusing adjustment can be made.

The macromolecular dispersed liquid crystal is used for the liquid crystal 66 of the variable focal-length mirror 61. As described in connection with FIGS. 16–18, the electric field applied to the liquid crystal 104 is changed and thereby the situation is changed, for example, from FIG. 17 to FIG. 18. Consequently, the refractive index of the liquid crystal is changed and the focal length of the variable focal-length mirror is varied.

The digital camera shown in FIG. 24 has the same function as a digital camera using the liquid crystal lens of FIG. 17 even though the electrodes 22 and 23 of FIG. 17 are not used. Specifically, in FIG. 24, when the switch 58 is turned off, the molecules of the liquid crystal are oriented randomly in a state of high refractive index. Hence, the variable focal-length mirror 61 has a strong function of converging the light. Here, when the switch 58 is turned on, the molecules are oriented in one direction, and thus the refractive index becomes lower, reducing the function of converging the light. In this way, the focusing adjustment of the variable focal-length mirror 61 is performed. If at least two variable focal-length mirrors 61 are used in the extended surface prism 51, this device can be used as a zoom lens system.

The variable focal-length mirror 52 shown in FIG. 23 may be replaced with the variable focal-length mirror 61 of FIG. 24. In this case, the orientation films 64 and 65 need not necessarily be used. In addition, the transparent electrode 63 may be substituted by the reflecting mirror 62 also used as an electrode which is constructed as the liquid crystal optical element of the variable focal-length mirror 61. Instead of the macromolecular dispersed liquid crystal 66, the nematic liquid crystal of a helical orientation, as well as the cholesteric liquid crystal and the smectic liquid crystal, may be used.

Figure 25:
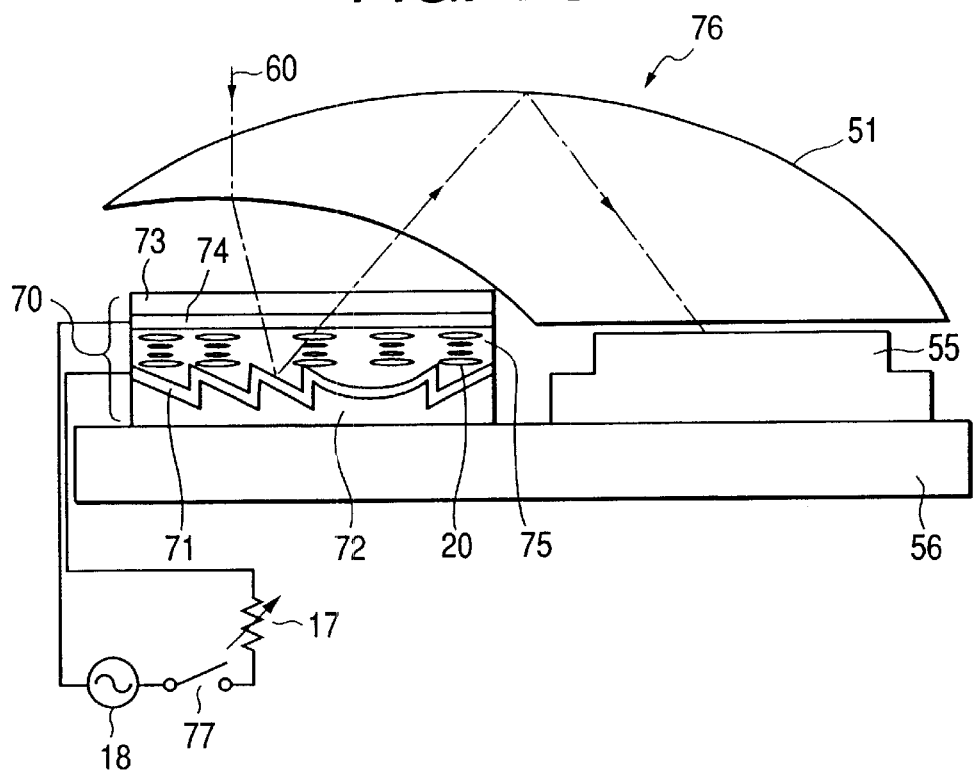
FIG. 25 is a view showing another modification example of the mirror.

FIG. 25 shows an example in which a diffraction optical element 70 is used instead of the reflecting mirror 52 or the variable focal-length mirror 61 shown in FIGS. 23 or 24. The diffraction optical element 70 is constructed with a diffraction surface 71 configured on a reflecting mirror 72, a transparent electrode 73, an orientation film 74, and a liquid crystal 75.

In a digital camera 76 shown in FIG. 25, the light 60 from the object, as in the above embodiment, is incident on the extended surface prism 51, and after being transmitted through the prism 51, enters the diffraction optical element 70. The light, after being diffracted by the diffraction surface 71, leaves the diffraction optical element 70 and is again incident on the extended surface prism 51. By being reflected as shown in the figure, the light emerges from the prism 51 and falls on the solid-state image sensor 55.

Here, when a switch 77 is turned on, the orientation of the molecules of the liquid crystal 20 is shifted so that the molecules are oriented in a vertical direction, and the order of diffraction of the diffraction optical element 70 is changed. In this way, the focal length is varied and the focusing operation can be performed. In this case, the pitch of the molecules of the liquid crystal 20, as in FIG. 13, satisfies Condition (6). In this embodiment, the diffraction surface 71 is configured as a reflecting surface, and a reflection type diffraction optical element is presented.

Figure 26:
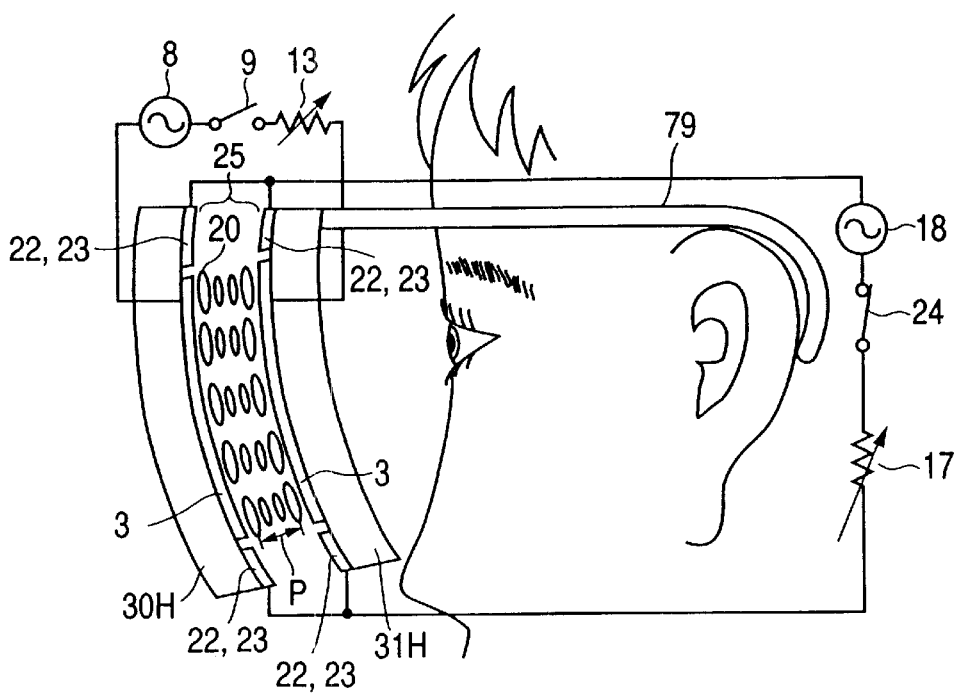
FIG. 26 is a view showing variable focal-length spectacles.

FIG. 26 illustrates variable focal-length spectacles, each having the variable focal-length lens. The variable focal-length lens is used as an eyeglass lens. The variable focal-length lens including lenses 30H and 31H, the orientation films (not shown), and the electrodes (whose part is not shown) is attached to a frame 79 of the spectacles.

In this variable focal-length lens, the electrodes 22 and 23, as in FIG. 16, are provided on the peripheries of the lenses 30H and 31H. When the electrodes 22 and 23 are configured as transparent electrodes, the periphery of the visual field of the spectacles becomes bright, which is favorable.

In the embodiments mentioned above, the variable focal-length lens is chiefly used as the variable optical-property element, but a diffraction optical element, Fresnel lens, prism, or lenticular lens may be used as the variable optical-property element. It is merely necessary that a portion subjected to the diffraction or reflection of light, constituting each element, is replaced by a variable refractive-index substance, that is, a liquid crystal, ferroelectric, or substance possessing an electrooptic effect. In order to shift the orientation of the molecules of the liquid crystal, the frequency of an electric or magnetic field may be changed.

The optical system using the variable optical-property element of the present invention stated above can be employed in a photographing device in which an object image is formed and received by an image sensor, such as a CCD or a silver halide film, for photography, notably a camera or an endoscope. Furthermore, the optical system can also be used as an observation device for observing an object image through an eyepiece, and in particular, as an objective optical system which is a part of the finder of a camera. The embodiments of such optical systems are described below.

Figure 27:
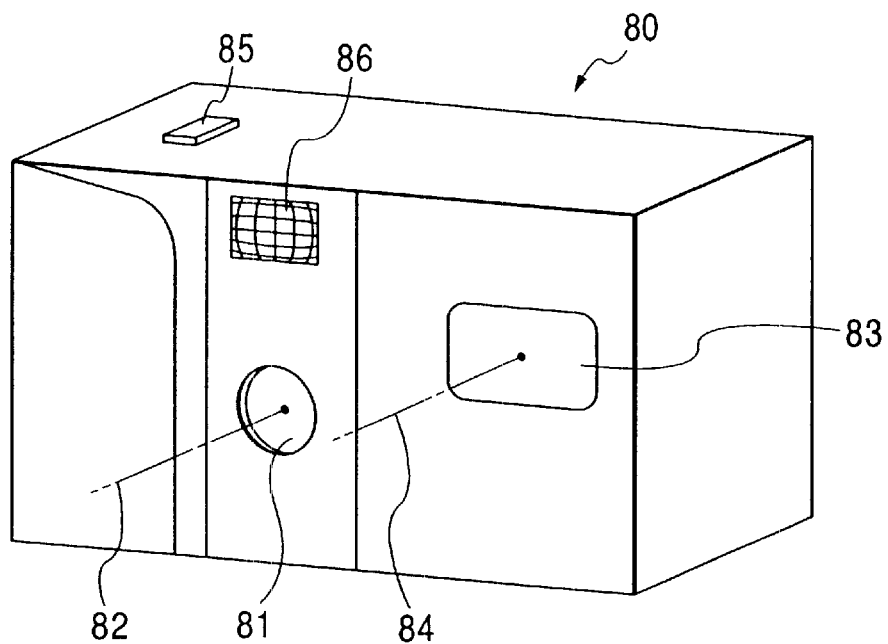
FIG. 27 is a front perspective view showing an electronic camera in which the variable optical-property element of the present invention is incorporated in a finder optical system.
Figure 28:
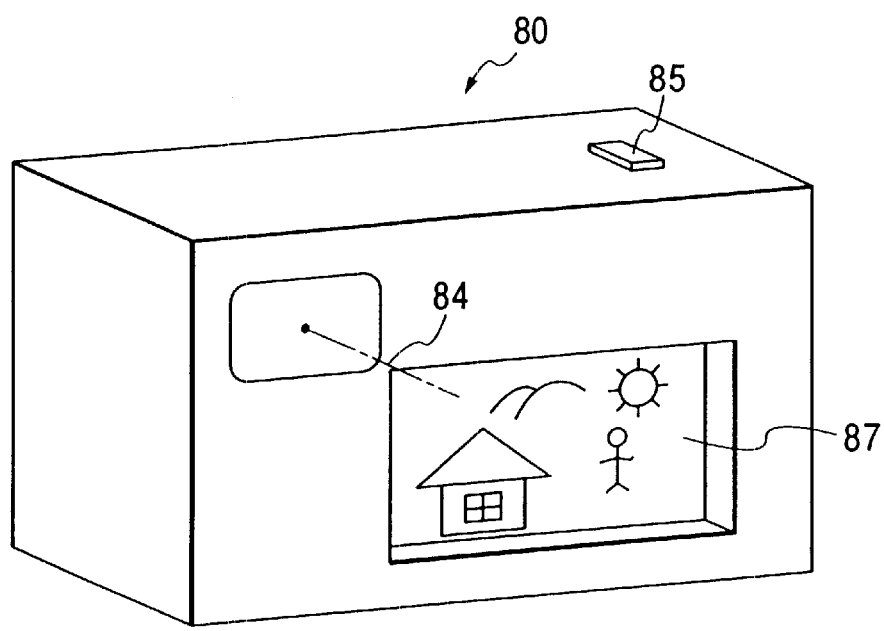
FIG. 28 is a rear perspective view showing the electronic camera of FIG. 27.
Figure 29:
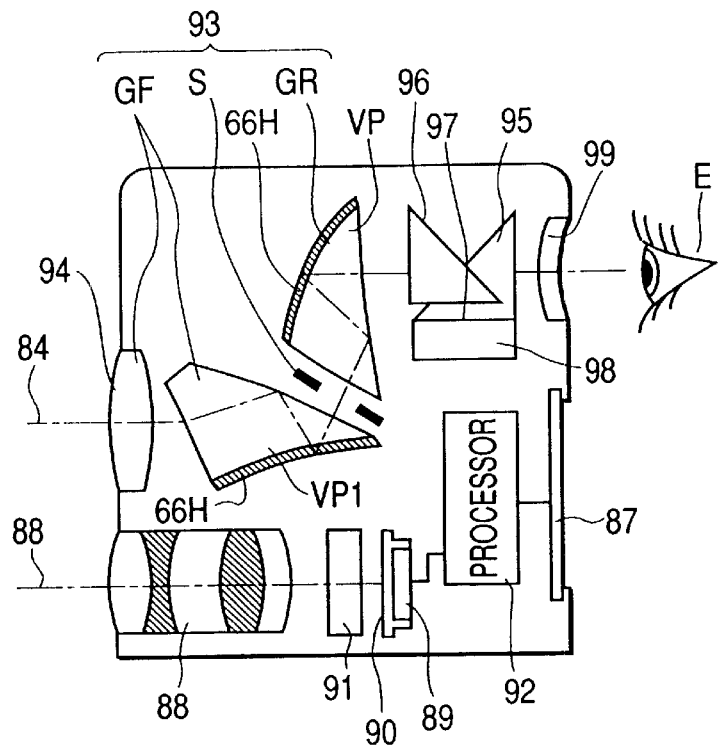
FIG. 29 is a view showing the interior arrangement of an electronic camera to which the present invention is applied.

In FIGS. 27, 28, and 29, an electronic camera 80 includes a photographing optical system 81 having a photographing optical path 82, a finder optical system 83 having a finder optical path 84, a release 85, a flash lamp 86, and a liquid crystal display monitor 87. When the release 85 provided on the upper side of the camera 80 is pushed, photography is performed through a photographing objective optical system 88 in association with the operation of the release 85. The photographing objective optical system 88 is provided with a plurality of transmission type variable optical-property elements (using liquid crystals here, indicated by hatching portions in the figure) to perform the zooming and focusing operations. An object image formed by the objective optical system 88 falls on an imaging surface 90 of a CCD 89 through a filter 91 such as a low-pass filter or an infrared cutoff filter. The object image received by the CCD 89 is displayed as an electronic image, through a processing means 92, on the liquid crystal display monitor 87 provided on the back side of the camera 80. The processing means 92 has a memory and is also capable of recording the electronic image photographed. Also, this memory may be provided to be independent of the processing means 92 or may be designed to electronically execute record/write with a floppy disk. The camera may be constructed as a silver halide film camera provided with a silver halide film instead of the CCD 89.

Moreover, on the finder optical path 84, an imaging optical system provided with reflection type variable optical-property elements 66H is placed as a finder objective optical system 93. A cover lens 94 with positive power is provided as a cover member to enlarge an angle of view. The cover lens 94 and a prism VP1 situated on the object side of a stop S of the imaging optical system constitute a front lens unit GF of the finder objective optical system 93, while a prism VP situated on the image side of the stop S constitutes a rear lens unit GR thereof. The variable optical-property elements 66H are arranged respectively in the front and rear lens units GF and GR sandwiching the stop S therebetween, and thereby the zooming and focusing operations are performed. This optical system uses the reflection type variable optical-property elements, each of which is constructed integrally with a reflecting prism. The liquid crystals 66H are used in these elements, and the zooming and focusing operations are performed by changing the optical property as mentioned above. The control of the properties of each liquid crystal is made by the processing means 92 in association with the zooming and focusing operations of the photographing objective optical system. An object image formed by the finder objective optical system 93 is placed on a field frame 97 of a Porro prism 95 which is an image erecting member. The field frame 97 separates a first reflecting surface 96 of the Porro prism 95 from a second reflecting surface 98, and is interposed between them. An eyepiece optical system 99 which introduces an erect image into an observer's eye E is placed behind the Porro prism 95.

In the camera 80 designed as mentioned above, the finder objective optical system 93 can be constructed with a small number of optical members, and high performance and compactness are achieved. Furthermore, since the optical path of the objective optical system 93 can be bent, the number of degrees of freedom of layout in the camera is increased, and this is advantageous for design.

Figure 30:
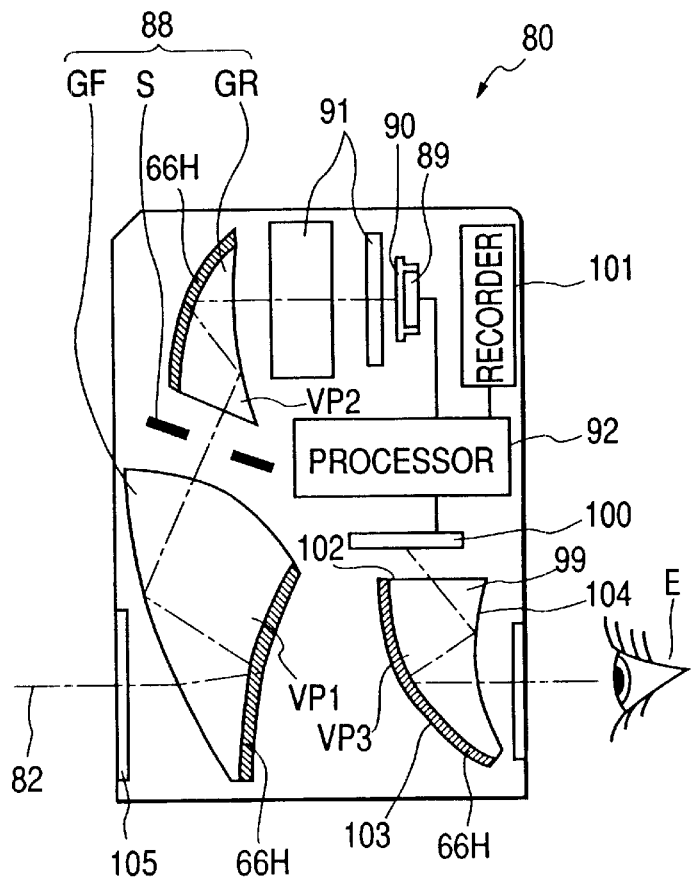
FIG. 30 is a view showing one modification example of the embodiment of FIG. 29.

FIG. 30 shows a case where the imaging optical system of the present invention is incorporated in the objective optical system 88 of the photographing section of the electronic camera 80. In this case, the photographing objective optical system 88 situated on the photographing optical path 82 is an imaging optical system using the reflection type variable optical-property elements. An object image formed by the photographing objective optical system 88 falls on the imaging surface 90 of the CCD 89 through the filters 91 such as a low-pass filter and an infrared cutoff filter. The object image received by the CCD 89 is displayed as an electronic image, through the processing means 92, on a liquid crystal display (LCD) 100. The processing means 92 also controls a recording means 101 which records the object image obtained by the CCD 89 as electronic information. The object image displayed on the LCD 100 is introduced through the eyepiece optical system 99 into the observer's eye E. The eyepiece optical system 99 includes a decentered prism VP3 provided with the variable optical-property element 66H which has the same aspect as that used in the imaging optical system of the present invention. By controlling the properties of the element 66H, the depth of a virtual image in the LCD 100 can be adjusted in accordance with the diopter of the observer. The prism VP3 includes an entrance surface 102, a reflecting surface 103, and a surface 104 used for both reflection and refraction. At least one of the surfaces 103 and 104 having two reflecting functions, preferably both, are constructed with symmetrical extended surfaces, each of which provides a light beam with power and has only one symmetrical surface for correcting decentered aberation. Such symmetrical surfaces are situated on nearly the same plane as those of the symmetrical extended surfaces of the decentered prisms VP1 and VP2 which are arranged in the front and rear lens unit GF and GR of the photographing objective optical system 88.

FIG. 31 shows another case where the imaging optical system of the present invention, as in FIG. 30, is incorporated in the objective optical system 88 of the photographing section of the electronic camera 80. In this case, an eyepiece optical system 99B is different from the eyepiece optical system 99 of FIG. 30. Specifically, the electronic camera 80 shown in FIG. 31 is provided with the variable focal-length lens 21, such as that shown in FIG. 13, in the proximity of the exit surface 104 of the decentered prism VP3 in the eyepiece optical system 99 of FIG. 30. In this way, the decentered prism VP3 is combined with the variable focal-length lens 21, and thereby both the conversion of diopter by the decentered prism and the change of magnification by the variable focal-length lens can be carried out.

In the camera 80 designed as mentioned above, the photographing objective optical system 88 can be constructed with a small number of optical members, and high performance and compactness are achieved. In addition, since the entire optical system is placed in the same plane, the thickness of the camera in a direction perpendicular to this plane can be reduced.

Figure 32A:
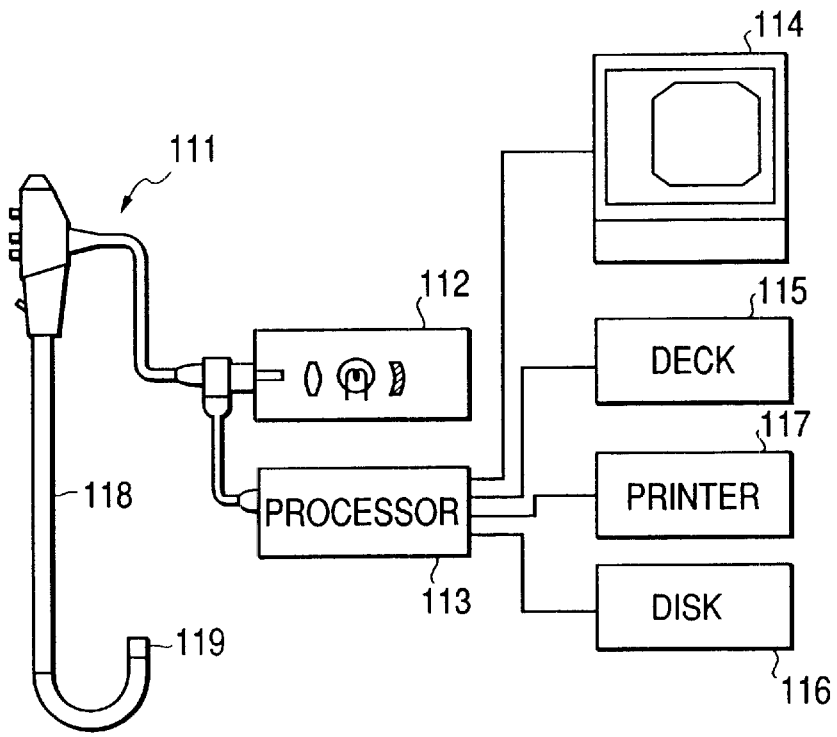
FIG. 32A is a view showing the entire system of an electronic endoscope apparatus in which the variable optical-property element of the present invention is incorporated in an objective optical system for observation.
Figure 32B:
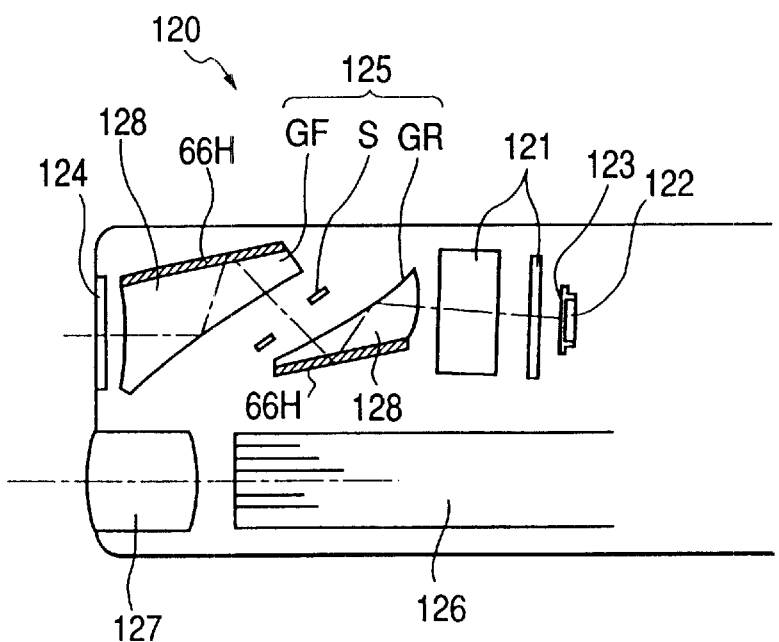
FIG. 32B is a view showing the interior arrangement of the distal end of the endoscope of FIG. 32A in which the variable optical-property element of the present invention is incorporated.

FIGS. 32A and 32B show an electronic endoscope in which the variable optical-property element of the present invention is incorporated in an optical system 120. In this case, an objective optical system 125 for observation uses an Imaging optical system provided with reflection type variable optical-property elements 128 for performing the zooming and focusing operations. An electronic endoscope system, as shown in FIG. 32A, includes an electronic endoscope 111; a light source device 112 for supplying illumination light; a video processor 113 for processing a signal with respect to the electronic endoscope 111; a monitor 114 for displaying an image signal output from the video processor 113; a VTR deck 115 and a video disk 116 for recording the image signal, each connected to the video processor 113; and a video printer 117 for printing out the video signal as an image. A distal end 119 of an inserting section 118 of the electronic endoscope 111 is constructed as shown in FIG. 32B. An illumination light beam from the light source device 112 passes through a light guide fiber bundle 126 and illuminates a part to be observed, through an objective optical system 127 for Illumination. Light from the part to be observed is such that an object image is formed through a cover member 124 by the objective optical system 125 for observation. The object image falls on an imaging surface 123 of a CCD 122 through filters 121 such as a low-pass filter and an infrared cutoff filter. Subsequently, the object image is converted into an image signal by the CCD 122. This image signal is displayed directly on the monitor 114 by the video processor 113 shown in FIG. 32A, and is recorded in the VTR deck 115 and the video disk 116 and printed out as an image by the video printer 117. The endoscope designed in this way can be constructed with a small number of optical members, irrespective of the fact that zooming and focusing functions are retained, and is capable of achieving high performance and compactness.

Each of the decentered prisms provided in the front and rear lens units of the imaging optical system is of a two-internal-reflection type, including three optical surfaces, one of which has the functions of total reflection and of refraction. However, the decentered prism used in the present invention is not limited to such a structure.

In the imaging device of the present invention described above, the imaging device shown in FIG. 23, for example, is provided with the optical system including the extended surfaces and the variable focal-length mirror. However, these extended surfaces can also be used in the optical systems of other imaging devices using the variable optical-property elements. It is possible to use such extended surfaces, for example, in the optical system of the imaging device using the variable focal-length lens depicted in FIG. 13. In other words, the extended surfaces are applicable to optical systems, imaging optical systems, optical devices, and observation devices which use variable optical-property elements in addition to variable optical-property reflecting mirrors.

The optical system of the present invention is used as an eyepiece optical system, a finder optical system, the lens system of an electronic imaging device (in FIG. 16, for example), and the lens system of a digital camera imaging device.

Figure 33:
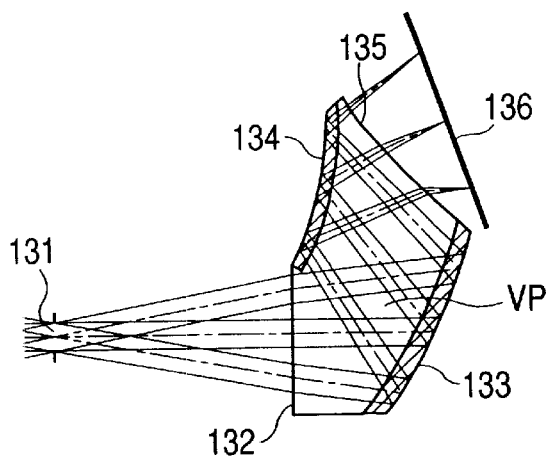
FIGS. 33, 34, and 35 are views showing examples of decentered prisms applicable in the present invention.
Figure 34:
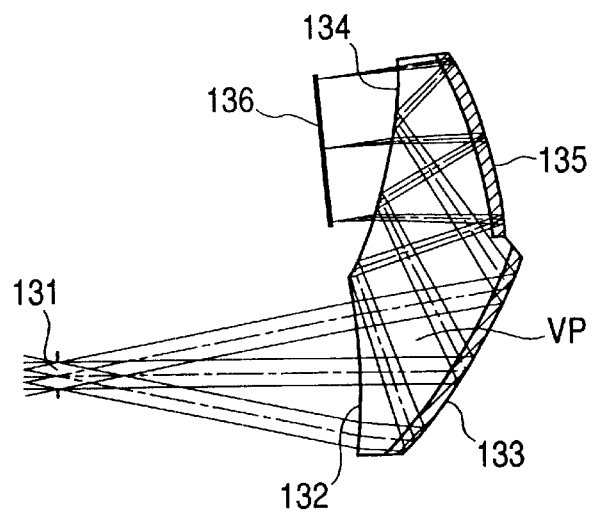
Figure 35:
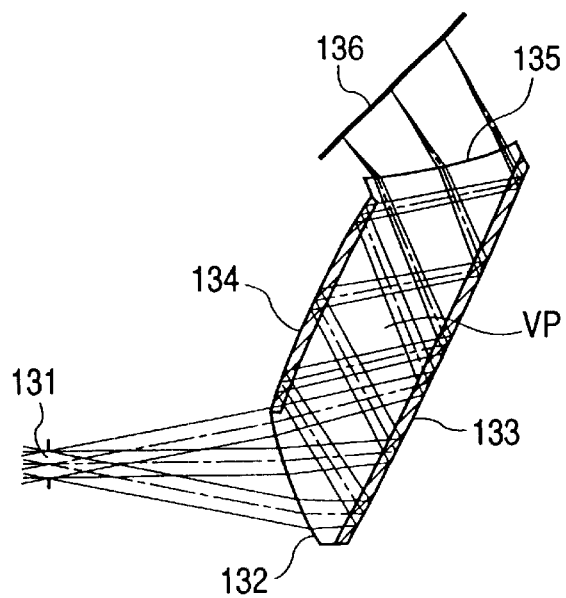

A few examples of the variable focal-length prisms which can be used in the present invention are shown in FIGS. 33–35. Although In any case the prism VP forming an image on an image plane 136 is depicted in the figure, the prism VP can also be used in such a way that the direction of the optical path is reversed, that is, rays of light from an object are rendered incident from the side of the image plane 236 to form the image on the side of a pupil 131. The prism VP may be designed to construct an imaging optical system or an observation optical system by itself. Which of the surfaces of the prism should be used for the variable optical-property element may be determined in accordance with the application of the prism.

In FIG. 33, the prism VP includes a first surface 132, a second surface 133, a third surface 134, and a fourth surface 135. Light passing through the entrance pupil 131, after being refracted by the first surface 132 to enter the prism VP, is internally reflected by the second surface 133 and enters the third surface 134 for internal reflection. The light is then incident on the fourth surface 135 and is refracted there to form an image on the image plane 136. The variable optical-property elements are provided on the second and third surfaces 133 and 134, and thereby zooming and focusing become possible.

In FIG. 34, the prism VP includes the first surface 132, the second surface 133, the third surface 134, and the fourth surface 135. Light passing through the entrance pupil 131, after being refracted by the first surface 132 to enter the prism VP, is internally reflected by the second surface 133 and enters the third surface 134 for total reflection. The light is then incident on the fourth surface 135 and is internally reflected there. Finally, the light is incident again on the third surface 134 and is refracted there to form an image on the image plane 136. In this case, the variable optical-property elements are used for the second and fourth surfaces 133 and 135.

In FIG. 35, the prism VP includes the first surface 132, the second surface 133, the third surface 134, and the fourth surface 135. Light passing through the entrance pupil 131, after being refracted by the first surface 132 to enter the prism VP, is internally reflected by the second surface 133 and enters the third surface 134 for internal reflection. The light is then incident again on the second surface 133 and is internally reflected there. Finally, the light is incident on the fourth surface 135 and is refracted there to form an image on the image plane 136. In this case, the variable optical-property elements are used for the second and third surfaces 133 and 134.

Figure 36:
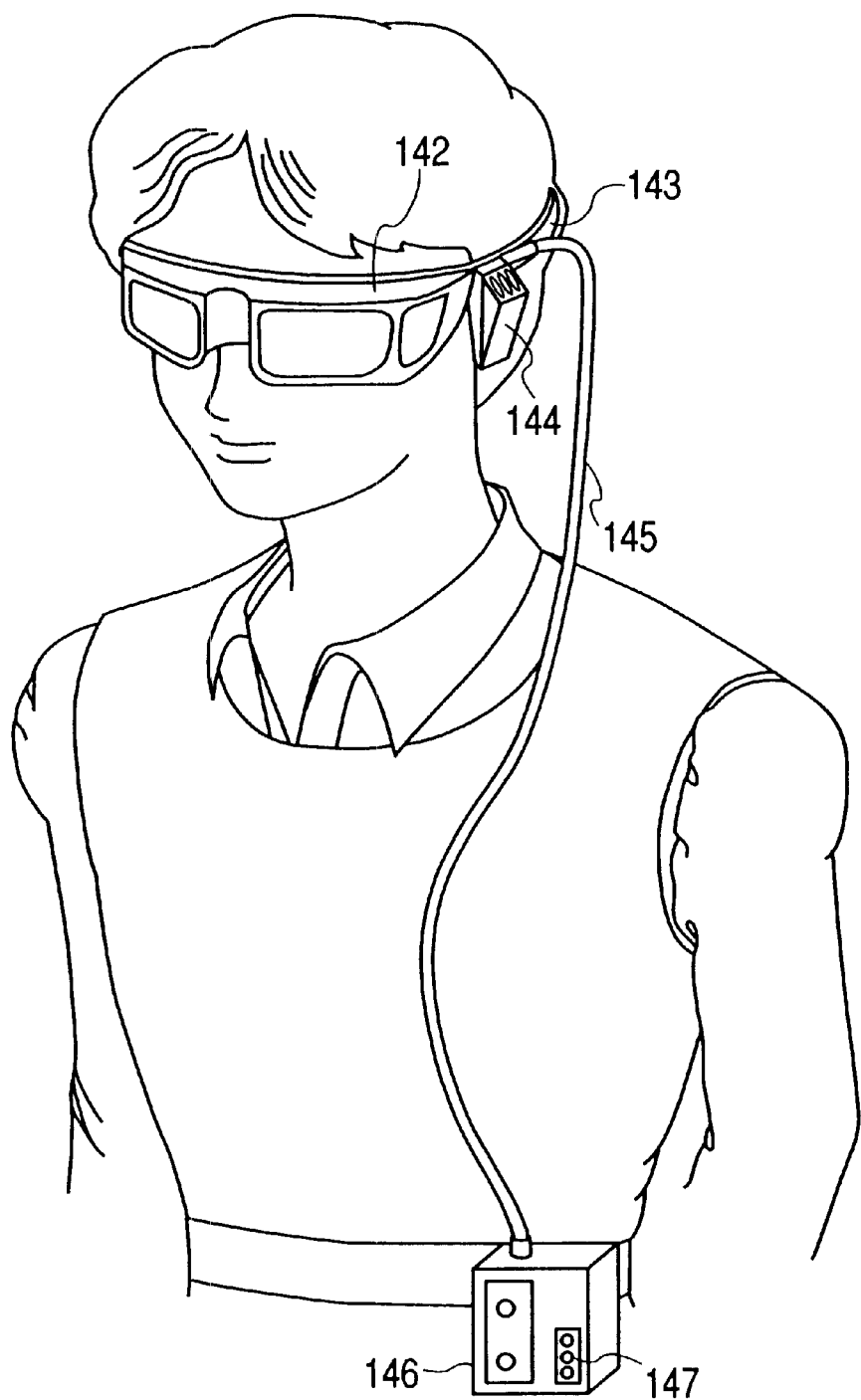
FIG. 36 is a view showing an image display device using variable optical-property elements in the present invention.
Figure 37:
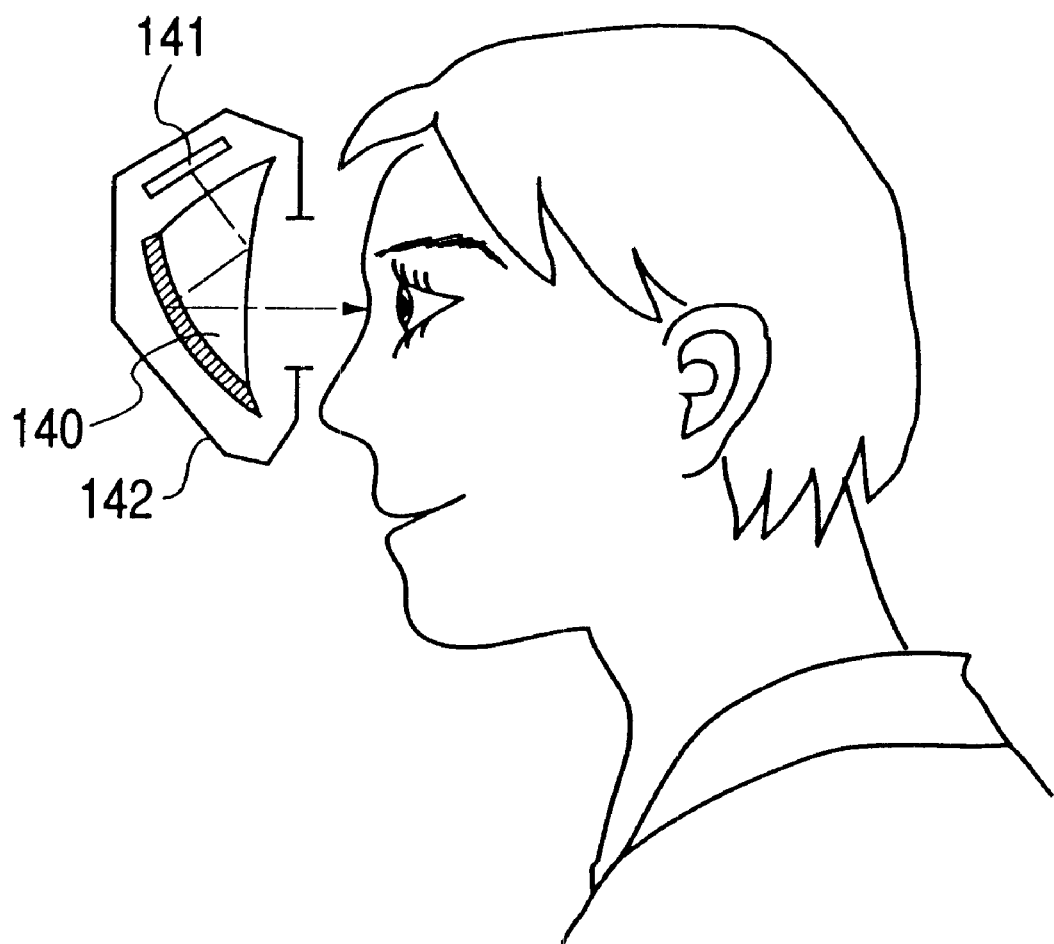
FIG. 37 is a sectional view showing the image display device of FIG. 36.

The variable optical-property element of the present invention can be utilized for an image display. In FIGS. 36 and 37, a decentered prism optical system in which the reflection type variable optical-property element of the present invention is used for diopter adjustment, as shown in FIG. 37, is used as an eyepiece optical system 140. A pair of combinations, each including the eyepiece optical system 140 and an image display element 141, is provided so that the combinations are separated by an interpupillary distance and supported, thereby constructing a portable image display 142 such as a stationary or head mounted image display which is observable with the eyes.

Specifically, the display body 142 is provided with a pair of eyepiece optical systems 140 for the eyes and, opposite thereto, has the image display elements 141, such as liquid crystal display elements, at the position of the image plane. Moreover, the display body 142, as shown in FIG. 36, has a temple frame 143 which extends continuously on both sides so that the display body 142 can be retained before an observer's eyes.

A speaker 144 is attached to the temple frame 143 so that an observer can enjoy not only an image observation, but also a stereoscopic sound. In this way, since the display body 142 having the speaker 144 is connected through an image sound transmitting cord 145 to a video reproducing device 136 such as a portable video cassette, the observer, as shown in the figure, is capable of holding the reproducing device 146 at any position of his belt to enjoy an image sound. In FIG. 36, reference numeral 147 represents a control section for the switch and volume of the reproducing device 146. Also, electronic parts such as image and sound processing circuits are housed in the display body 142.

The cord 145 may be designed so that its tip as a jack can be attached to the existing video deck. Moreover, it may be connected to a tuner for TV electric wave reception to watch TV, or may also be connected to a computer so as to receive the image of computer graphics or a message image from the computer. To remove a cord which is obstructive to the operation, an antenna may be provided to receive a signal from the outside through the electric wave.

As is true of the whole of the present invention, each of the eyepiece optical system, the finder optical system, the lens system of the electronic imaging device (in FIG. 16, for example), and the lens system of the digital camera imaging device is cited as an example of the imaging optical system. Also, the optical apparatus refers to an apparatus having an optical system.

Figure 38:
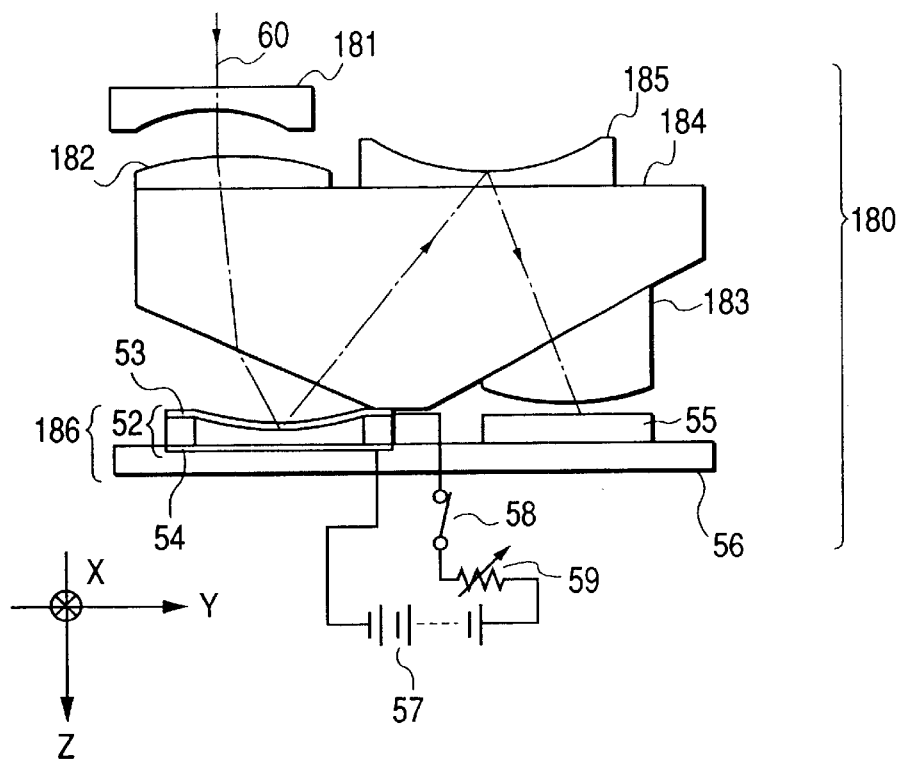
FIG. 38 is a view showing one embodiment of the optical apparatus of the present invention.

The optical apparatus of the present invention shown in FIG. 38 is constructed as an electronic imaging unit 180 using lenses 181, 182, and 183, a prism 184, and a mirror 185.

The reflecting mirror 52 is constructed so that, like the membrane mirror set forth, for example, in Optics Communications mentioned above, when a voltage is applied across the thin film 53 and the electrode 54, the thin film 53 is deformed by an electrostatic force to change the focal length of a reflecting mirror, and thereby the focusing adjustment can be made. In the optical apparatus of this embodiment, the light 60 from the object is refracted by the entrance and exit surfaces of the lenses 181 and 182 and the prism 184 for optical elements, and is reflected by the reflecting mirror 52. The light is then reflected by the reflecting surface of the mirror 185, and after being refracted by the lens 183, enters the solid-state image sensor 55.

In this way, the optical apparatus of this embodiment is designed so that the imaging optical system is constructed with the optical elements 181, 182, 183, 184, and 185 and the reflecting mirror 52. In particular, the surfaces of thicknesses of individual optical elements are optimized, and thereby aberration of an object image can be reduced to a minimum.

In the optical apparatus shown in FIG. 38, in order to correct astigmatism, it is desirable that the aperture of the reflecting mirror 52 is shaped into an elliptic form which has its major axis along the direction of the y axis, that is, of a line that a plane including incident light on the reflecting mirror 52 and emergent light therefrom crosses the reflecting mirror 52. The reflecting mirror 52 and the solid-state image sensor 55 are constructed to be independent of each other and placed on the substrate 56. Since, however, the reflecting mirror 52 can also be fabricated through a silicon lithography process, the substrate 56 may be constructed of silicon so that at least one part of the reflecting mirror 52 is fabricated, together with the solid-state image sensor 55, on the substrate 56 by the lithography process.

In this way, the reflecting mirror 52 which is one of the optical elements is integrated with the image sensor 55, and this is advantageous for compactness and a reduction in cost. Moreover, the reflecting mirror 52 may be constructed with a fixed-focus mirror. In this case also, the reflecting mirror 52 can be made through the lithography process. Here, a combination of the reflecting mirror 52, the solid-state image sensor 55, and the substrate 56 is referred to as a platelike unit 186. The platelike unit is an example of the optical apparatus.

A display element, such as a reflection type liquid crystal display or a transmission type liquid crystal display, although not shown in the figure, may be constructed integrally with the substrate 56 through the lithography process. The substrate 56 may be made of a transparent material such as glass or quartz. In this case, it is only necessary to fabricate the solid-state image sensor and the liquid crystal display on this glass substrate through the technique, for example, of a thin film transistor. Alternatively, this display element may be made independently and placed on the substrate 56.

The optical elements 181, 182, 183, 184, and 185 are configured with plastic or glass molding and thereby curved surfaces of any desired shape can be easily configured and fabrication is simplified. In the imaging device of this embodiment, only the lens 181 is separated from the prism 184, but If the optical elements 182, 183, 184, and 52 are designed so that aberration can be eliminated without placing the lens 181, the optical elements other than the reflecting mirror 52 will be constructed with one optical block and assembly will be facilitated.

Figure 39:
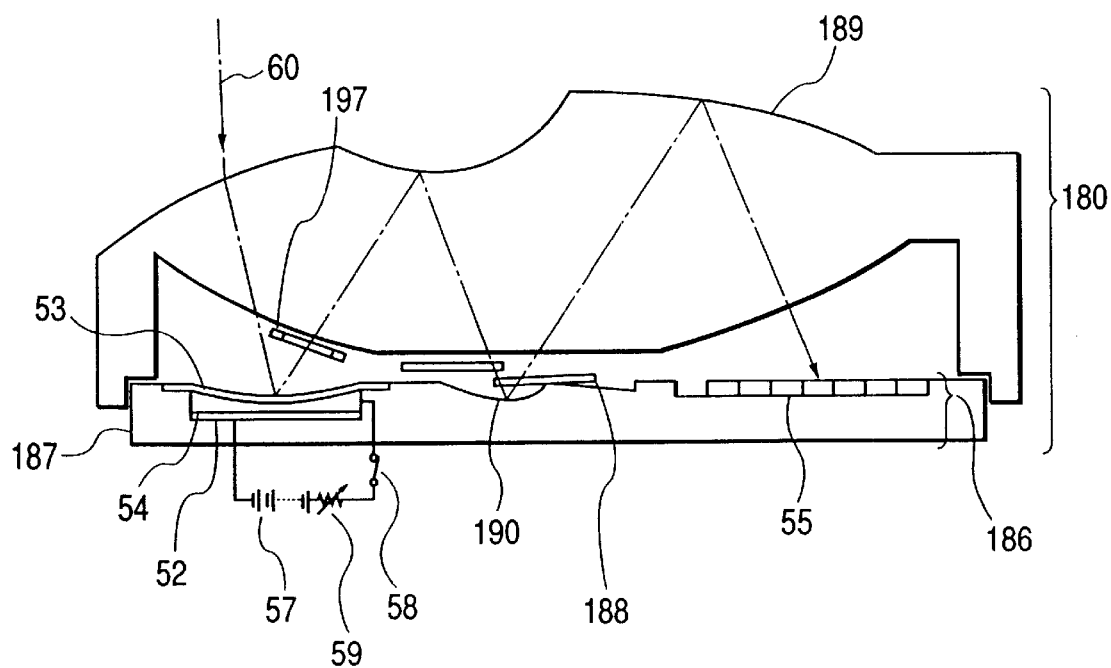
FIG. 39 is a view showing another embodiment of the optical apparatus of the present invention.

In the imaging device of another embodiment shown in FIG. 39, the reflecting mirror 52, a microshutter 188 operating with an electrostatic force, made by a micromachine technique, and the image sensor 55 are fabricated on a single silicon substrate 187 by the lithography process. A combination of the silicon substrate 187 with a molded, extended surface prism 189 brings about the small-sized imaging unit 180 for digital cameras, used as the optical apparatus. The microshutter 188 is designed to be also usable as a stop.

If the extended surface prism 189 is made by molding plastic, its cost can be reduced. Further, if the extended surface prism 189 is constructed of energy-curing resin, the durability of the prism becomes higher than the case of thermoplastic resin, which is favorable. Moreover, the extended surface prism 189 may be constructed of a material with the property of absorbing infrared light to bring about the effect of an infrared cutoff filter. Alternatively, an infrared reflecting interference film may be deposited on one surface of the extended surface prism 189 in the optical path to remove infrared light.

A mirror 190 is configured in such a way that the silicon substrate 187 is processed into a concave surface, which is coated with aluminum.

The microshutter 188 can be used by improving a shutter such as that shown, for example, in each of FIGS. 8 and 9 of Japanese Patent Preliminary Publication No. Hei 10-39239.

Figure 40:
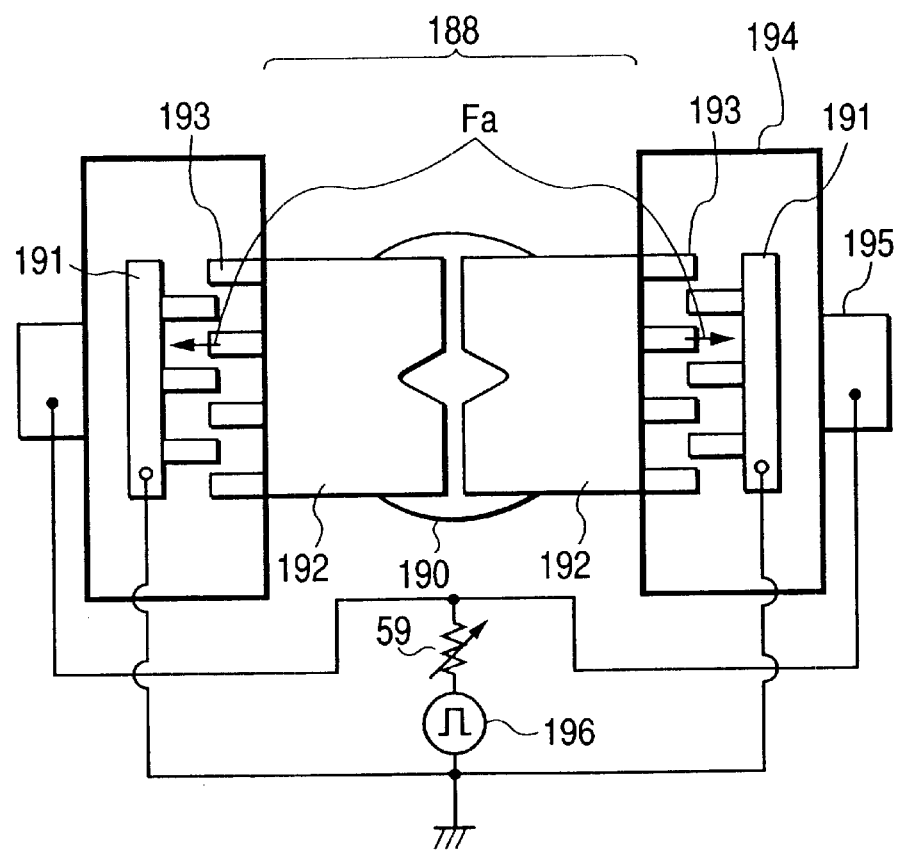
FIG. 40 is an enlarged top view showing a microshutter and its vicinities in the optical apparatus of FIG. 39.

FIG. 40 shows the microshutter 188, looking at the optical apparatus of FIG. 39 from above. The microshutter 188 is designed so that potential differences are placed across fixed electrodes 191 and electrodes 193 attached to light-blocking plates 192, and thereby the two light-blocking plates 192 can be opened and closed laterally by an electrostatic force Fa. Here, the two light-blocking plates 192 are provide with triangular notches, one at each middle of adjacent sides of the plates, and are shifted to each other in a direction perpendicular to the plane of the figure so that the light-blocking plates 192 function as a stop when somewhat opened for photography and act as a shutter when completely closed.

A power supply 196 is such that the sign of a polarity can be changed to a plus or minus. In association with this, the two light-blocking plates 192 are to move in opposite directions. The two light-blocking plates 192, as shown in FIG. 39, are designed to somewhat overlap when completely closed.

The microshutter 188 has the merit that it can be fabricated, together with the reflecting mirror 52 and the solid-state image sensor 55, by the lithography process. For the microshutter 188, a microshutter such as that shown, for example, in FIG. 47 of Hei 10-39239 may be used. Alternatively, for the shutter used in the imaging device of this embodiment, a shutter actuated by a spring, such as that of an ordinary film camera, may be fabricated and placed on the silicon substrate 186.

Figure 41:
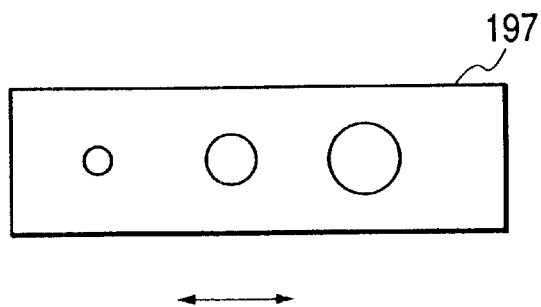
FIG. 41 is a view showing a modification example of a stop used in the optical apparatus of the present invention.

The imaging device, as shown in FIG. 39, may be constructed to have a stop 197 independently. The stop 197 may be an iris diaphragm used for the lens of the film camera, or as shown in FIG. 41, may be constructed so that a plate with a plurality of holes is slid. Alternatively, a fixed stop whose aperture area remains unchanged may be used. The microshutter 188 may be actuated as a stop only so that the element shutter of the solid-state image sensor 55 is used to fulfil its function as a shutter.

Furthermore, the imaging device of the present invention may be constructed so that at least one of the electrode 54, the mirror 190, the microshutter 188, and the image sensor 55 is fabricated as a separate part and is placed, together with the remaining parts, on a single substrate. Also, the imaging device, as shown in FIG. 25, may be designed so that the variable focal-length mirror 70 having the variable focal-length lens in front of a mirror is placed as another modification example of the reflecting mirror 52 of the variable optical-property element. In FIG. 25, the variable focal-length mirror 70 has the twisted nematic liquid crystal 20 between the transparent electrode 73 and the electrode 71 which is coated on the surface of the substrate 72 shaped into a Fresnel lens form. The helical pitch P of the twisted nematic liquid crystal satisfies the following condition:

$$P < 3\lambda \quad (11)$$

When Condition (11) is satisfied, the refractive index of the twisted nematic liquid crystal 20 becomes nearly isotropic, irrespective of the direction of polarization of incident light, and thus a variable focal-length mirror which does not require the polarizing plate and produces an image with no blurring is obtained. Also, a low-cost digital camera may have practical use even when the pitch P of the twisted nematic liquid crystal 20 satisfies the following condition:

$$P < 15\lambda \quad (12)$$

Figure 42:
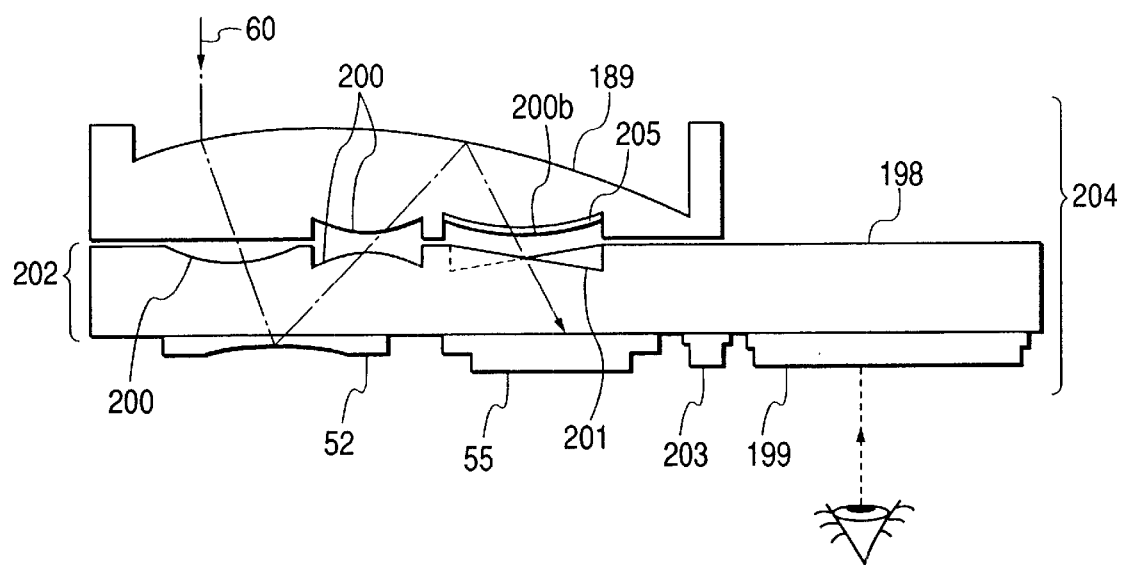
FIG. 42 is a view showing a further embodiment of the optical apparatus of the present invention.

In an embodiment shown in FIG. 42, an optical apparatus 204 is designed so that a reflection type LCD 199, the reflecting mirror 52, and the solid-state image sensor 55 are provided on a transparent substrate 198 and are combined with an extended surface prism 189 which is an optical block. The transparent substrate 198 is also provided with a lens 200 which is an optical element, a low-pass filter 201, and an IC 203. These components constitute a transparent platelike unit 202. The IC 203 is an LSI possessing the function of an IC that drives the reflection type LCD 199, the reflecting mirror 52, and the solid-state image sensor 55, or of a CPU for making control and calculation, or a memory. The solid-state image sensor 55, the reflecting mirror 52, the reflection type LCD 199, and the IC 203 may be fabricated to be independent of one another so that they are cemented to the transparent substrate 198. However, If the surface of the transparent substrate 198 is coated with a material such as amorphous silicon, low-temperature polysilicon, or continuous crystalline silicon (the Asahi newspaper, Jan. 14, 1998) by the use of the thin-film transistor technology, this is advantageous for lightweight and compact design and accuracy improvement.

Figure 43:
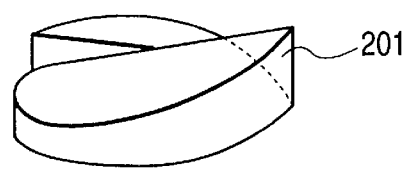
FIG. 43 is a perspective view showing a low-pass filter used in the optical apparatus of FIG. 42.

FIG. 43 illustrates the low-pass filter 201 used in the optical apparatus 204. The low-pass filter 201 is of a pupil division type and consists of two twisted planar surfaces. The low-pass filter 201 is also one of the optical elements. The low-pass filter 201 may be provided on the extended surface prism 189. In this embodiment, it is desirable that the transparent substrate 198 is fabricated by molding glass or resin.

The optical apparatus 204, which can provide both the extended surface prism 189 and the transparent platelike unit 202 with the surfaces for reflecting and refracting light, facilitates correction for aberration and surpasses the imaging unit 180 shown in FIG. 39. Also, the optical element such as a lens, for example, like a lens 200b, may be fabricated in such a way that a thin resin film 205 with a curved surface is cemented to the surface of a transparent member. Such an approach is called thin-film lens technology.

Figure 44:
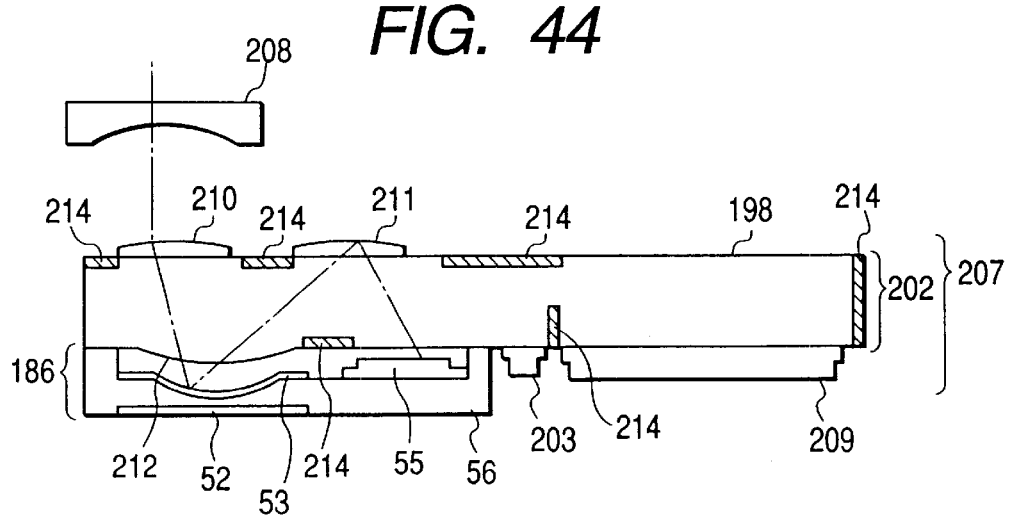
FIGS. 44, 45, and 46 are views showing other embodiments of the present invention.

In an embodiment shown in FIG. 44, an optical apparatus 207 includes a combination of the transparent platelike unit 202 with the platelike unit 186. If a lens 208 is provided to be independent of the transparent substrate 198, the number of degrees of design freedom for correction for aberration will be increased. Although this is advantageous for correction for aberration, the lens 208 need not necessarily be used. The transparent platelike unit 202 is provided with a display 209 and the IC 203, followed by lenses 210 and 211 fabricated through the thin-film lens technology. A lens 212 is constructed integrally with the transparent substrate 198 by a molding technique when the transparent substrate 198 is fabricated. The platelike unit 186 is constructed in the same way as that shown in FIG. 39.

Each of hatching portions 214 stands for a black light-blocking film for eliminating stray light, which is made by three-layer evaporation of Cr—CrOz—Cr, black painting, or printing. Also, the hatching portions 214 may be provided on the surface, side, and interior of the transparent substrate 198 when necessary, but sometimes they are not used.

Although a liquid crystal display which is one example of the display 209 can be fabricated on the transparent substrate, for example, of glass, by the thin-film transistor technology, the solid-state image sensor 55 can be easily fabricated only on the silicon substrate. Also, a diffraction optical element may be placed on the surface of the transparent substrate 198, the extended surface prism 189, or the platelike unit 186.

Since the optical apparatus 207 is designed to separate the substrates for providing the solid-state image sensor 55 and the display 209, its cost, in contrast with the case where they are fabricated on the same substrate, can be reduced. The material of the transparent substrate 198 or the lens 211 of the optical apparatus 207 may be made to have an infrared absorbing effect so that the role of an infrared cutoff filter is played. Alternatively, an interference film having an infrared cutoff function may be deposited on the surface of the thin film 53, the lens 212, or the transparent substrate 198. Furthermore, the optical apparatus 207 may be constructed as a display device having an observing function, such as that of opera glasses, in an optical system excluding the solid-state image sensor 55.

Figure 45:
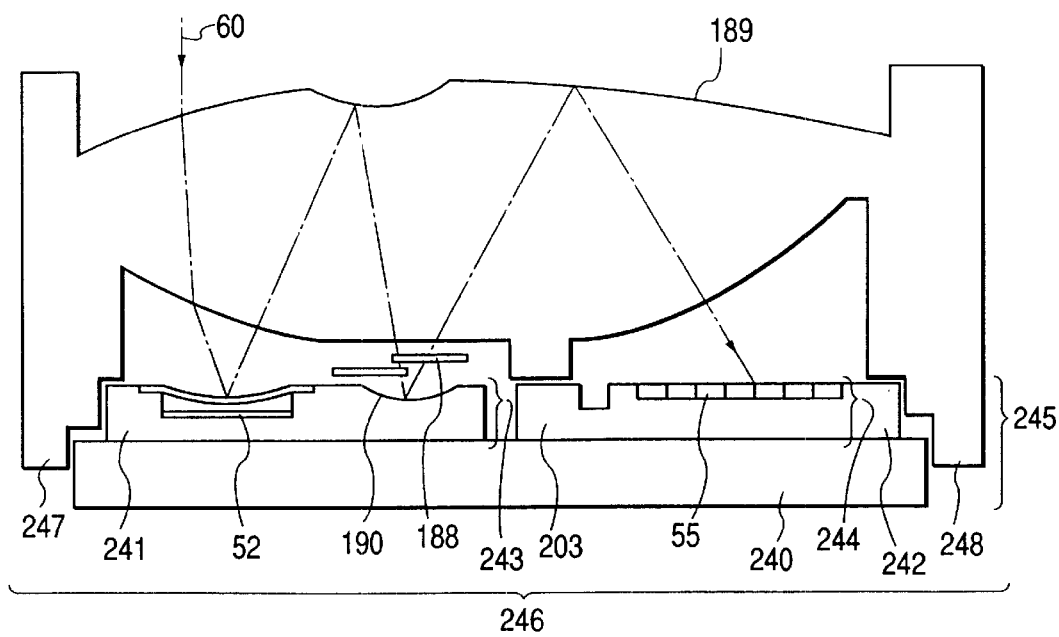

In FIG. 45, an optical apparatus 246 includes a combination of a platelike unit 245 with the extended surface prism 189. The platelike unit 245 is constructed with a platelike unit 243 in which the reflecting mirror 52, the mirror 190, and the microshutter 188 are fabricated on a substrate 241 made with a low quality of silicon and a platelike unit 244 in which the image sensor 55 and the IC 203 are fabricated on a substrate 242 made with a high quality of silicon, both the platelike units 243 and 244 being placed on a single substrate 240. The image sensor 55 and the IC 203 can be easily fabricated only on a high-quality silicon substrate, but the mirror 190, the microshutter 188, and the reflecting mirror 52 are fabricated even on a low-quality silicon substrate.

According to the optical apparatus 246 of this embodiment, the platelike units 243 and 244 which are optical units are constructed with separate substrates of different qualities, and hence the amount of use of a high quality of silicon can be reduced accordingly. This is advantageous for cost.

The extended surface prism 189 is provided with legs 247 and 248, which are capable of adjusting an optical length between respective surfaces to a desired design value when constructed integrally with the platelike unit 245.

Figure 46:
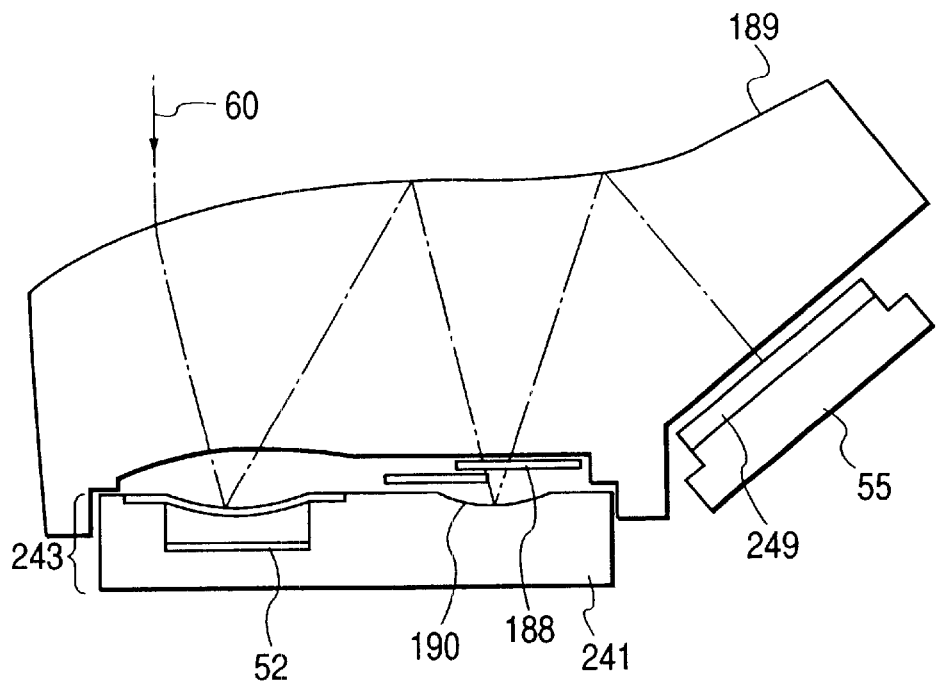

In FIG. 46, the optical apparatus is such that an imaging device for digital cameras is constructed by combining the extended surface 189 with the platelike unit 243 and the solid-state image sensor 55. According to the optical apparatus, the image sensor 55 is separated from the substrate 241 made with a low quality of silicon, and thus a commercial CCD can be used as the image sensor 55. This reduces cost.

It is favorable that the optical apparatus of the embodiment is provided with another liquid crystal display, not shown, and is used as a finder for digital cameras.

Figure 47:
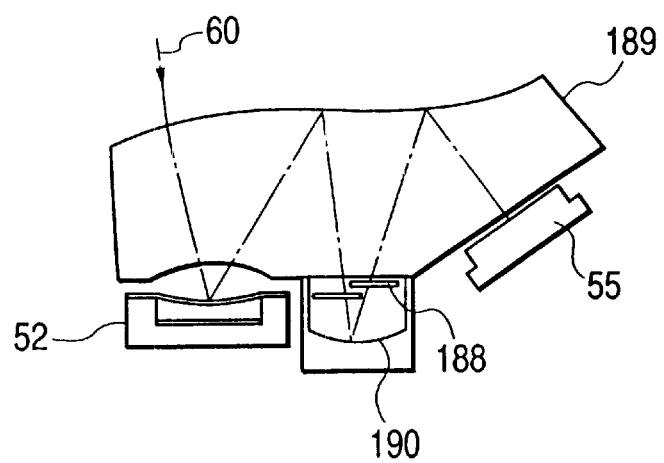
FIG. 47 is a view showing one modification example of the embodiment of FIG. 46.

In this embodiment, the reflecting mirror 52, the mirror 190, and the microshutter 188, instead of being placed on a single substrate, as shown in FIG. 47, may be placed to be independent of one another around the extended surface prism 189. Since in this case the optical parts of the reflecting mirror 52, the mirror 190, and the microshutter 188 can be separately made, these parts can also be used as parts of other products. Even when the yield (the ratio of good to bad parts on fabrication) of the optical parts is low, only good parts can be chosen to fabricate products, and thus the yield on products is improved, compared with the case where the optical parts are fabricated on a single substrate.

As shown in FIG. 46, a liquid crystal shutter 249 which is one of variable transmittance elements may be placed in front of the solid-state image sensor 55. In this case, the microshutter 188 may be actuated as a stop or a shutter in accordance with the liquid crystal shutter 249. Alternatively, the shutter operation may be performed by the functions of the liquid crystal shutter 249 and the element shutter of the image sensor 55, excluding the microshutter 188. The liquid crystal shutter 249 has no mechanical moving parts, and therefore If the microshutter 188 is eliminated, a mechanical structure can be simplified.

Figure 48:
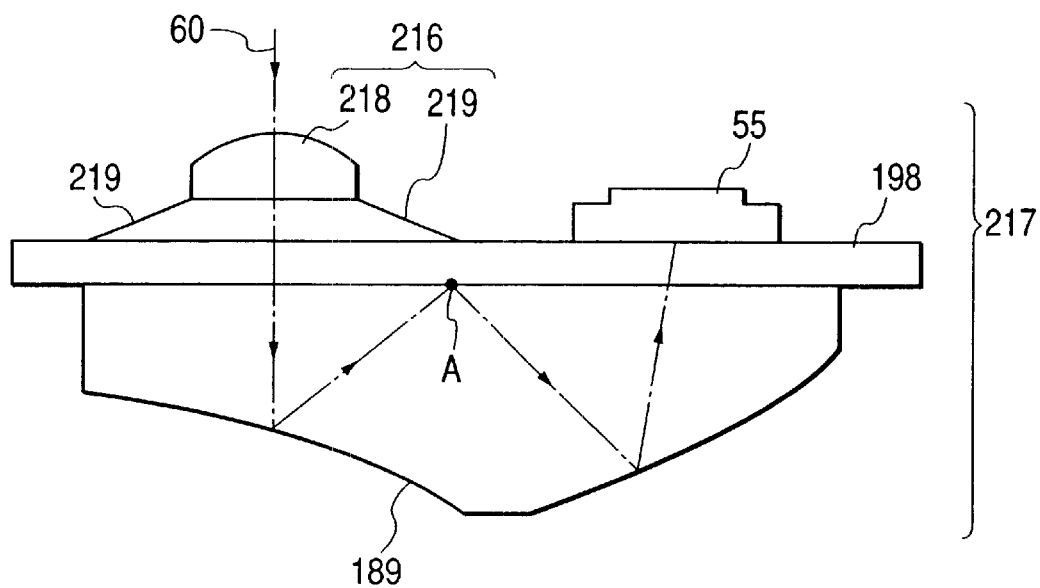
FIG. 48 is a view showing another modification example.

In FIG. 48, an optical apparatus 217 is designed to have a legged lens 216 which is an example of an optical moving element. Moreover, the optical apparatus 217 is constructed so that the transparent substrate 198 is combined with the solid-state image sensor 55 and the extended surface prism 189. The legged lens 216 is provided with legs 219, beneath a lens 218, fabricated by a micromachine technique set forth in "Micromachined free-space integrated micro-optics", by M. C. Wu, L.-Y. Lin, S.-S. Lee, and K. S. J. Pister, Sensors and Actuators A 50, pp. 127–134, 1995.

The legs 219 are connected to electrodes 219$b$ (FIG. 49) slid by an electrostatic force, corresponding to an electrode 193$b$ shown in FIG. 69 to be depicted later, so that, in FIG. 49, the electrodes 219$b$ are slid and thereby an angle θ is changed. In accordance with the change of the angle θ, intersections P₁ and P₂ with the legs 219 are moved along the surface of the transparent substrate 198. In this way, the legged lens 216 is such that when the angle θ made with each leg 219 is changed and a distance L between the lens 218 and the transparent substrate 198 is varied, the focusing adjustment can be made. Between the transparent substrate 198 and the extended surface prism 189 shown in FIG. 48, a slight air space is provided so that the light 60 from the object is totally reflected at a point A.

Figure 49:
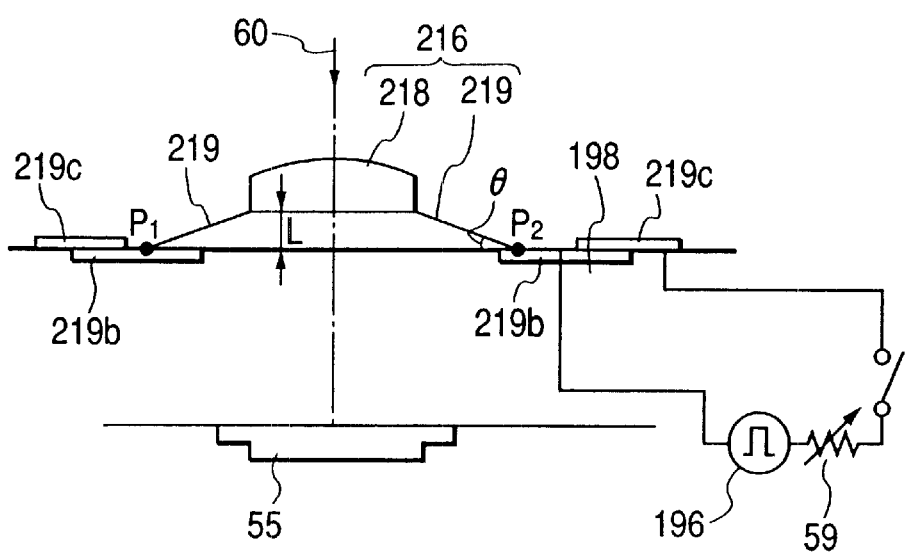
FIG. 49 is a view showing a modification example of the embodiment of FIG. 48.

FIG. 49 shows a modification example of the foregoing embodiment which is an imaging device with a simple structure combining the legged lens 216 with the transparent substrate 198 and the image sensor 55. Also, reference numeral 219$c$ denotes fixed electrodes.

Figure 50:
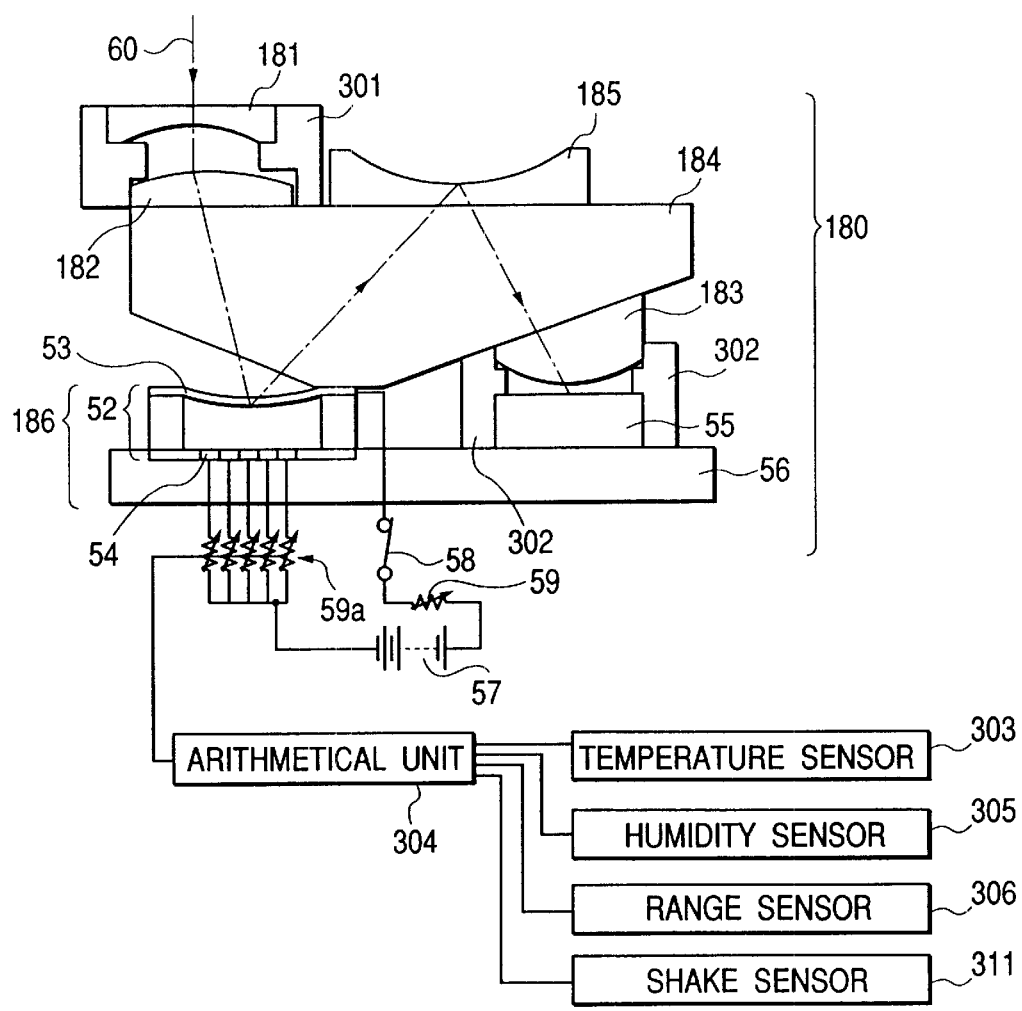
FIGS. 50 and 51 are views showing other embodiments of the present invention.

FIG. 50 shows another embodiment of the present invention. The reflecting mirror 52 is constructed so that when a voltage is applied across the thin film 53 and a plurality of electrodes 54, the thin film 53 is deformed by an electrostatic force and its surface profile is changed, like a membrane mirror set froth, for example, in "Handbook of Microlittiography, Micromachining, and Microfabrication", by P. Rai-Choudhury, Vol. 2, Micromachining and Microfabrication, p. 495, FIG. 8.58, SPIE PRESS, or "Flexible mirror micromachined in silicon", by Gleb Vdovin and P. M. Sarro, Applied Optics, Vol. 34, No. 16, pp. 2968–2972, 1995. In this way, the imaging device is capable of making compensations for deformations and variations of refractive indices of the optical elements 181, 182, 183, 184, and 185, or the expansion, contraction, and deformations of frames 301 and 302 caused by temperature and humidity changes, or a reduction in imaging performance caused by the optical elements; corrections for assembly errors of parts, such as the frames, and the optical elements; and shake prevention, focusing adjustment, and correction for aberration caused by the focusing adjustment. In the imaging device of this embodiment, the light 60 from the object is refracted by the exit and entrance surfaces of the prism 184 and reflected by the reflecting mirror 52. The light is then reflected by the reflecting surface of the mirror 185, and after being refracted by the lens 183, falls on the solid-state image sensor 55.

In the optical apparatus of FIG. 50, the surface profile of the reflecting mirror 52 is controlled by actuating the variable resistor 59 with a signal from an arithmetical unit 304 so that imaging performance is optimized. Signals delivered from a temperature sensor 303, a humidity sensor 305, a range sensor 306, and a shake sensor 311 enter the arithmetical unit 304, and thereby voltages applied to the electrodes 54 are determined at the arithmetical unit 304 to compensate for the reduction of imaging performance. The value of the variable resistor 59 is thus changed. In this way, the thin film 53, which is deformed by different electrostatic forces, assumes various shapes including an aspherical surface in accordance with the situation. The shape of the thin film 53 is depicted to be concave in the figure, but if the sign of the voltage is changed every electrode, a convex and concave surface can be configured. This is favorable because various changes of situation can be accommodated. Also, the range sensor 306 may be eliminated, and in this case, when the shape of the reflecting mirror 52 is somewhat changed and is determined so that the high-frequency component of the MTF of an image signal from the image sensor 55 is practically maximized, the focusing adjustment can be made. In the optical apparatus of FIG. 50, the reflecting mirror 52 can also be fabricated by the silicon lithography process. If the material of the thin film 53 is synthetic resin such as polyimide, a considerable deformation can be caused even at a low voltage. In this embodiment, the reflecting mirror 52 is constructed integrally with the image sensor, and this is advantageous for compactness and cost reduction.

Figure 51:
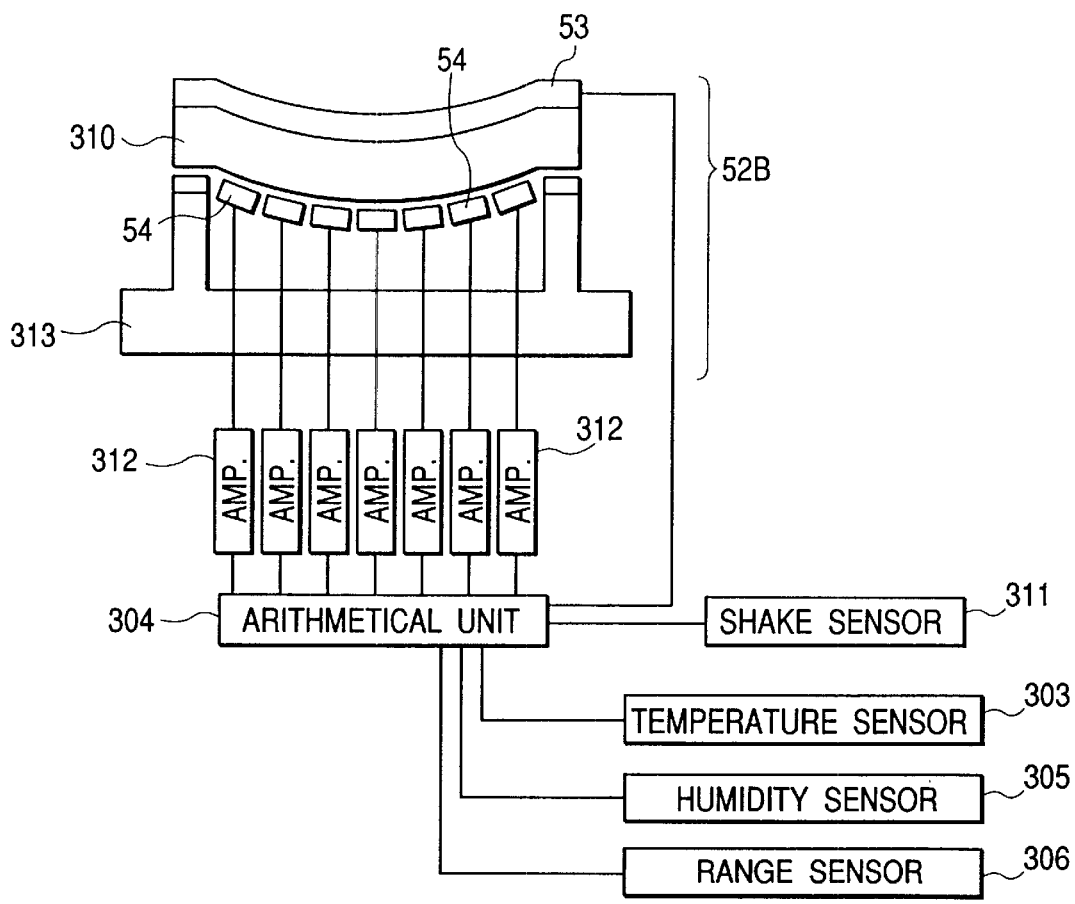
Figure 52:
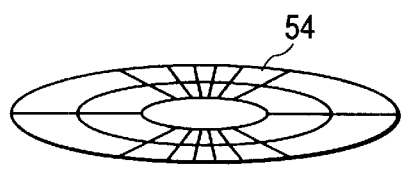
FIG. 52 is a view showing one example of the configuration of electrodes used in a variable optical-property mirror in FIG. 51.
Figure 53:
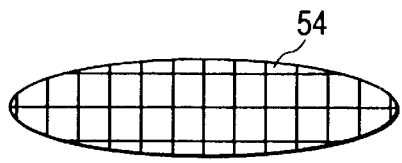
FIG. 53 is a view showing another example of the configuration of the electrodes in FIG. 51.

A description will be further given of the reflecting mirror 52. FIG. 51 shows a reflecting mirror 52B which is another example of the reflecting mirror 52. The reflecting mirror 52B is a variable mirror in which a piezoelectric element 310 is sandwiched between the thin film 53 and the electrodes 54, and a voltage applied to the piezoelectric element 310 is changed every electrode 54 so that different expansion and contraction are caused to various portions of the piezoelectric element 310 to change the shape of the thin film 53. It is desirable that the configuration of the electrodes 54 is properly chosen, for example, to be concentric, as illustrated in FIG. 52, or divided-rectangular, as in FIG. 53. Amplifiers 312 are controlled by the calculation of the arithmetical unit 304 and voltages applied to the electrodes 54 are varied so that the thin film 53 is deformed by the shake sensor 311 in order to compensate for a camera shake caused by hand holding of the digital camera in photography.

In this case, the signals from the temperature sensor 303, the humidity sensor 305, and the range sensor 306 are delivered at the same time, the focusing adjustment and compensation for temperature and humidity are made. Since the stress of the piezoelectric element 310 is imposed on the thin film 53, it is desirable that the thin film 53 is made to have some extent of thickness so that its strength is held. Also, reference numeral 313 represents a base.

Alternatively, the voltages applied to the electrodes 54 may be slightly changed during photography to shift the position of an image, thereby causing a low-pass filter effect to the reflecting mirror 52B for elimination of moire.

Figure 54:
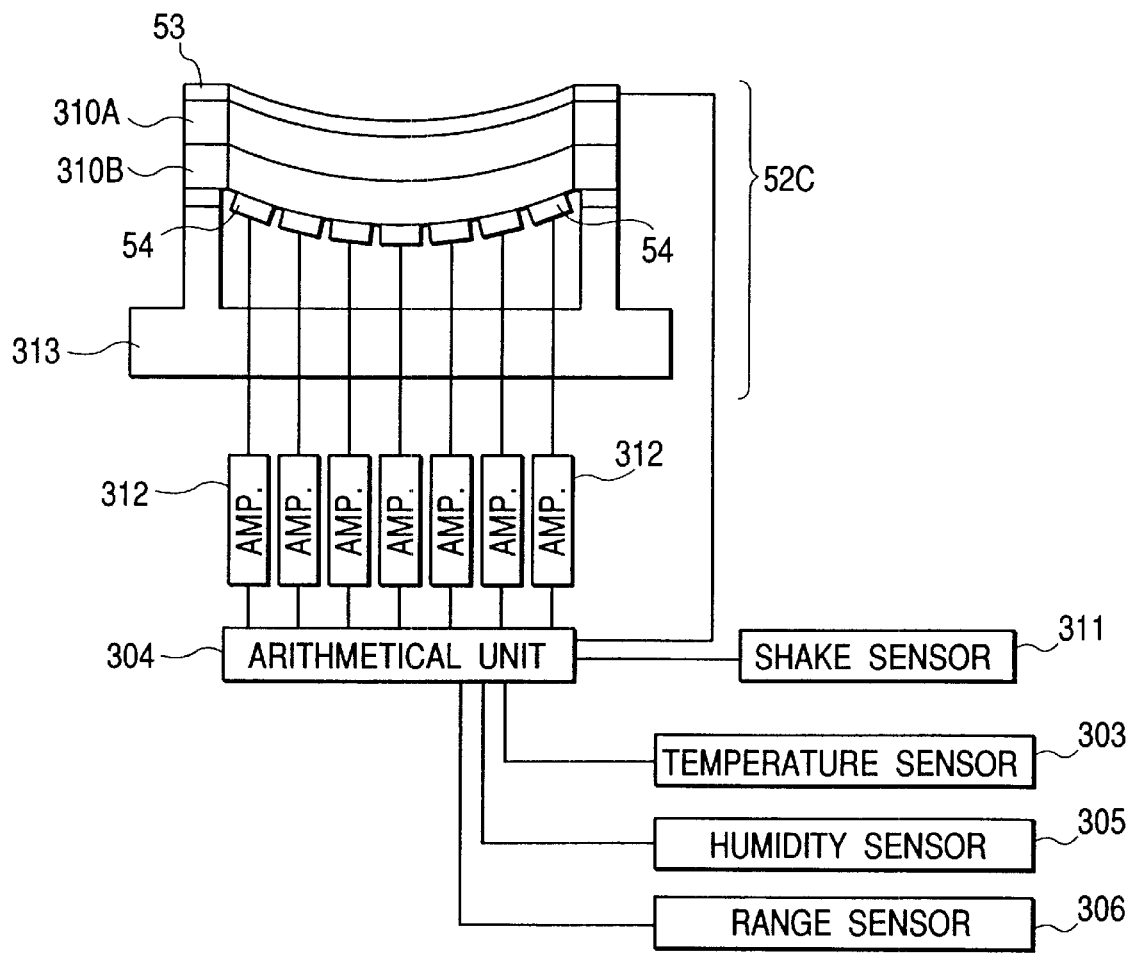
FIGS. 54, 55, 56, and 57 are views showing other embodiments of the variable optical-property mirror of FIG. 51.

FIG. 54 shows a reflecting mirror 52C which is another example of the reflecting mirror 53. The piezoelectric element 310 shown in FIG. 51 is replaced by piezoelectric elements 310A and 310B made with materials possessing piezoelectric characteristics in opposite directions. If the piezoelectric elements 310A and 310B are constructed of ferroelectric crystals, the crystal axes of the piezoelectric elements 310A and 310B are reversed in direction. By doing so, when the voltage is applied, the piezoelectric elements 310A and 310B expand and contract in opposite directions, and hence the force of deforming the thin film 53 becomes stronger than the case of the reflecting mirror 52B. Consequently, the surface profile of the mirror can be considerably changed. In addition, the thickness of each of the piezoelectric elements 310, 310A, and 310B is made uneven, and thereby the shape of the thin film 53 can be properly deformed.

The piezoelectric elements 310, 310A, and 310B include, for example, the following: piezoelectric substances such as barium titanate, Rochelle salt, quartz crystal, tourmaline, KDP, ADP, and lithium niobate; polycrystals or crystals of the piezoelectric substances; piezoelectric ceramics such as solid solutions of PbZrO3 and PbTiO3; organic piezoelectric substances such as PVDF; and other ferroelectrics. In particular, the organic piezoelectric substance is favorable because it has a small value of Young's modulus and brings about a considerable deformation at a low voltage.

Figure 55:
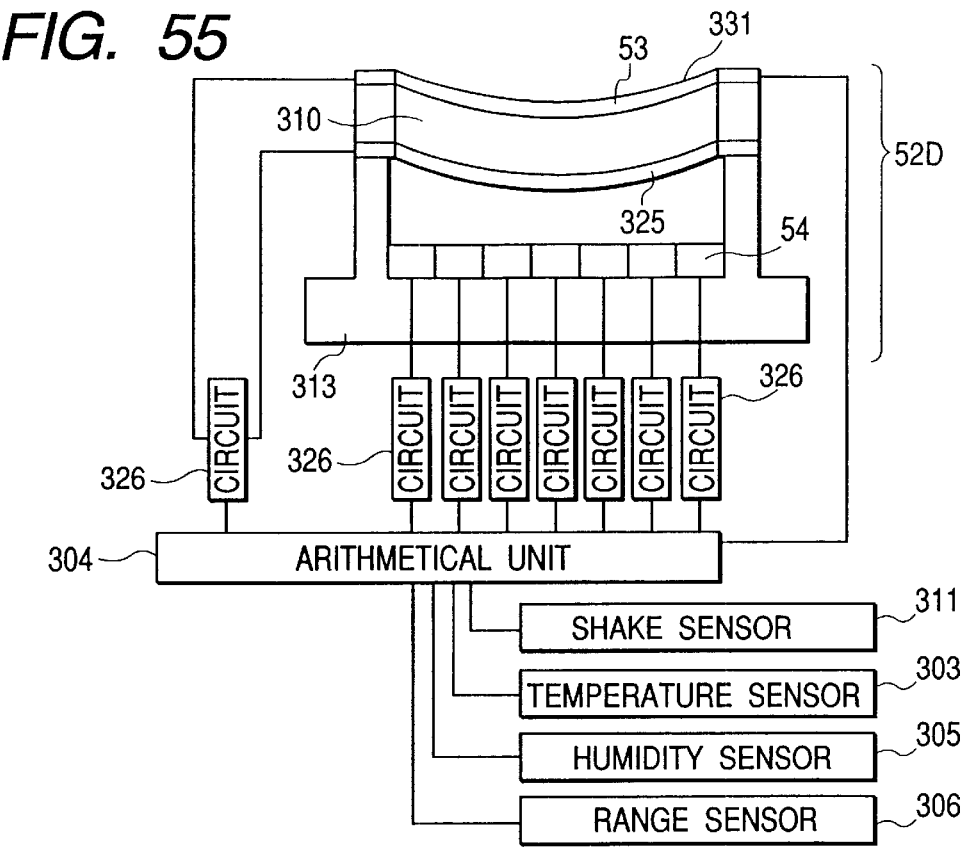

FIG. 55 shows a reflecting mirror 52D which is another example of the variable mirror. Voltages are applied to the piezoelectric element 310, across the thin film 53 and an electrode 325, through drive circuits 326, and thus a mirror 331 is deformed. Since the electrodes 54 are also provided, the mirror 331 is deformed even by an electrostatic force. The reflecting mirror 52D, in contrast with the reflecting mirrors 52, 52B, and 52C, can provide various deformation patterns and is quick in response.

Figure 56:
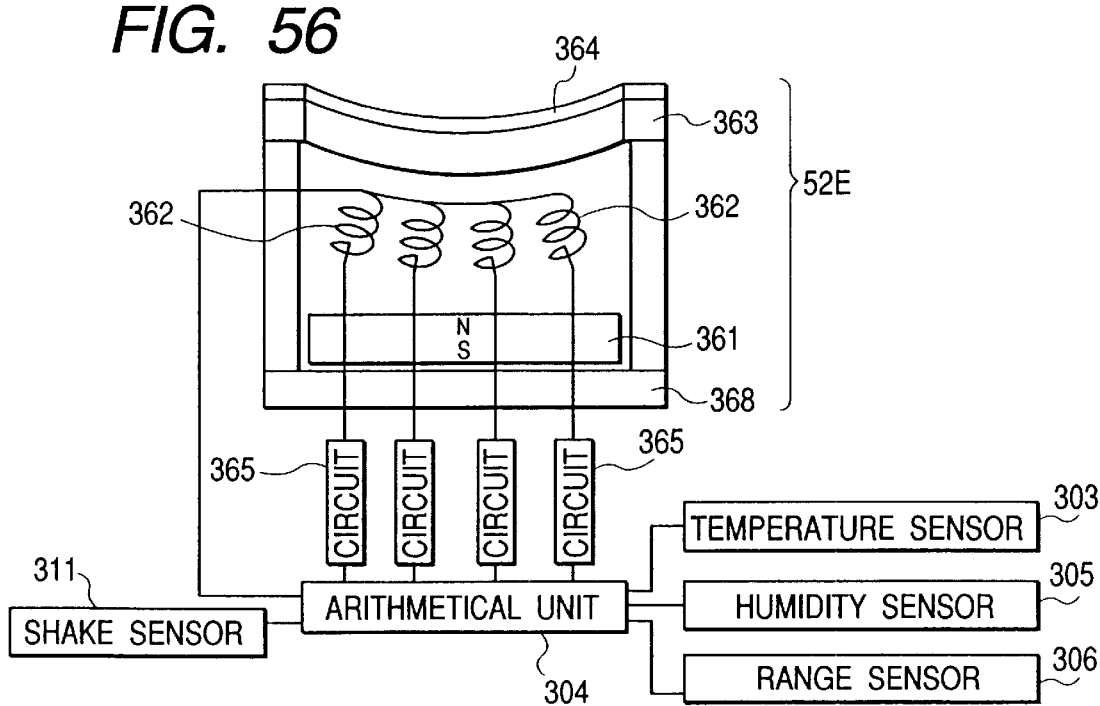

FIG. 56 shows a variable mirror 52E utilizing an electromagnetic force which is still another embodiment of the present invention. The variable mirror 52E can be used instead of the variable mirror 52. A plurality of coils 362 are arranged above a permanent magnet 361 and are constructed integrally with a substrate 363 of the mirror. The substrate 363 is made with silicon nitride or polyimide. A reflecting film 364 consisting of a metal coating, for example, an Al coating, is deposited on the surface of the substrate 363 to construct a reflecting mirror. When proper electric currents flow through the coils 362 from the drive circuits 365, the coils 362 are repelled or attracted by the electromagnetic force with the permanent magnet 361, and the substrate 363 and the reflecting film 364 can be deformed. In response to changes of the optical system obtained by signals from the sensors 303, 305, 306, and 311, the signals are transmitted from the arithmetical unit 304 to the drive circuits 365, and the substrate 363 and the reflecting film 364 are deformed. Different currents can also flow through the coils 362. The plurality of coils 362 need not necessarily be used, that is, a single coil may be used. Furthermore, the permanent magnet 361 may be provided on the substrate 363, and the coils 362 may be provided on the side of a substrate 368. It is desirable that the coils 362 are fabricated by the lithography process. A ferromagnetic core (iron core) may be encased in each of the coils 362.

Figure 57:
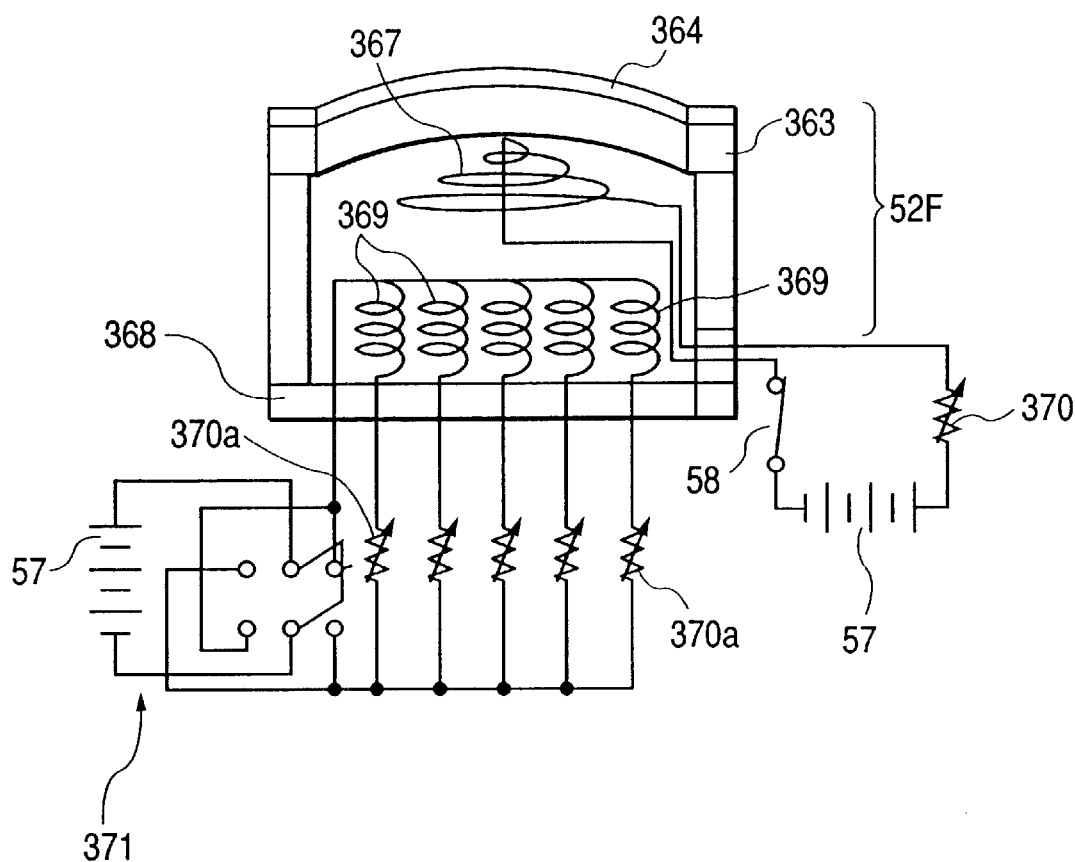
Figure 58:
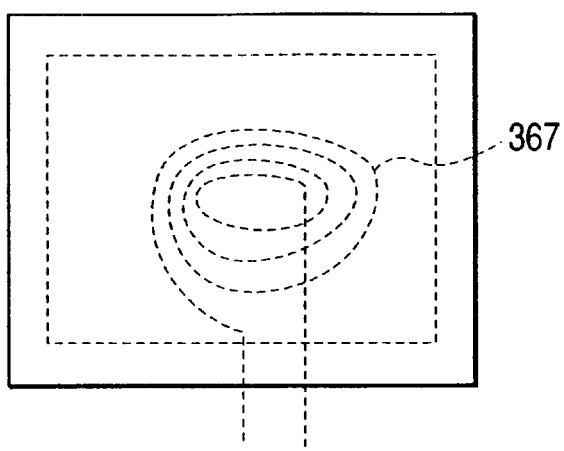
FIG. 58 is a plan view showing an example of a thin-film coil used in the variable optical-property mirror of FIG. 57.
Figure 59:
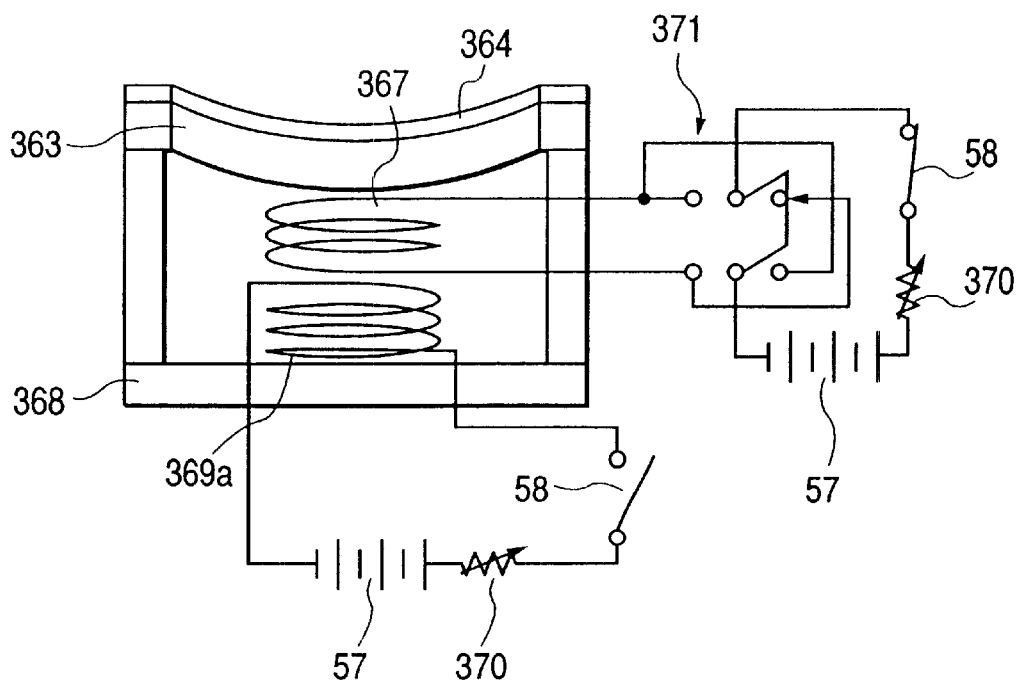
FIG. 59 is a view showing a modification example of the variable optical-property mirror of FIG. 57.

FIG. 57 shows a variable mirror 52F which is another example of the variable mirror utilizing the electromagnetic force. A plurality of coils 369 are arranged on the substrate 368 opposite to a thin-film coil 367 provided on the back surface of the substrate 363. A plurality of variable resistors 370a are energized and thereby the electromagnetic force exerted between the thin-film coil 367 and the coils 369 is varied to deform the substrate 363, so that this system can be operated as a variable mirror. By reversing the operation of a switch 371, the direction of the currents flowing through the coils is changed, and the whole of the substrate 363 and the thin film 364 can be deformed to have either a concave or convex surface. Reference numeral 370 denotes a variable resistor. The configuration of the coil 367, as shown in FIG. 58, is changed so that a coil density varies with place, and thereby a desired deformation can be brought to the substrate 363 and the thin film 364. Instead of the plurality of coils 369, as shown in FIG. 59, a single coil 369a may be used. A ferromagnetic core (iron core) may be encased in the coil 369a.

Figure 60:
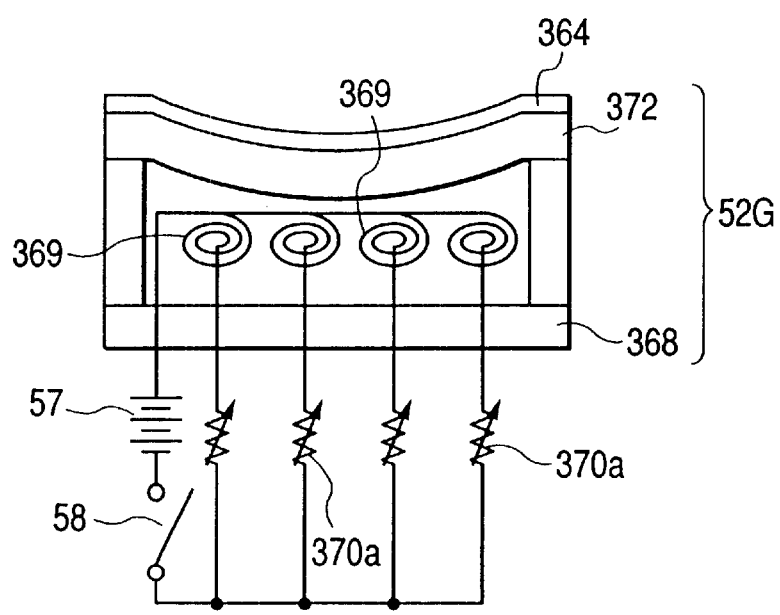
FIG. 60 is a view showing another embodiment of the variable optical-property mirror.

FIG. 60 shows a reflecting mirror 52G which is another example of the variable mirror utilizing the electromagnetic force. The reflecting film 364 is deposited on a mirror substrate 372 which is made with a ferromagnetic, for example, iron. The reflecting mirror 52G, in contrast with the mirror of FIG. 57, dispenses with the coil 367, so that its fabrication is easy and cost reduction can be achieved accordingly. By varying the currents flowing through the coils 369, the substrate 372 can be arbitrarily deformed.

Figure 61:
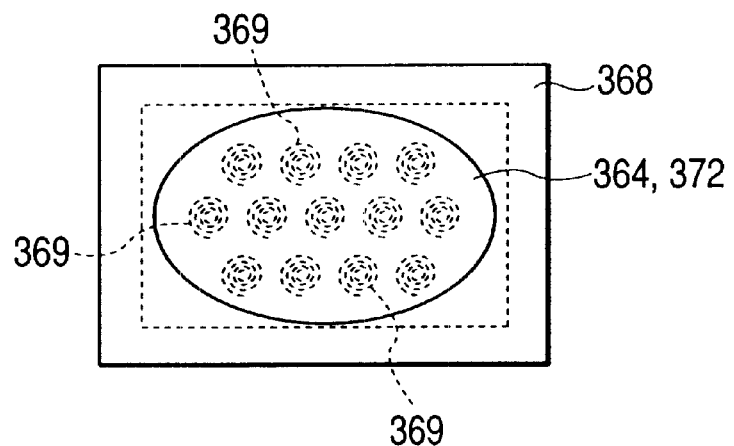
FIG. 61 is a plan view showing one example of an array of coils used in the variable optical-property mirror of FIG. 60.
Figure 62:
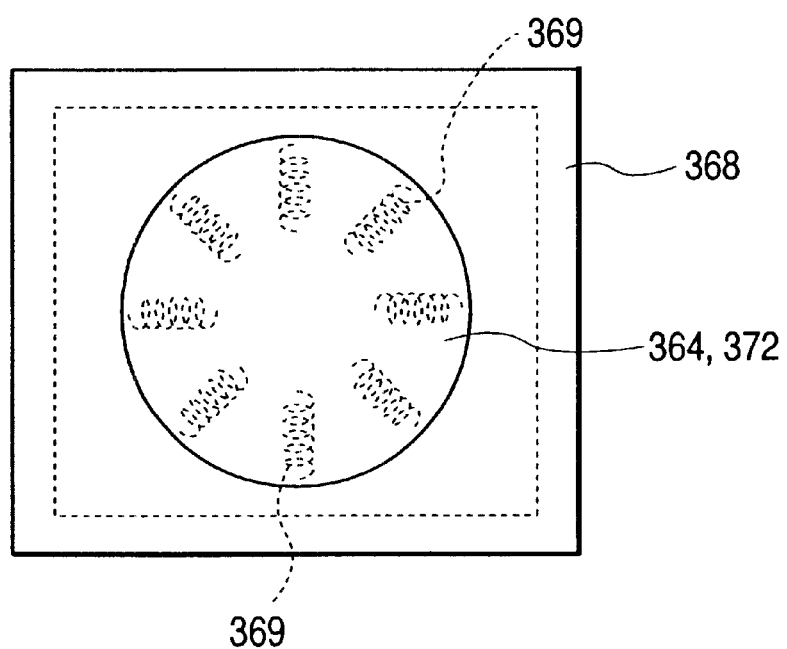
FIG. 62 is a plan view showing another example of the array of coils.

FIG. 61 shows one configuration of the coils 369, looking at from above. FIG. 62 shows another configuration of the coils 369, looking at from above.

The configuration of the coils shown in each of FIGS. 61 and 62 is applicable to the coils 362 of the reflecting mirror 52E and the coils 369 of the reflecting mirror 52F.

Figure 63:
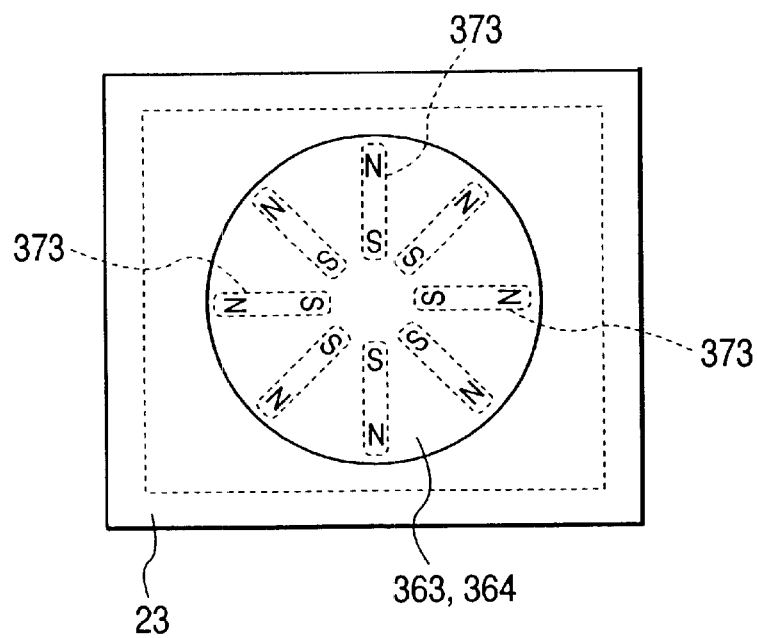
FIG. 63 is a plan view showing an array of permanent magnets suitable for the array of coils of FIG. 62.

FIG. 63 shows the configuration of permanent magnets which can be used in the reflecting mirror 52E, together with an array of coils in FIG. 62. A plurality of bar magnets 373 are radially arranged. The bar magnets 373, in contrast with the permanent magnet 361, are capable of providing a delicate deformation to the substrate 363 and the thin film 364. Each of the variable mirrors 52E, 52F, and 52G using the electromagnetic force has the merit that it can be driven at a low voltage, compared with the variable mirror using the electrostatic force.

Figure 64:
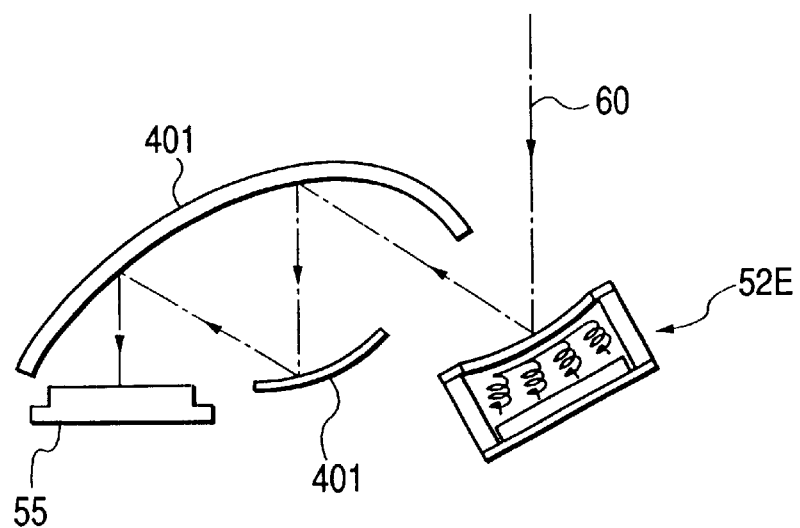
FIG. 64 is a view showing an example of an optical apparatus using a reflecting mirror with an extended surface in the present invention.

In some embodiments of the present invention, the extended surface prism 189 is used, but instead of this, as shown in FIG. 64, a reflecting mirror 401 having an extended surface may be used. The reflecting surface of the reflecting mirror 401 is configured as the extended surface. The reflecting mirror 401, in contrast with the extended surface prism, has the merit that its weight is light because of a hollow mirror. This figure is cited as an example of the bar-code scanner of an electronic imaging device.

Figure 65:
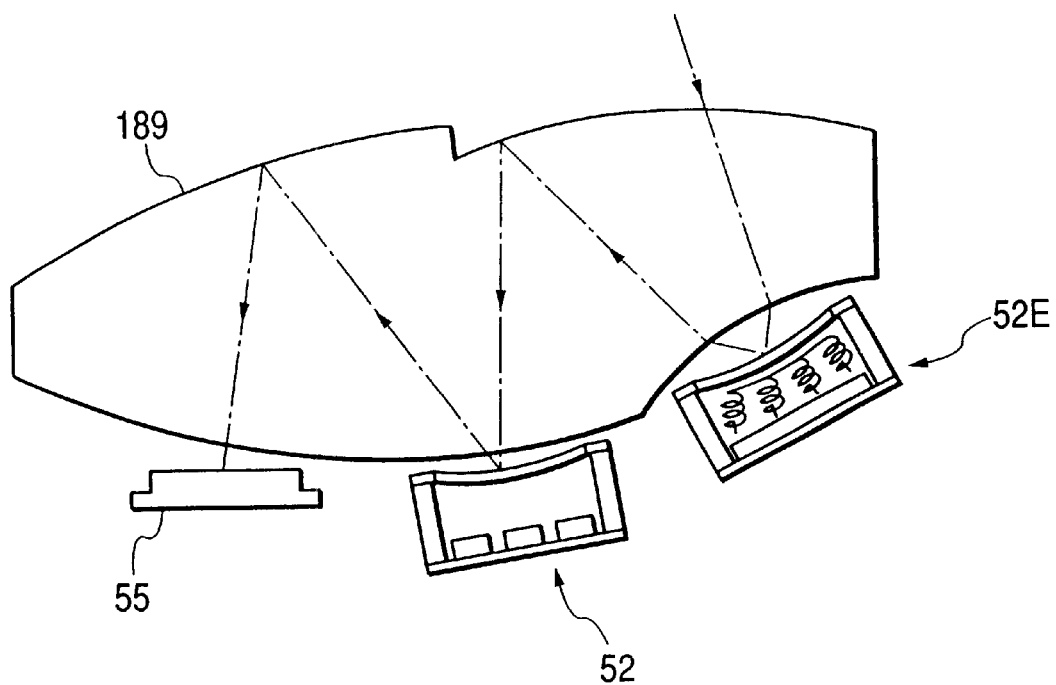
FIG. 65 is a view showing an example of an optical apparatus using a plurality of variable optical-property mirrors in the present invention.

In the present invention, as show in FIG. 65, at least two variable mirrors can also be used to construct the optical system. In doing so, the shake prevention and the focusing adjustment can be made by separate variable mirrors, and this increases the number of degrees of freedom of optical design. Alternatively, at least two variable mirrors can be used in one optical system to perform the zooming operation, focusing adjustment, and shake prevention of the optical system. This figure is cited as an example of a digital camera.

As is true of any optical apparatus in the present invention, it is desirable that the variable mirror is placed close to the stop of the optical system. It is for this reason that since a ray height is low in the proximity of the stop, the size of the variable mirror can be reduced, and a response speed, as well as cost and weight, is unsurpassed.

Figure 66:
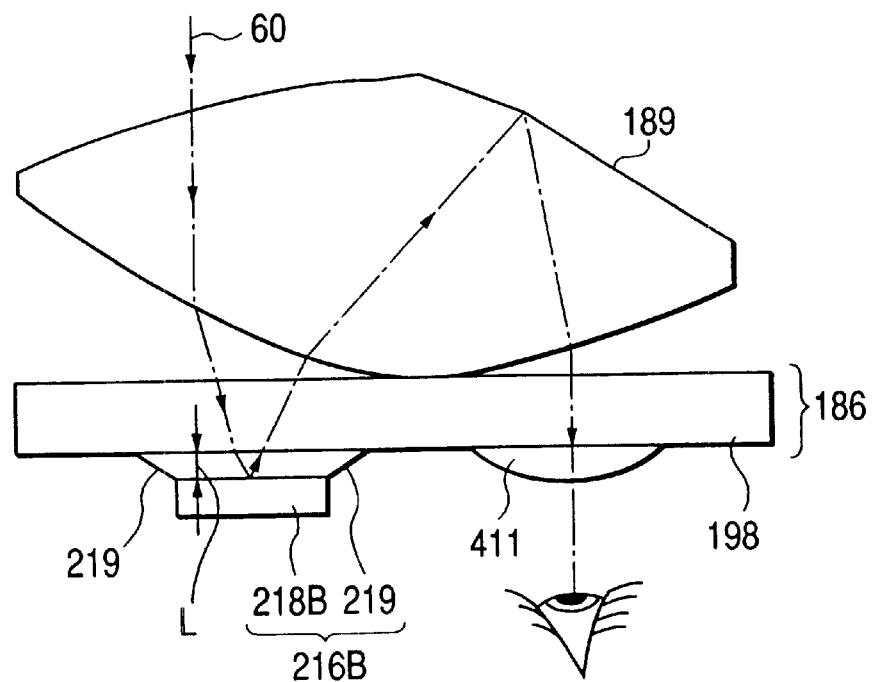
FIG. 66 is a view showing another embodiment of the present invention.

In an embodiment shown in FIG. 66, an optical apparatus is constructed as a finder for digital cameras which is an example of an observing device. The optical apparatus of the present invention is provided with a legged mirror 216B in which the lens 218 of the legged lens 216 shown in FIGS. 48 and 49 is replaced by a mirror 218B. Besides the legged mirror 216B, the optical apparatus has the platelike unit 186 including the transparent substrate 198 and a lens 411 and the extended surface prism 189. The optical apparatus of the present invention is designed so that the legs 219 are slid to change the distance L between the mirror 218B and the transparent substrate 198 and thereby the diopter adjustment can be made. The legged lens 216 shown in FIGS. 48 and 49 is used as an example of a moving lens which is one of the moving optical elements. As another example of the moving lens, an electrostatic lens is cited.

Figure 67:
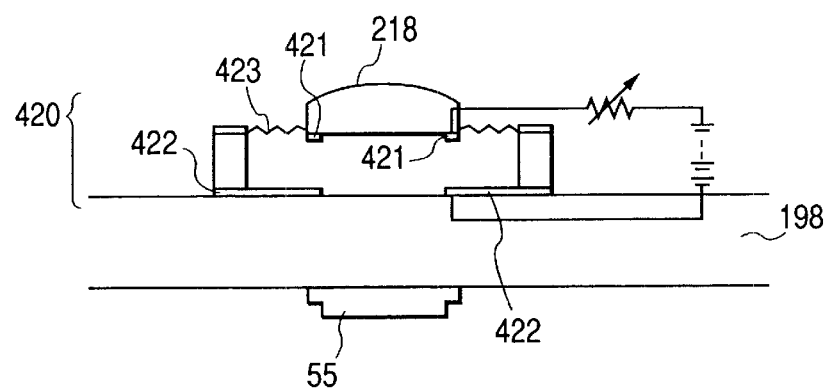
FIG. 67 is a view showing an electrostatic lens used as a moving lens in the present invention.

FIG. 67 shows this electrostatic lens. An electrostatic lens 420 is provided with the lens 218, electrodes 421 and 422, and a damper 423. The electrostatic lens 420 is designed so that a voltage is applied across the electrodes 421 and 422, and thereby a distance between the lens 218 and the transparent substrate 198 is changed by an electrostatic force to perform the focusing and zooming operations. The damper 423 is adapted to hold the lens 218 and absorb a shock experienced when the lens 218 is moved.

Figure 68:
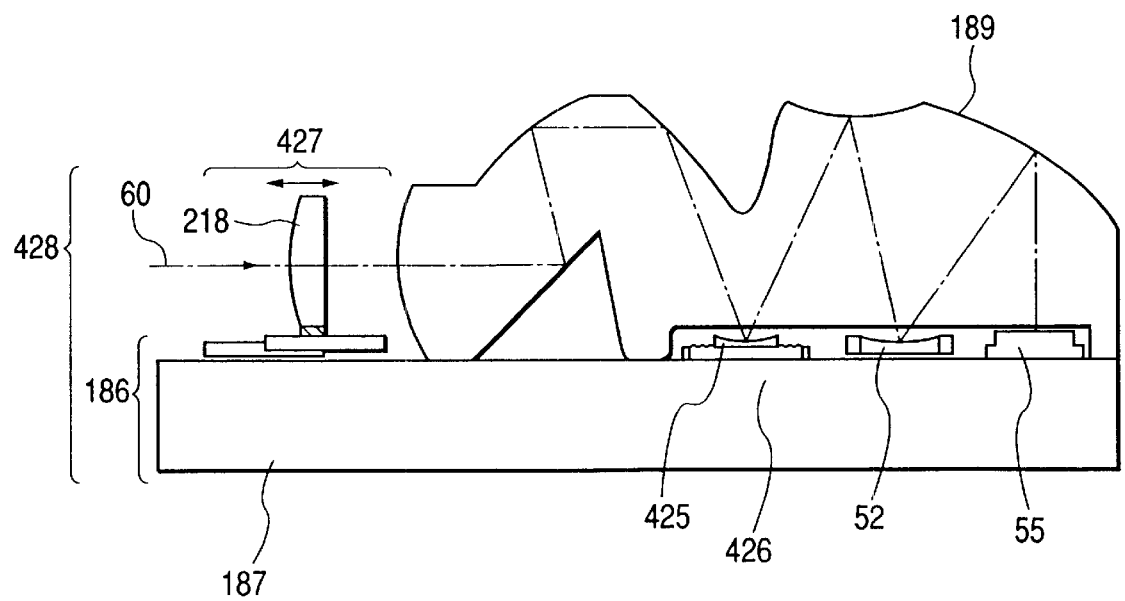
FIG. 68 is a view showing another embodiment of the present invention.

In an embodiment shown in FIG. 68, an optical apparatus 428 is constructed with the reflecting mirror 52 which is one of the variable optical-property elements, a moving mirror 426 which is one of the moving optical elements, and a self-running lens 427 which is an example of the moving lens of one of the moving optical elements. In addition, the optical apparatus 428 is provided with the silicon substrate 187 and the extended surface prism 189.

The optical apparatus 428 is designed so that the focal length of the reflecting mirror 52 and the positions of the self-running lens 427 and a mirror 425 are changed, and thereby the zooming and focusing operations can be performed.

The extended surface prism 189 used in this embodiment may be constructed of a material absorbing infrared light to have an infrared cutoff effect. The lens 218 shown in FIG. 67 may be replaced with the mirror 425 as the moving mirror 426 so that the mirror 426 is used as the moving optical element in the above embodiment.

Figure 69:
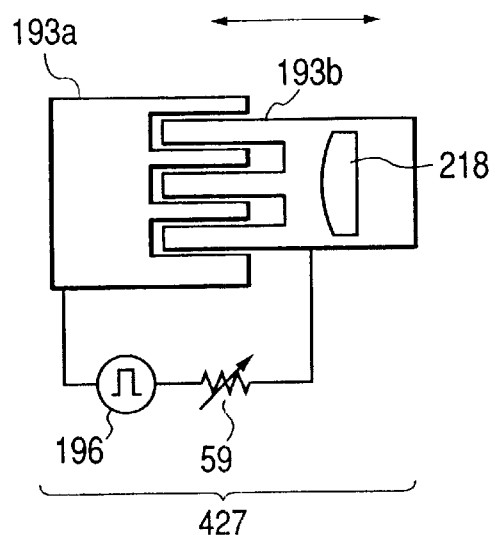
FIG. 69 is a view showing schematically a self-running lens used in the embodiment of FIG. 68.

The self-running lens 427, as depicted in FIG. 69, has electrodes 193a and 193b and the lens 218 fixed to the electrode 193b so that a potential difference are placed across the two comb-shaped electrodes 193a and 193b and the lens 218 can be moved in the direction of an arrow by the electrostatic force.

Recently, compactness of digital cameras has been required, and in particular, card type thin digital cameras are excellent and convenient for carrying. However, in an imaging device combining a conventional optical system and electric system, there is a limit to compactness.

Thus, the present invention is made so that an imaging device and an optical apparatus used in the card type thin digital cameras can be provided.

Figure 70:
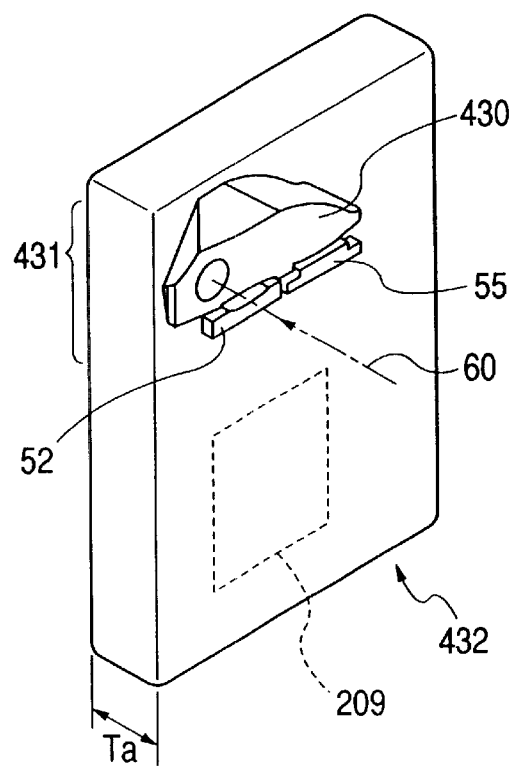
FIG. 70 is a view showing another embodiment of the present invention.

An optical apparatus shown in FIG. 70 constructs a digital camera 432 which uses an imaging unit 431 combining an extended surface prism 430 which is one of the optical blocks, on a platelike unit. The digital cameras 432 is also provided with the display 209 such as a liquid crystal display. The digital camera 432 is designed so that the imaging unit 431 is capable of imaging an object situated in a direction along a thickness Ta of the digital camera 432.

Figure 71:
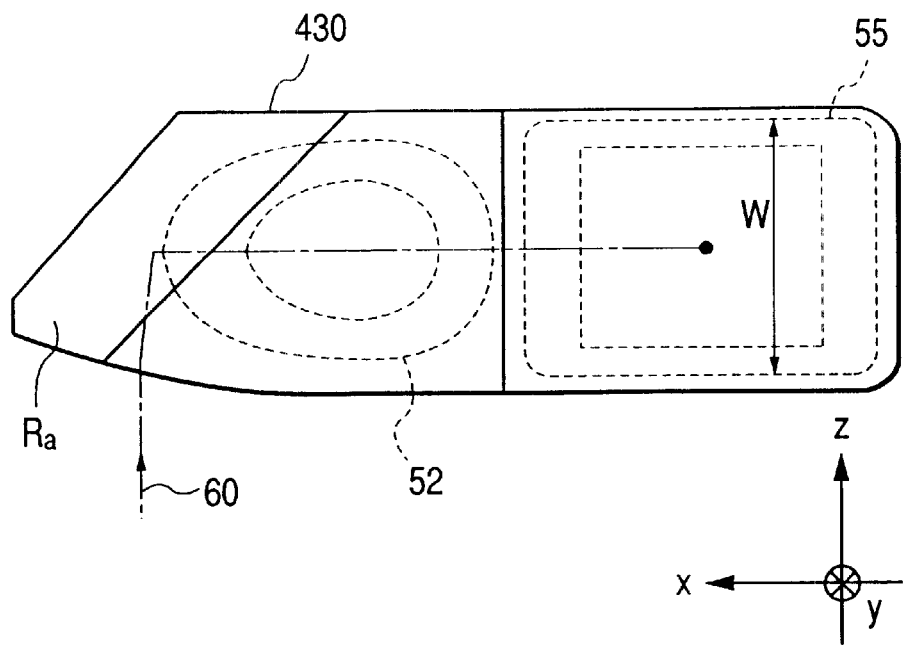
FIG. 71 is a plan view showing an extended surface prism used in the embodiment of FIG. 70.
Figure 72:
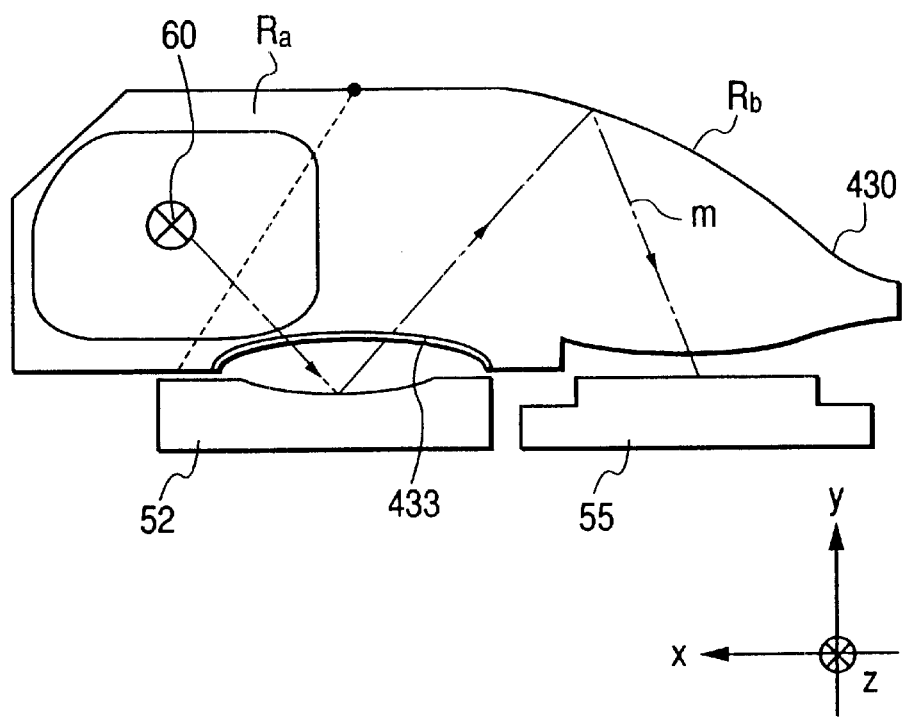
FIG. 72 is a side view showing the extended surface prism in FIG. 70, looking at from the object side.

In FIGS. 71 and 72, the extended surface prism 430 is such that the light 60 from the object is reflected by a reflecting surface Ra, and after changing its direction in the x-y plane and toward the reflecting mirror 52 and being reflected thereby, is reflected by a reflecting surface Rb to enter the solid-state image sensor 55. In this way, when the extended surface prism 430 is constructed so that the light 60 incident on the extended surface prism 430 has a helical relationship with a ray of light m emerging from the extended surface prism 430 and entering the solid-state image sensor 55, the thickness of the digital camera 432 can be reduced to the same extent as a width W of the image sensor 55.

Instead of the extended surface prism 430, the optical element such as a lens or prism which is commonly used, or the extended surface prism such as the optical block 189 shown in FIG. 39 may be used to construct an optical system so that the ray of light m incident on the image sensor 55 has the helical relationship with the incident light 60 from the object. An infrared cutoff interference film 433 may also be placed in the optical path of the extended surface prism 430.

Figure 73:
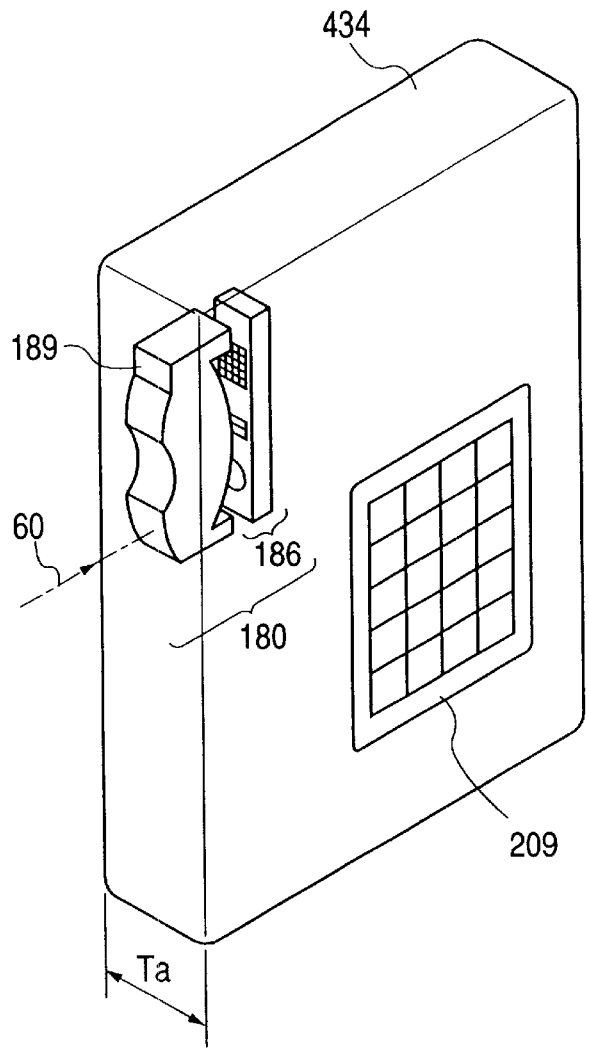
FIG. 73 is a view showing another embodiment of the present invention.

An optical apparatus shown in FIG. 73 is another example of the digital camera which is different from that of FIG. 70, and uses the imaging unit 180 for small-sized digital cameras shown in FIG. 39 to construct a digital camera 434. The digital camera 434 of this embodiment is designed so that the imaging device 180 for small-sized digital cameras is capable of imaging an object situated in a direction perpendicular to the direction of the thickness Ta of the digital camera 434. According to this embodiment, the imaging unit 180 for small-sized digital cameras is placed so that the incident light from the object makes a right angle with the direction of the thickness Ta of the digital camera 434, and hence the thickness of the digital camera 434 can be reduced.

Also, in the imaging device of the digital camera, besides the imaging unit shown in each of FIGS. 70 and 73, either the platelike unit or apparatus of the present invention can be used. The platelike unit or apparatus may be used in the optical system or imaging device other than that of the digital camera, for example, of the PDA.

Figure 74:
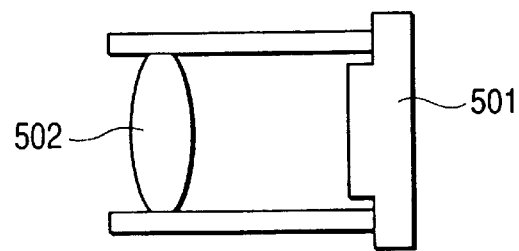
FIG. 74 is a view showing an example of a conventional imaging device.

In recent years, electronic imaging devices for electronic cameras and video cameras have increased. In most cases, each of these devices, as shown in FIG. 74, is constructed with a combination of a solid-state image sensor 501 and a lens system 502. Since, however, such a device, which is complicated in structure, has a large number of parts and is troublesome to set up, there are limits to compactness and cost reduction.

Thus, the present invention is made so that an electronic imaging device which is small in size and low in cost can also be provided. The optical apparatus of the present invention for achieving this purpose is designed so that at least one image sensor and one optical element are placed on the surface of a single transparent substrate to have an imaging function by themselves or by adding other parts.

Figure 75:
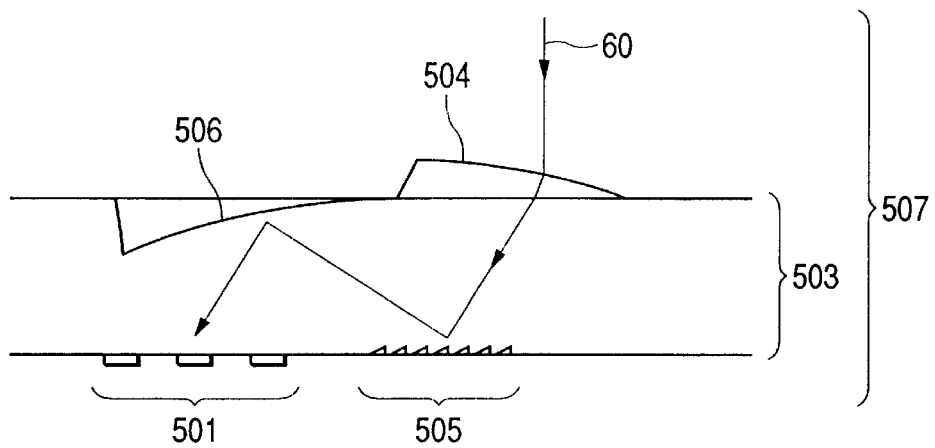
FIGS. 75 and 76 are views showing other embodiments of the present invention.

In an imaging device shown in FIG. 75, extended surfaces 504 and 506 and a diffraction optical element (hereinafter referred to as DOE) 505 are configured on both surfaces of a single transparent substrate 503 made with glass, crystal, or plastic, and a solid-state image sensor 501 is also fabricated on the surface thereof by a silicon thin-film technique. This is called a platelike imaging unit 507. The extended surface is used for either a refracting or reflecting function. In the embodiment, the light 60 from the object is refracted by the extended surface 504, and after deflection and reflection by the off-axis type DOE 505, is reflected by the extended surface 506 to form an image on the solid-state image sensor 501. Since the extended surfaces 504 and 506 and the ODE 505 are corrected for aberration, a good image formed to the same extent as in an ordinary lens system enters the solid-state image sensor 501. The extended surfaces 504 and 506 may be configured by a molding technique and the DOE 505 may be fabricated by a molding or lithography technique, together with the solid-state image sensor 501. The solid-state image sensor 501 may be fabricated directly on the transparent substrate 503 by the lithography technique. In case where this is difficult, however, the solid-state image sensor 501 may be separately prefabricated before it is constructed integrally with the transparent substrate 503. Alternatively, although not shown in the figure, parts such as lenses may be additionally placed outside the platelike imaging unit 507 so that these parts and the platelike imaging unit 507 have an imaging function. Also, the DOE 505 may be placed on the surface of the transparent substrate 198, the extended surface prism 189, or the platelike unit 186.

Figure 76:
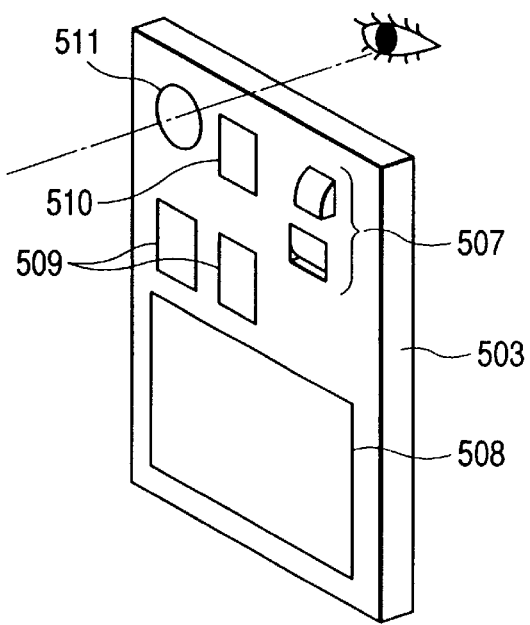
Figure 77:
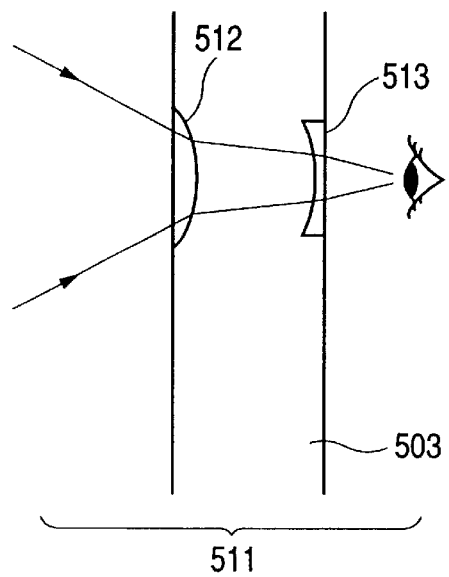
FIG. 77 is a sectional view showing a finder section of the embodiment of FIG. 76.

In FIG. 76, an optical apparatus is a unit for personal digital assistants in which the imaging unit 507 is fabricated, together with a TFT liquid crystal display 508, ICs 509 of peripheral circuitry, and a microprocessor 510, on the transparent substrate 503. The imaging unit 507 may also be fabricated, together with an IC (LSI) having the functions of a memory and a telephone. A finder 511 of the electronic imaging device is also provided on the transparent substrate 503. The finder 511 may have a simple structure such that only a field frame is placed on the transparent substrate 503, or as shown in FIG. 77, may be provided with a negative lens 512 and a positive lens 513 in both surfaces of the transparent substrate 503 to construct a Galilean telescope type finder. Alternatively, at least one of the negative lens 512 and the positive lens 513 may be placed outside the transparent substrate 503 to construct a finder, together with the remaining lens on the transparent substrate 503.

Figure 78:
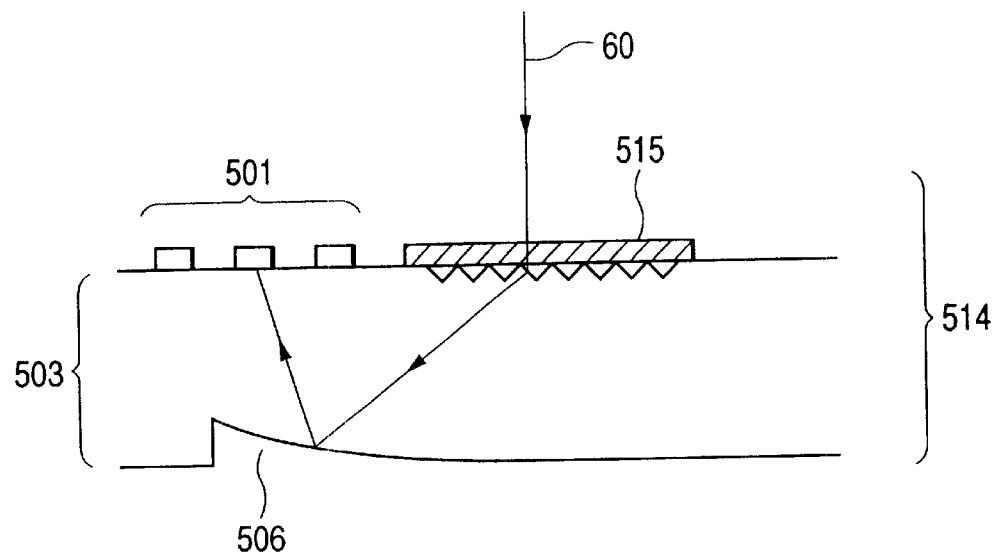
FIG. 78 is a view showing another embodiment of the present invention.
Figure 79:
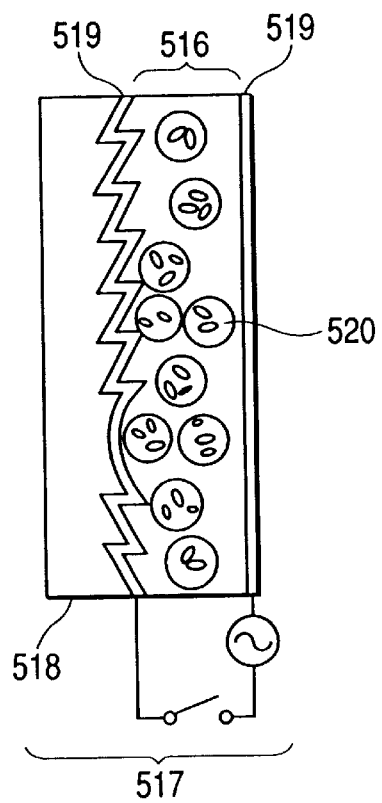
FIG. 79 is a view showing an optical element used in the embodiment of FIG. 78.
Figure 80:
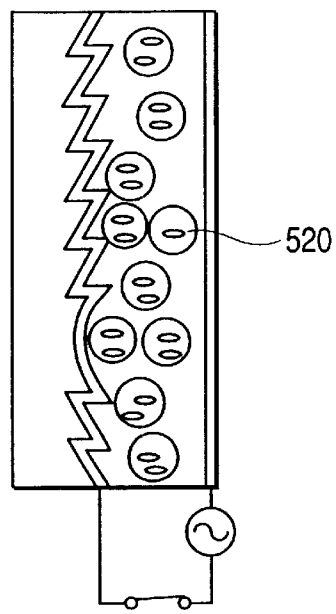
FIG. 80 is a view showing the orientation of liquid crystal molecules where a voltage is applied in FIG. 79.
Figure 81:
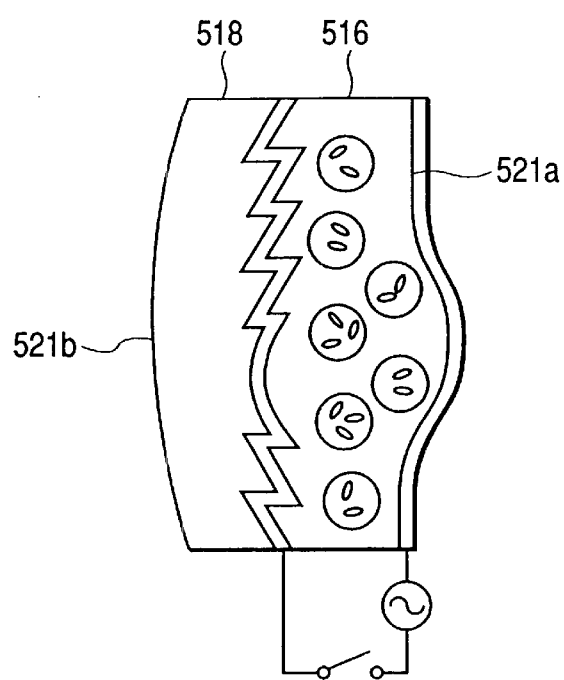
FIG. 81 is a view showing one modification example of the optical element of FIG. 79.
Figure 82:
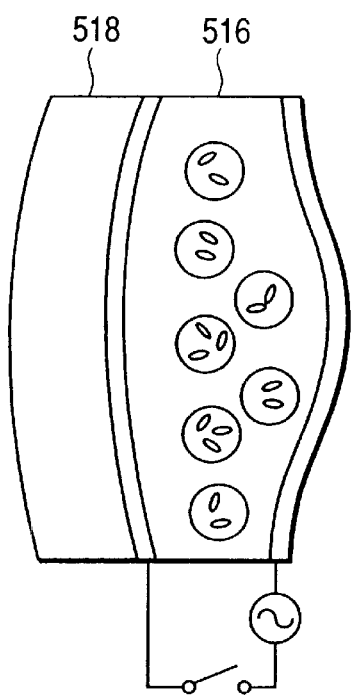
FIG. 82 is a view showing another modification example of the optical element.

In FIG. 78, an optical apparatus is a platelike imaging unit in which the focusing adjustment is possible. Where the focusing adjustment is made by a platelike imaging unit 514, it is impossible to mechanically shift the positions of the DOE 505 and the extended surface 506 shown in FIG. 75. Thus, the platelike imaging unit 514 of this embodiment uses an optical element 515 in which the focal length is variable. FIG. 79 shows an example of the optical element 515. It is a variable focal-length DOE 517 using a macromolecular dispersed liquid crystal 516. At least one surface of a transparent substrate 518 is provided with a groove with a width nearly equal to the wavelength of light. When a voltage is applied to a transparent electrode 519, the orientation of liquid crystal molecules 520, as shown in FIG. 80, becomes uniform, and therefore the refractive index of the macromolecular dispersed liquid crystal 516 is lowered. On the other hand, when no voltage is applied, the liquid crystal molecules 520 are oriented at random, and thus the refractive index of the macromolecular dispersed liquid crystal 516 is raised. In this way, the variable focal-length DOE 517 is capable of changing the focal length by applying or removing the voltage. When the weight ratio of the liquid crystal molecules 520 to the macromolecular dispersed liquid crystal 516 is increased over some extent (for example, more than 25%), the macromolecular dispersed liquid crystal 516 approaches a solid phase, and thus a substrate need not be provided on the right side of the macromolecular dispersed liquid crystal 516. Moreover, as shown in FIG. 81, the right-side surface of the macromolecular dispersed liquid crystal 516 and the left-side surface of the transparent substrate 518 may be configured as curved surfaces 521*a* and 521*b*, respectively, to have a lens function and correct aberration. In each of FIGS. 79 and 81, the right-side surface of the transparent substrate 518 may be configured not as an DOE surface, but as a fresnel surface. In this case, the DOE 517 acts as a variable focal-length Fresnel lens. In addition, as shown in FIG. 82, the right-side surface of the transparent substrate 518 may also be configured as a curved surface such as that of an ordinary lens. Each of the transparent substrates 503 and 518 may be designed to have the effect of an infrared cutoff filter.

Figure 83:
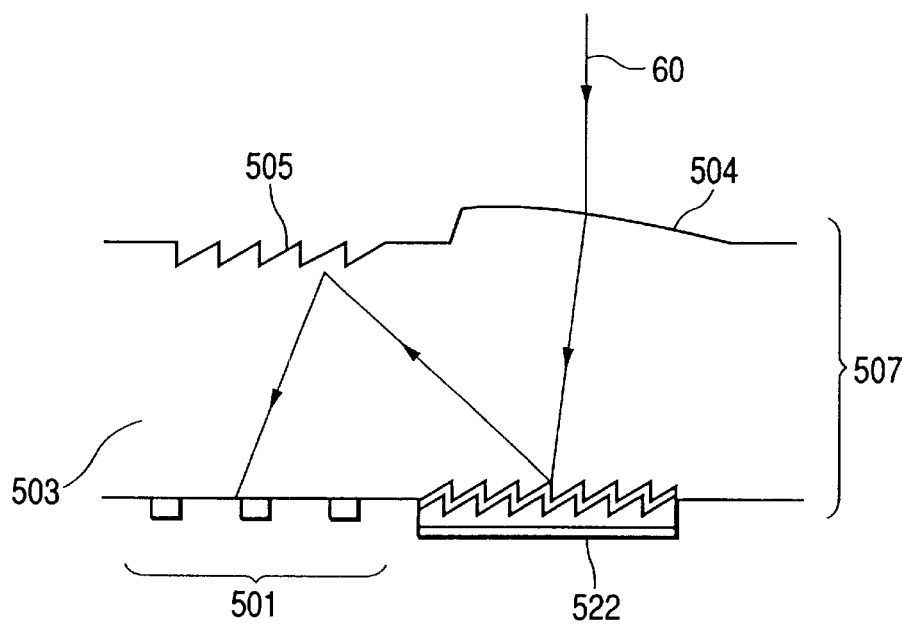
FIG. 83 is a view showing another embodiment of the present invention.
Figure 84:
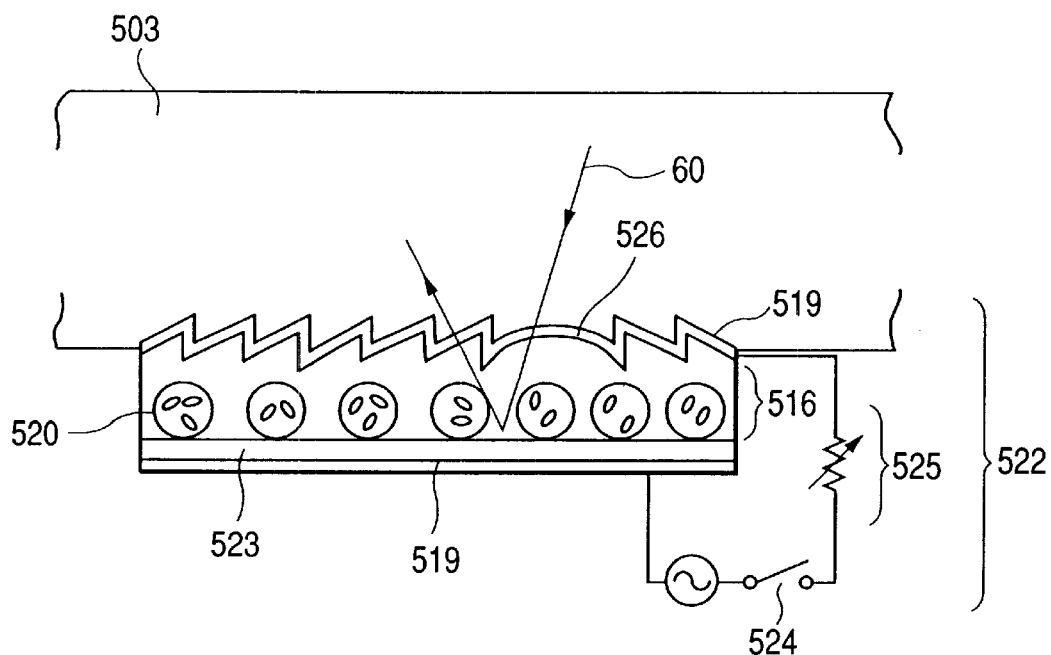
FIG. 84 is a view showing a variable focal-length Fresnel mirror used in the embodiment of FIG. 83.

In FIG. 83, an optical apparatus is a platelike imaging unit using a reflection type variable focal-length Fresnel mirror 522. The variable focal-length Fresnel mirror 522, as shown in FIG. 84, is provided with a reflecting surface 523 so that the refracting power of a Fresnel surface 526 is changed by varying a voltage through a switch 524 or a variable resistor 525, and hence behaves as a variable focal-length Fresnel mirror. Instead of the Fresnel surface 526, the DOE may be used.

Figure 85:
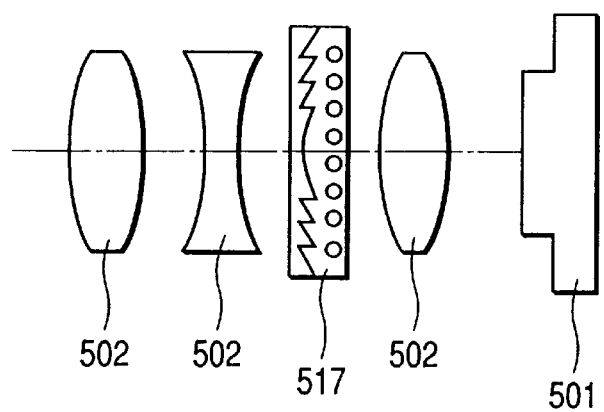
FIG. 85 is a view showing an application example of a variable focal-length diffraction optical element.

The variable focal-length DOE 517 and the fresnel mirror 522 of this embodiment may be used not only in the platelike imaging unit 507, but also, as shown in FIG. 85, in an ordinary imaging device, or a variable focal-length lens system for optical disks with different thicknesses, an electronic endoscope, a TV camera, or a film camera. It is favorable that a tolan-base liquid crystal, for example, Dai Nippon Ink DON-605: N-1 (Jap. Chem. pp. 14–18, February, 1997) is used. This is because the liquid crystal is good in optical isotropy ($\Delta n=0.283$, where $\Delta n$ stands for an optical isotropy, which is a difference in length between the major axes of index ellipsoids), low in viscosity, and is capable of changing the focal length with high speed.

Also it is advantageous for fabrication and cost that the sizes of the variable optical-property element, the moving optical element, the shutter, the stop, the display element, and the imaging element which are used in the present invention are less than 7 cm. The sizes of less than 3 cm are more advantageous.

What is claimed is:

1. An imaging optical apparatus comprising:
a reflecting type, variable optical property, element;
a drive circuit which drives said reflecting-type, variable optical property, element; and
an optical block,
wherein said imaging optical apparatus defines a folded optical axis, is configured to cause rays to be obliquely incident on said reflecting type, variable optical property, element, and further comprises at least two of a movable optical element, a shutter, a stop, an image sensor, and a display element.

2. An imaging optical apparatus comprising:
a reflecting type, variable optical property, element;
a drive circuit which drives said reflecting type, variable optical property, element; and
an optical block,
wherein said imaging optical apparatus defines a folded optical axis, is configured to cause rays to be obliquely incident on said reflecting type, variable optical property, element, and further comprises at least three of a movable optical element, a shutter, a stop, an image sensor, and a display element.

3. An imaging optical apparatus according to claim 1, wherein said reflecting type, variable optical property, element is a deformable mirror.

4. An imaging optical apparatus comprising:
a reflecting type, variable optical property, element;
a drive circuit which drives said reflecting-type variable optical property element; and
an optical block,
wherein said imaging optical apparatus defines a folded optical axis, is configured to cause rays to be obliquely incident on said reflecting type, variable optical property, element, and is further provided with at least three of a movable optical element, a shutter, a stop, an image sensor, a display element, an infrared cutoff function, and a low-pass filter function.

5. An imaging optical apparatus comprising:
a reflecting type, variable optical property, element;
a drive circuit which drives said reflecting-type variable optical property element; and
an optical block having a curved surface,
wherein said imaging optical apparatus defines a folded optical axis, is configured to cause rays to be obliquely incident on said reflecting type, variable optical property, element, and further comprises at least two of a movable optical element, a shutter, a stop, an image sensor and a display element.

6. An imaging optical apparatus comprising:
a reflecting type, variable optical property, element;
a drive circuit which drives said reflecting type, variable optical property, element;
an optical block; and
a variable aperture-area stop,
wherein said imaging optical apparatus defines a folded optical axis, is configured to cause rays to be obliquely incident on said reflecting type, variable optical property, element, and further comprises at least two of a movable optical element, a shutter, an image sensor and a display element, and said reflecting type variable optical-property element or an optical element has an optical surface having a rotationally asymmetric shape.

7. An imaging optical system comprising:
a plurality of reflecting type, variable optical property, elements;
a drive circuit which drives said reflecting type, variable optical property, elements; and
an optical block,
wherein said imaging optical system defines a folded optical axis, is configured to cause rays to be obliquely incident on said reflecting type, variable optical property, elements, and is further provided with at least one of a movable optical element, a shutter, a stop, a lens, an image sensor, a display element, an infrared cutoff function, and a low-pass filter function.

8. An imaging optical system according to claim 7, wherein said optical block has a curved surface.

9. An imaging optical apparatus according to claim 1, 2, 4, 5, or 6, wherein said imaging optical apparatus comprises a focus detecting mechanism.

10. An imaging optical system according to claim 7, wherein said imaging optical system comprises a focus detecting mechanism.

11. An imaging optical apparatus according to claim 1, 2, 4, 5, or 6, wherein said imaging optical apparatus is constructed and arranged to have a zoom function.

12. An imaging optical system according to claim 7, wherein said imaging optical system is constructed and arranged to have a zoom function.

13. An imaging optical apparatus according to claim 1, 2, 4, 5, or 6, wherein said reflecting type, variable optical property, element is a deformable mirror.

14. An imaging optical system according to claim 7, wherein said reflecting type, variable optical property, elements are deformable mirrors.

15. A photographing optical system comprising:
a displaceable lens;
a reflecting type, variable optical property, element;
a drive circuit which drives said reflecting type, variable optical property, element; and
a stop,
wherein said photographing optical system defines a folded optical axis, and is configured to cause rays to be obliquely incident on said reflecting type, variable optical property, element to be able to perform focusing and zooming.

16. A photographing optical system comprising:
a displaceable lens;
a deformable mirror;
a drive circuit which drives said deformable mirror; and
a stop,
wherein a reflecting surface of said deformable mirror is able to be adjusted to have a rotationally asymmetric shape, and said photographing optical system defines a folded optical axis, and is configured to cause rays to be obliquely incident on said deformable mirror to be able to perform focusing and zooming.

17. A photographing system comprising:
a displaceable lens;
a reflecting type, variable optical property, element;
a drive circuit which drives said reflecting type, variable optical property, element;
a stop; and
an image sensor,
wherein said photographing system defines a folded optical axis, is configured to cause rays to be obliquely incident on said reflecting type, variable optical property, element, comprises a focus detecting mechanism, and is able to perform focusing and zooming.

18. A photographing system comprising:
a displaceable lens;
a deformable mirror;
a drive circuit which drives said deformable mirror;
a stop; and
an image sensor,
wherein a reflecting surface of said deformable mirror is able to be adjusted to a rotationally asymmetric shape, and said photographing system defines a folded optical axis, is configured to cause rays to be obliquely incident on said deformable mirror, comprises a focus detecting mechanism, and is able to perform focusing and zooming.

19. A photographing system comprising:
at least one of a variable aperture-area stop, an infrared cutoff function, a shutter, and a display element;
a displaceable lens;
a deformable mirror;
a drive circuit which drives said deformable mirror; and
an image sensor,
wherein a reflecting surface of said deformable mirror is able to be adjusted to a rotationally asymmetric shape, and said photographing system defines a folded optical axis, is configured to cause rays to be obliquely incident on said deformable mirror, comprises a focus detecting mechanism, and is able to perform focusing and zooming, compensate for aberrations that are caused by focusing, and compensate for manufacturing errors.

20. A photographing system comprising:
at least one of a variable aperture-area stop, an infrared cutoff function, a shutter, and a display element;
a displaceable lens;
a deformable mirror;
a drive circuit which drives said deformable mirror; and
an image sensor,
wherein a reflecting surface of said deformable mirror has a rotationally asymmetric outline as viewed in a direction perpendicular to the reflecting surface of said deformable mirror, and is also able to be adjusted to a rotationally asymmetric shape, and said photographing system defines a folded optical axis, is configured to cause rays to be obliquely incident on said deformable mirror, comprises a focus detecting mechanism, and is able to perform focusing and zooming, compensate for aberrations that are caused by focusing, and compensate for manufacturing errors.

21. A photographing system comprising:
at least one of a variable aperture-area stop, an infrared cutoff function, a shutter, and a display element;
a displaceable lens;
a reflecting type, variable optical property, element;
a drive circuit which drives said reflecting type, variable optical property, element; and
an image sensor,
wherein said photographing system defines a folded optical axis, is configured to cause rays to be obliquely incident on said reflecting type, variable optical property, element, comprises a focus detecting mechanism, and is able to perform focusing and zooming.

22. A photographing system comprising:
a lens;
a reflecting type, variable optical property, element;
a drive circuit which drives said reflecting type, variable optical property, element;
a stop; and
an image sensor,
wherein said photographing system defines a folded optical axis, is configured to cause rays to be obliquely incident on said reflecting type, variable optical property, element, comprises a focus detecting mechanism, and is able to perform focusing.

23. A photographing system comprising:
a lens;
a deformable mirror;
a drive circuit which drives said deformable mirror;
a stop; and
an image sensor,
wherein said photographing system defines a folded optical axis, is configured to cause rays to be obliquely incident on said deformable mirror, comprises a focus detecting mechanism, and is able to perform focusing.

24. A photographing system comprising:
a lens;
a deformable mirror;
a drive circuit which drives said deformable mirror;
a variable aperture-area stop; and
an image sensor,
wherein a reflecting surface of said deformable mirror is able to be adjusted to a rotationally asymmetric shape, and said photographing system defines a folded optical axis, is configured to cause rays to be obliquely incident on said deformable mirror, comprises a focus detecting mechanism, and is able to perform focusing, compensate for aberrations that are caused by focusing, and compensate for manufacturing errors.

25. A photographing system comprising:

a least one of a shutter and a display element;

a lens;

a deformable mirror;

a drive circuit which drives said deformable mirror;

a variable aperture-area stop;

an infrared cutoff function; and an image sensor, wherein a reflecting surface of said deformable mirror has a rotationally asymmetric outline as viewed in a direction perpendicular to the reflecting surface of said deformable mirror, and is able to be adjusted to a rotationally asymmetric shape, and said photographing system defines a folded optical axis, is configured to cause rays to be obliquely incident on said deformable mirror, comprises a focus detecting mechanism, and is able to perform perform focusing, compensate for aberrations that are caused by focusing, and compensate for manufacturing errors.

26. An imaging optical apparatus according to claim 1, 2, 4, or 6, wherein the size of said reflecting type, variable optical property, element is 7 cm or smaller.

27. An imaging optical system according to claim 7, wherein a size of each of said reflecting type, variable optical property, elements is 7 cm or smaller.

28. A photographing optical system according to claim 15, wherein a size of said reflecting type, variable optical property, element is 7 cm or smaller.

29. A photographing optical system according to claim 16, wherein a size of said deformable mirror is 7 cm or smaller.

30. A photographing system according to claim 17, 21 or 22 wherein a size of said reflecting type, variable optical property, element is 7 cm or smaller.

31. A photographing system according to claim 18, 19, 20, 23, 24, or 25, wherein a size of said deformable mirror is 7 cm or smaller.

* * * * *